(12) United States Patent
Yano et al.

(10) Patent No.: US 6,320,517 B1
(45) Date of Patent: Nov. 20, 2001

(54) MAP INFORMATION DISPLAYING DEVICE

(75) Inventors: Fumiko Yano; Kazuya Tabata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/402,889

(22) PCT Filed: Jun. 20, 1997

(86) PCT No.: PCT/JP97/02139

§ 371 Date: Oct. 14, 1999

§ 102(e) Date: Oct. 14, 1999

(87) PCT Pub. No.: WO98/59214

PCT Pub. Date: Dec. 30, 1998

(51) Int. Cl.[7] ................................................. G08G 1/123
(52) U.S. Cl. .................... 340/995; 340/988; 340/990; 701/200; 701/208; 701/209; 701/211
(58) Field of Search .................. 360/995, 990, 360/988; 701/200, 208, 209, 211

(56) References Cited

U.S. PATENT DOCUMENTS

| | | | | |
|---|---|---|---|---|
| 5,161,886 | * | 11/1992 | De Jong et al. ..................... | 701/209 |
| 5,471,205 | * | 11/1995 | Izawa .................................. | 340/995 |
| 5,731,979 | * | 3/1998 | Yano et al. .......................... | 701/211 |
| 5,884,217 | * | 3/1999 | Koyanagi ............................ | 701/208 |
| 5,917,436 | * | 6/1999 | Endo et al. .......................... | 340/995 |
| 6,144,318 | * | 11/2000 | Hayashi et al. ..................... | 340/995 |

FOREIGN PATENT DOCUMENTS

| | | |
|---|---|---|
| 3-10278 | 1/1991 | (JP) . |
| 4-60415 | 2/1992 | (JP) . |
| 4-143616 | 5/1992 | (JP) . |
| 4-195184 | 7/1992 | (JP) . |
| 4-335390 | 11/1992 | (JP) . |
| 4-359282 | 12/1992 | (JP) . |
| 6-331367 | 12/1994 | (JP) . |
| 7-49242 | 2/1995 | (JP) . |
| 7-168996 | 7/1995 | (JP) . |
| 7-218279 | 8/1995 | (JP) . |
| 7-286857 | 10/1995 | (JP) . |
| 8-63696 | 3/1996 | (JP) . |
| 2530154 | 6/1996 | (JP) . |

* cited by examiner

Primary Examiner—Benjamin C. Lee
(74) Attorney, Agent, or Firm—Sughrue, Mion, Zinn, Macpeak & Seas, PLLC

(57) ABSTRACT

A map information display device for a displacement body is provided with a position detection section (23) detecting a present position of a displacement body based on an output of a speed sensor (22) which detects a speed of a displacement body or a gyro (21) which detects a bearing of a displacement body or the like, a map memory (25) which stores map data and a display section (27) which displays a present position of a displacement body detected by said position detection section (23) and a map image based on map data read from a map memory (25). Display of a map image in accord with the requirements of the driver is enabled without a complicated operation by varying a map mode when displaying a map screen on the display section depending on a display state of a map on the display section or an operational state of the displacement body.

16 Claims, 44 Drawing Sheets

| No. | SPEED | OFFSET VALUE | | |
|---|---|---|---|---|
| 0 | 0~30km/h | 0 | + | − |
| 1 | 30~40km/h | 0.50 | + | − |
| 2 | 40~50km/h | 2.00 | + | − |
| 3 | 50~60km/h | 3.00 | + | − |
| 4 | 60~70km/h | 4.00 | + | − |
| 5 | 70km/h~ | 4.50 | + | − |

53 +, 54 −, 55 SET, 51

| No. | READ CATEEGORY | OFFSET VALUE |
|---|---|---|
| 0 | SMALL STREET | 0 |
| 1 | MUNICIPAL ROAD | 1 |
| 2 | MAIN REGIONAL PREFECTURAL ROAD | 2 |
| 3 | NATIONAL HIGHWAY | 3 |
| 4 | EXPRESSWAY, CITY EXPRESSWAY, TOLLWAY | 4 |

| OFFSET VALUE | | |
|---|---|---|
| No. READ CATEGORY | | |
| 0 SMALL STREET | 0.00 | [+] [−] |
| 1 MUNICIPAL ROAD | 0.50 | [+] [−] |
| 2 MAIN REGIONAL PREFECTURAL ROAD | 2.00 | [+] [−] |
| 3 NATIONAL HIGHWAY | 3.00 | [+] [−] |
| 4 EXPRESSWAY, CITY EXPRESSWAY, TOLLWAY | 3.50 | [+] [−] |

53 +, 54 −, 55 SET, 51

| No. | SPEED LIMIT | |
|---|---|---|
| 0 | LESS THAN 30km/h | 0 |
| 1 | 40km/h | 1 |
| 2 | 50km/h | 2 |
| 3 | MORE THAN 60km/h | 3 |

| No. | ROAD WIDTH | OFFSET VALUE |
|---|---|---|
| 0 | LESS THAN 3m | 0 |
| 1 | EQUAL TO OR GREATER THAN 3m AND LESS THAN 4m | 1 |
| 2 | EQUAL TO OR GREATER THAN 4m AND LESS THAN 5m | 2 |
| 3 | EQUAL TO OR GREATER THAN 4m AND LESS THAN 6m | 3 |
| 4 | EQUAL TO OR GREATER THAN 6m AND LESS THAN 7m | 4 |
| 5 | EQUAL TO OR GREATER THAN 7m | 5 |

OFFSET VALUE

No. ROAD WIDTH

| 0 | LESS THAN 3m | 0.00 | [+] | [−] |
| 1 | EQUAL TO OR GREATER THAN 3m AND LESS THAN 4m | 1.00 | [+] | [−] |
| 2 | EQUAL TO OR GREATER THAN 4m AND LESS THAN 5m | 2.00 | [+] | [−] |
| 3 | EQUAL TO OR GREATER THAN 4m AND LESS THAN 6m | 2.50 | [+] | [−] |
| 4 | EQUAL TO OR GREATER THAN 6m AND LESS THAN 7m | 4.00 | [+] | [−] |
| 5 | EQUAL TO OR GREATER THAN 7m | 4.50 | [+] | [−] |

[SET]

| No. | LANE NUMBER | OFFSET VALUE |
|---|---|---|
| 0 | TWO-WAY ROAD | 0 |
| 1 | ONE LANE IN ONE DIRECTION | 1 |
| 2 | TWO LANES IN ONE DIRECTION | 2 |
| 3 | THREE LANES IN ONE DIRECTION | 3 |
| 4 | FOUR LANES OR MORE IN ONE DIRECTION | 4 |

| No. | ROAD STATE | OFFSET VALUE |
|---|---|---|
| 0 | UNSEALED ROAD | 0 |
| 1 | SEALED | 1 |

| No. | REGION | OFFSET VALUE |
|---|---|---|
| 0 | URBAN | 0 |
| 1 | NON-URBAN | 1 |

| No. | MAP SCALE | OFFSET VALUE |
|---|---|---|
| 0 | 1/6,400,000 etc | 0 |
| 1 | 1/1,600,000 etc | 1 |
| 2 | 1/400,000 etc | 2 |
| 3 | 1/100,000 etc | 3 |
| 4 | 1/50,000 etc | 4 |
| 5 | 1/25,000 etc | 5 |
| 6 | 1/12,500 etc | 6 |

| No. | MAP SCALE | MAP MODE |
|---|---|---|
| 0 | 1/6,400,000 etc | NORTH UP |
| 1 | 1/1,600,000 etc | NORTH UP |
| 2 | 1/400,000 etc | NORTH UP |
| 3 | 1/100,000 etc | HEADING UP |
| 4 | 1/50,000 etc | HEADING UP |
| 5 | 1/25,000 etc | HEADING UP |
| 6 | 1/12,500 etc | HEADING UP |

MAP INFORMATION DISPLAYING DEVICE

FIELD OF THE INVENTION

The present invention relates to a map information display device which displays a present position of a displacement body on a map.

BACKGROUND TO THE INVENTION

Conventional map information display devices which display a present position of a displacement body on a map are known in the navigation systems or the like of automobiles. FIG. 1 is a block diagram of a conventional map information display device such as disclosed in non-examined Japanese utility model publication JP-U-3-10278. FIG. 2 is an explanatory diagram showing a display example displayed on a display section.

In FIG. 1, reference numeral 1 denotes a CD-ROM (compact disk . read on memory) in which map data is stored, 2 is an operational section into which commands are input by a user, 3 is a bearing sensor of the displacement body, 4 is a displacement amount sensor, 5 is a bearing calculation means. 6 is a processing device which performs overall control of the map information display device. 7 is a system controller, 8 is a map data buffer memory. 9 is a display device acting as a display section, 10 is a CRT (cathode ray tube) controller, 11 is a first VRAM (image random access memory), 12 is a second VRAM, 13 is a read controller, 14 is a CRT.

The processing device 6 generates images so that the present position of the displacement body is in the center and stores such images in the first VRAM. The image reading region (window) is displaced and scrolled in the first VRAM 11 depending on the displacement of the displacement body. The window is monitored to ascertain whether the map reading region has reached a preset region or not. When the preset region is reached, the generated image is stored in the second VRAM so that the present position of the displacement body is at a center. Thereafter the window in the second VRAM 12 displaces by scrolling depending on the displacement of the displacement body. Thereafter the process is repeated whereby images are generated, recorded and scroll displayed together with the displacement of the displacement body each time a region in which a window is preset in each VRAM 11, 12 is reached.

The recording region of the first VRAM 11 (the same as the second VRAM 12) is present in simplified form in FIG. 2. As shown in the figure, a rear plotting initial line (hereafter back drawing line) is provided in a region which is smaller on all sides than the first VRAM 11. A window WD1 is provided in a region which is again smaller on all sides. The center CAR1 of the window WD1 corresponds to the present position of the displacement body.

The operation of the invention will be described below.

FIG. 3 is a flowchart showing the flow of map drawing processing in such a map information display device. The process device 6 reads map data corresponding to the present position of the displacement body from the CD-ROM and inputs the read data into the CRT controller 10 of the display device 9. The CRT controller 10 generates an image so that the present position of the displacement is in the center and records the image in the first VRAM 11 (step ST1). Next a VRAM (first VRAM 11) which reads the image from the read controller 13 is designated and a position of the window WD1 of the first VRAM 11 is determined so that the cursor which shows the position of displacement of the displacement body is expressed in the center of the screen.

The read controller 13 reads a map image from the window WD1 of the position determined for the designated first VRAM 11 and displays it on the CRT 14 (step ST3). Monitoring is performed to check whether the window WD1 has reached the back drawing line BDL1 or not. If the line has not been reached, the routine returns to step ST2 and the process after the calculation of the window address of the window WD1 which depends on the displacement of the displacement body is repeated (step ST4). In this way, the position of the window WD1 which depends on the displacement of the displacement body is moved and the map image is displayed by scrolling.

If the displacement body has traversed a considerable distance, the window WD1 reaches the back draw line BDL1, the process device 6 reads map data which depends on the present position of the displacement body from the CD-ROM 1 and inputs the data into the CRT controller 10 of the display device 19. The CRT controller 10 generates an image so that the present position of the displacement body is in the center and stores the image in the second VRAM 12 (step ST5). Next a position of the window WD2 of the second VRAM 12 is determined so that the cursor which shows the present position of the displacement body is in the center of the screen and that address is input into the read controller 13 (step ST6).

The read controller 13 reads the map image from the window WD2 at a determined position for the designated second VRAM 12 and expresses the map in the CRT 14 (step ST7). Monitoring is performed to check whether the window WD2 has reached the back drawing line BDL2 or not. If the line has not been reached, the routine returns to step ST6 and the process after the calculation of the window address of the window WD2 which depends on the displacement of the displacement body is repeated (step ST8). In this way, the position of the window WD2 which depends on the displacement of the displacement body is moved and the map image is displayed by scrolling.

If the displacement body has traversed a considerable distance, the window WD2 reaches the back draw line BDL2, the routine returns to step ST1 and repeats the process after the storing of the map image in the first VRAM 11.

Apart from the above noted technique related to a conventional map information display device, published patent applications JP-A-7-218279 and JP-A-7-286857 are also noted.

Since the conventional map information display device is constructed as above, the icon (present position mark) which shows the present position of the displacement body is in the center of the display. Normally from the point of view of the driver who is driving the displacement body, information about the proximity of the displacement body is required when the displacement body is travelling at low speeds and information further forward is required at high speeds. It is advantageous to have information about areas forward of the displacement body at a wider range a high speeds than at low speeds. However in the conventional map information display device, the icon which displays the present position of the displacement body is displayed in the center and the driver can thus obtain map information regarding the environs of the present position. Thus the problem has arisen that it is difficult to display a map screen as desired by the driver.

The present invention is proposed to solve the above problems and has the object of providing a map information display device with a front extended display by which a driver can obtain information at a wider range at high speeds than at low speeds.

DISCLOSURE OF THE INVENTION

A first exemplary embodiment of the present invention allows variation of the position on the screen of the present position of the displacement body which is displayed on the display section depending on an operational state of the displacement body. In this way, the present position of the displacement body may be displayed in the center of the screen of the display section depending on an operational state of the displacement body. For example, an operational state may be the region or type of road currently traveled or displacement body speed. The present position may be also displayed in an extended front display without complicated operations.

A second exemplary embodiment of the present invention allows the present position of the displacement body on the screen which is displayed on the display section to vary depending on the speed of the displacement body. In this way, the present position can be displayed in the center of the screen at low speeds and in an extended front display at high speeds without a complicated operation.

A third exemplary embodiment of the present invention allows the present position of the displacement body on the screen which is displayed on the display section to vary depending on the type of road currently traveled. In this way, the present position can be displayed in the center of the screen when traveling on general roads and in an extended front display when traveling on highways without a complicated operation. Alternatively, when traveling on roads with a low speed limit, the present position may be presented in the center of the screen and when traveling on roads with a high speed limit, the present position may be displayed in an extended front display. Again, when traveling on narrow roads, the present position may be presented in the center of the screen and when traveling on wide roads, the present position may be displayed in an extended front display. Again, when traveling on roads with a low number of lanes, the present position may be presented in the center of the screen and when traveling on roads with a high number of lanes, the present position may be displayed in an extended front display. Again, when traveling on unsealed roads, the present position may be presented in the center of the screen and when traveling on sealed roads, the present position may be displayed in an extended front display. The above functions are realized without complicated operations and the function may be varied depending on the type of road currently traveled.

A fourth exemplary embodiment of the present invention allows the present position of the displacement body on the screen which is displayed on the display section to vary depending on the type of region currently traveled. In this way, the present position can be displayed in the center of the screen when traveling municipal areas and in an extended front display when traveling in outside municipal areas without a complicated operation.

A fifth exemplary embodiment of the present invention allows the present position of the displacement body on the screen which is displayed on the display section to vary depending on the display state of the map with respect to the display section. In this way, the present position can be displayed in the center of the screen when a wide area map is displayed and in an extended front display when a detailed map is displayed without a complicated operation.

A sixth exemplary embodiment of the present invention allows the present position of the displacement body on the screen which is displayed on the display section to vary depending on the position relationship with a destination. In this way, it is possible to display an extended display of the destination by which the driver can obtain more extensive information about the destination without a complicated operation.

A seventh exemplary embodiment of the present invention allows switching of the display mode of the map to the display depending on the running state of the displacement body. In this way, it is possible to display the map display in a "north up" or "heading up" orientation depending on the operational state of the displacement body with respect to the area currently traveled, the type of road currently traveled or the displacement body speed without a complicated operation.

An eighth exemplary embodiment of the present invention allows switching of the display mode of the map to the display depending on the map scale or degree of detail of the map displayed. In this way, it is possible to display the map in a "north up" mode during wide area map display or in "heading up" orientation during detail map display without a complicated operation.

A ninth exemplary embodiment of the present invention performs map display by switching the display mode, the destination extended display or the front extended display of the present position on a single screen by creating a plurality of screens on the display section. In this way, it is possible to view displays switched between display mode, destination extended display or front extended display at the same time with the normal display with the present position displayed in the center of the display of the display section.

A tenth exemplary embodiment of the present invention stores a control program for controlling the display of the map image in the display section in a program memory through an exterior recording medium. In this way, exchanging the control program is simplified.

PREFERRED EMBODIMENTS OF THE INVENTION

In order to describe the invention in greater detail, the preferred embodiments will be outlined below with reference to the accompanying figures.

Embodiment 1

Figure 1:
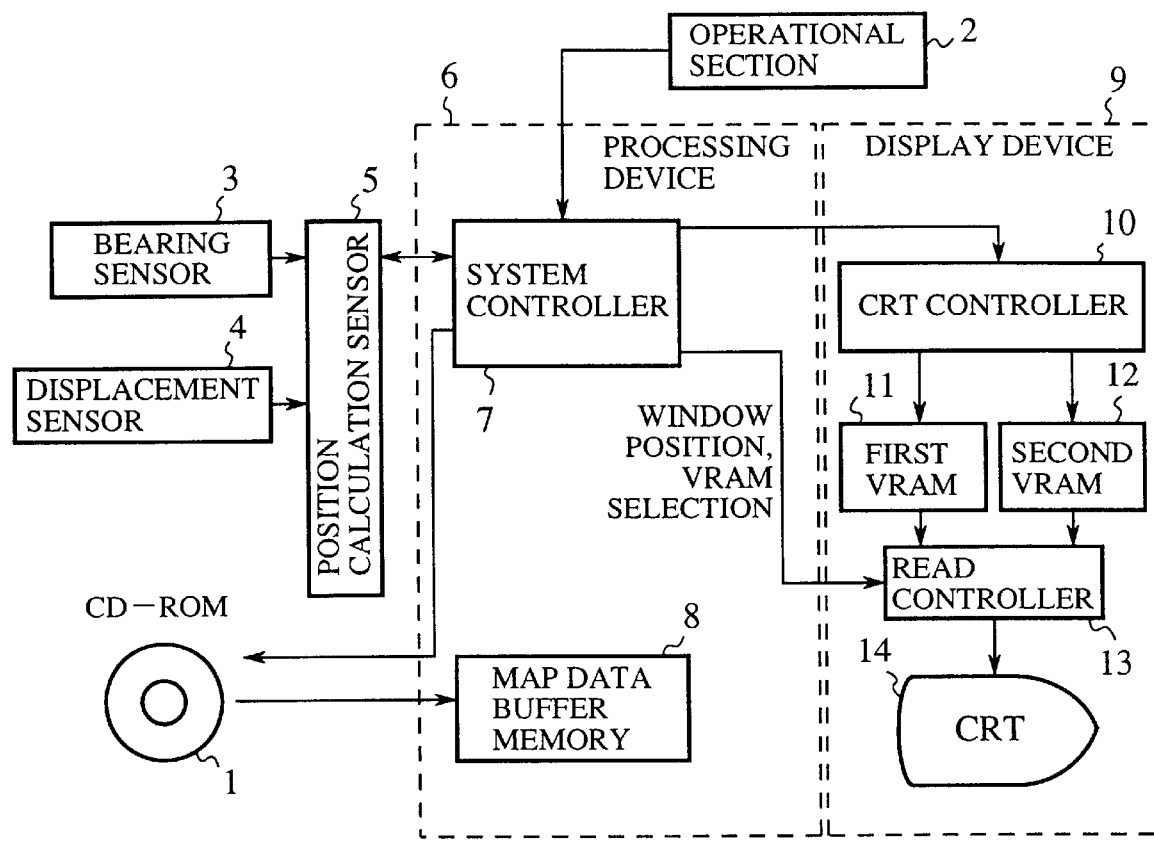
FIG. 1 is a block diagram of a conventional map information display device.
Figure 2:
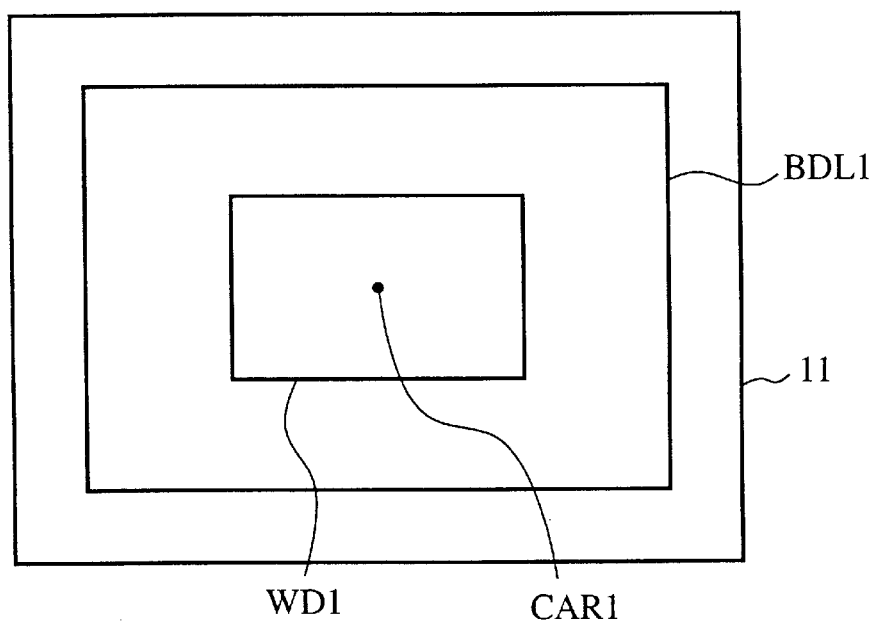
FIG. 2 is an explanatory figure of a display example of a display screen in a conventional map information display device.
Figure 3:
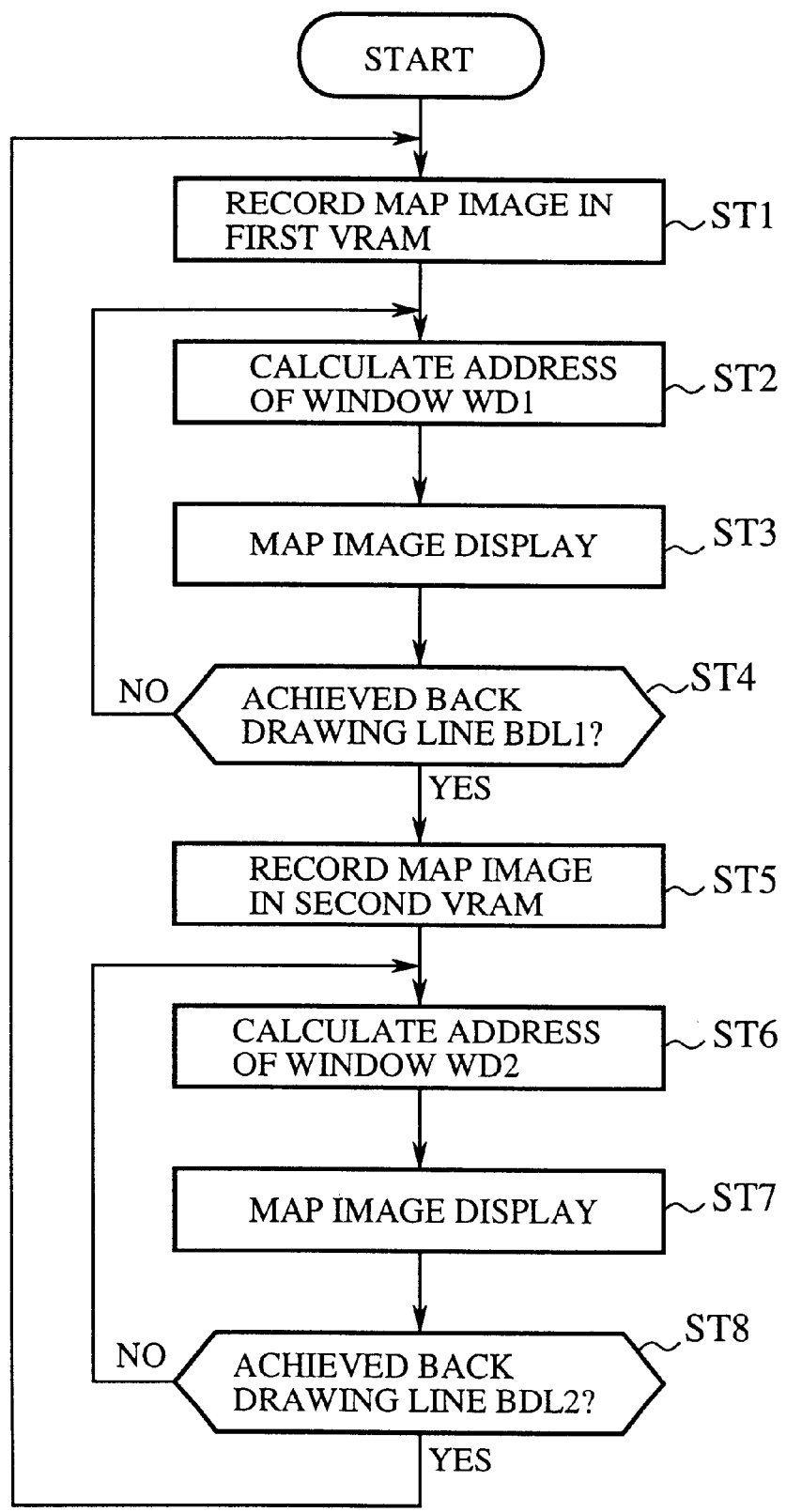
FIG. 3 is a flowchart showing the display operation of a convention map information display device.
Figure 4:
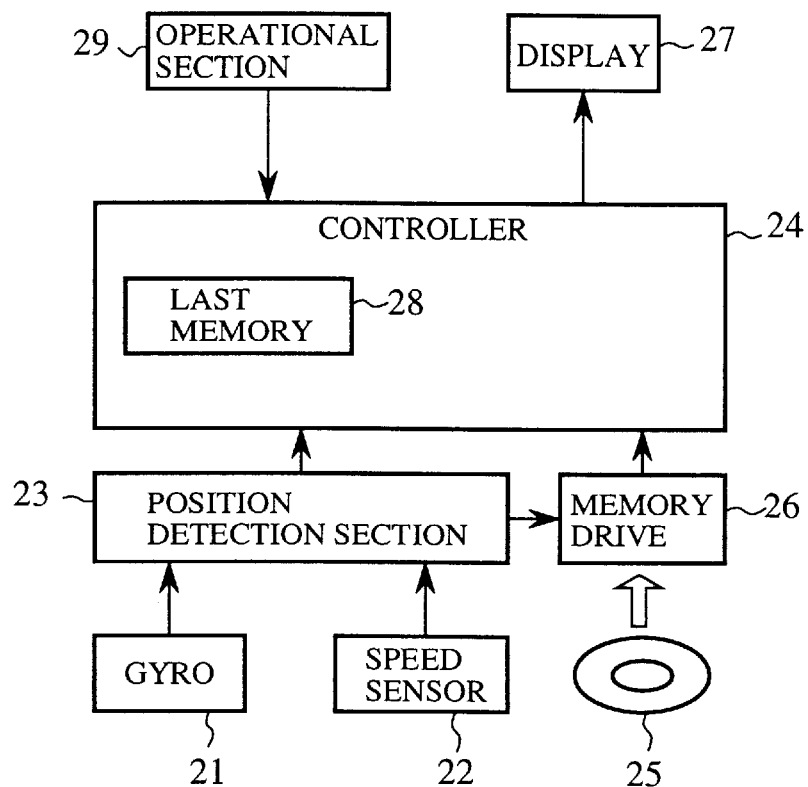
FIG. 4 is a block diagram of a map information display device according to a first embodiment of the present invention.

FIG. 4 is a block diagram of the structure of a map information display device according to a first embodiment of the present invention. In the figure, 21 is a gyro which detects a bearing due to the angle of traverse of a displacement body and which is comprised of an optical fiber gyro for example. 22 is speed sensor which is mounted in the displacement body to detects a speed of the displacement body and which is comprised of a displacement body-mounted speed sensor or the like.

23 is a position detection device which detects a present position of a displacement body. A present position of the displacement body is calculated from the variation in the bearing of the displacement body calculated by accumulating the output of the gyro 21 over a fixed time period and from the displaced distance calculated from accumulating the output of the speed sensor 22 over a fixed period of time. The detection of the present position by the position detection section 23 may be based on the electrical waves from a GPS (global positioning system) satellite or may be based on both above systems.

24 is a control section which controls the display of the present position of the displacement body and the map image in the display section 27 which will be described below. The control section 24 is formed from the above position detection section 23 and for example from a calculation means such as a CPU (central processing device).

25 is a map memory in which map data is stored and which acts as a map data recording section formed by an exterior recording medium such as a CD-ROM. 26 is a memory drive such as a CD-ROM memory drive for reading the map data from the map memory 25. The map data may be obtained by using the map memory 25 and the memory drive 26 or may be obtained externally through a communication device.

27 is a display section which displays a present position of the displacement body or map information. The control section 24 sends position data of the displacement body as detected by the position detection section 23 to the memory drive 26. On that basis, the memory drive 26 displays a map image of the present environs of the displacement body on the basis of the map data read from the map memory 25. Also a present position mark is displayed on the present position on the displayed map image and thus the driver can recognize a present position on the displayed map by sight. The map data can display maps according to the following seven map scales: 1/12500, 1/125000, 1/50000, 1/100000, 1/400000, 1/1600000, 1/6400000. The map image at this time can be displayed by two map modes in which normally north is displayed in a north up orientation and in which the direction of travel is normally displayed in a heading up orientation.

28 is a last memory which is provided in the control section 24 and which temporarily stores the current map mode and map scale. The contents of the last memory 28 maintains the last map scale and map mode even after the map information display device is offset.

29 is an operational section which performs the operation of scrolling the map screen, selecting the map scale and switching the map information display device ON and OFF. The operational section 29 is formed by a display device provided with a touch sensor for example, the display screen 27. Commands for each operation are input into the control section 24 by touching each type of switch displayed on the display device.

Figure 5:
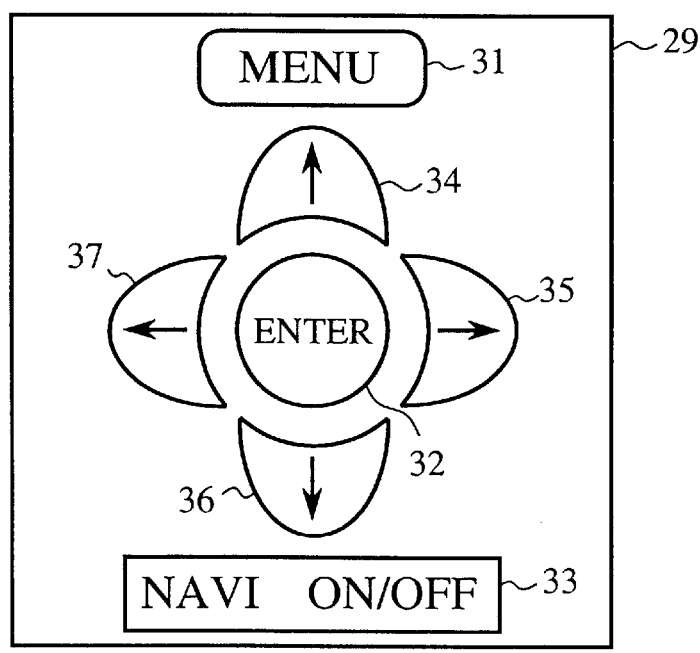
FIG. 5 is an explanatory diagram of the operational section according to a first embodiment of the present invention.

FIG. 5 is an explanatory diagram showing an example of such an operational section 29. In the figure, 31 is a menu switch for selecting a menu screen, 32 is an enter switch which indicates the initiation of the operation, 33 is an ON/OFF switch which performs the ON/OFF operation of the map information display device, 34, 35, 36, 37 are four scroll switches which displace the cursor.

In the operational section 29, an operational icon and a cursor are displayed on the display section 27. Various operational icons are selected and operated by moving the cursor with the four scroll switches 34, 35, 36, 37. The initiation of the selected operation is indicated to the control section 24 by depressing the enter switch 32.

A simplified description of the operation of a first embodiment will be given below.

When the map information display device is switched ON by operating the ON/OFF switch 33 of the operational section 29, the control section 24 receives information relating to the speed and bearing of the displacement body as well as coordinates (X,Y) of the present position of the displacement body from the position detection section 23. The coordinates (X,Y) of the present position are given as the latitude and longitude for example.

The last prior map scale and map mode on the last prior occasion the ON/OFF switch was placed in the OFF position are read by the last memory 28. The control section 24 calculates and determines offset values which show the level of the extended front display from the center of the screen (how far removed from the center) of the present position displayed in the display section from received information relating to the speed of the displacement body.

Figure 6:
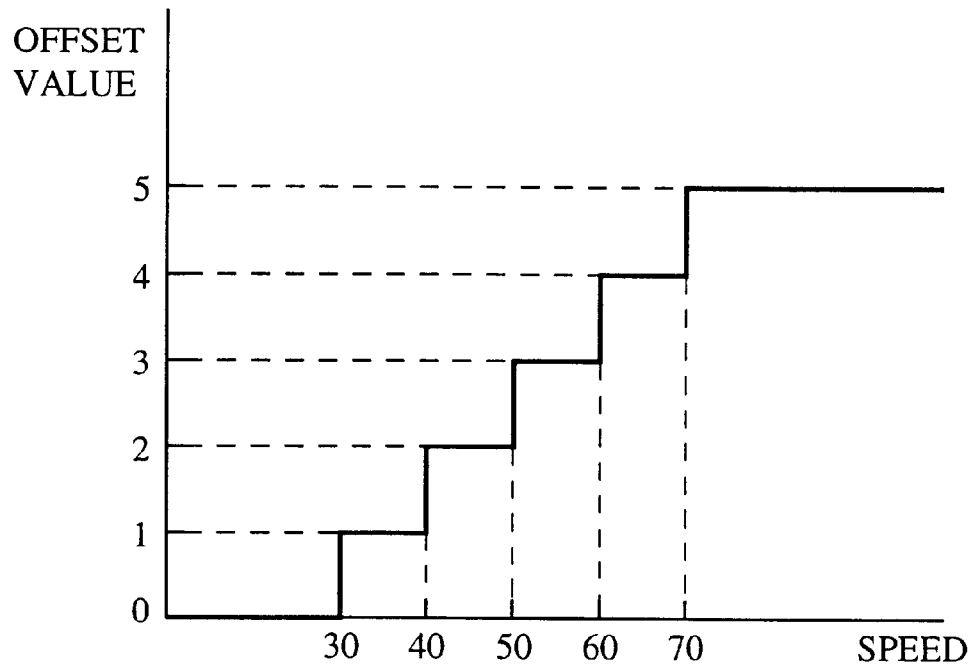
FIG. 6 is an explanatory diagram of an offset value according to a first embodiment of the present invention.

FIG. 6 is an explanatory view showing an offset value based on information relating to the speed of the displacement body. An offset value of 0–5 is set depending on respective speeds. That is to say, according to this example, offset values are set on the following basis: 0–30 km/h has a value of 0, 30–40 km/h has a value of 1, 40–50 km/h has a value of 2, 50–60 km/h has a value of 3, 60–70 km/h has a value of 4, above 70 km/h has a value of 5. In the first embodiment, it is assumed that the displacement body has a speed of 55 km/h. Thus the offset value is taken to be 3.

Figure 7:
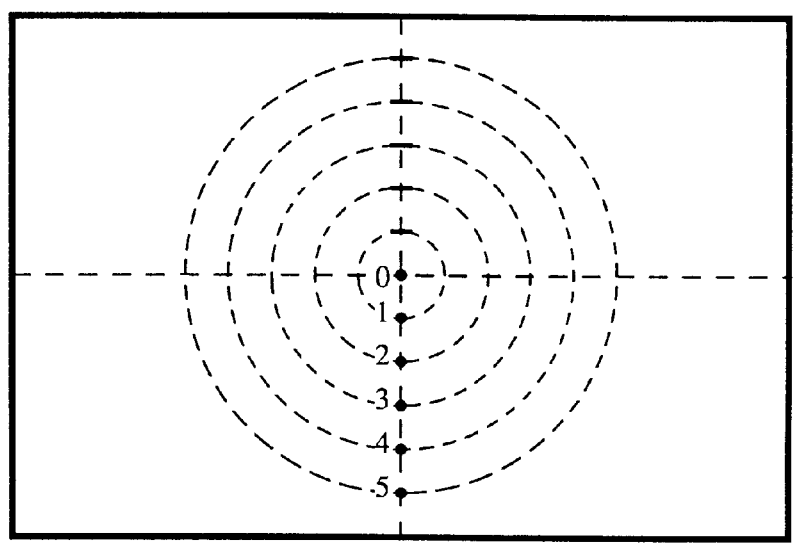
FIG. 7 is an explanatory diagram of an offset position according to a first embodiment of the present invention.

The display position of the present position on a screen of a display section 27 determined by each offset value 0–5 is shown in FIG. 7. That is to say, an offset value of 0 is taken to be the center of the screen and thereafter as the value increases through 1–5, the display position is removed through concentric circles from the center.

The control section 24 calculates offset position coordinates $(X_1, Y_1)$ with an offset from the present position (X, Y) of the displacement body using these offset values. The method of performing this calculation will be described below.

The distance from the offset position coordinates $(X_1, Y_1)$ to the present position (X, Y) of the displacement body is calculated by Formula 1.

$$\text{Distance} = (1/\text{map scale}) \times \text{offset value} \quad (1)$$

In the first embodiment, the map scale read from the last memory 28 is taken to be 1/12500. The distance L using Formula (1), a map scale of 1/12500 and an offset value of 3 becomes:

$$L = 12500 \times 3$$

If the angle of the direction of travel of the displacement body is taken to be θ (radians), offset position coordinates $(X_1, Y_1)$ with an offset from the present position (X, Y) of the displacement body can be calculated using the distance L from Formula (2):

$$X_1 = X + L \cos \theta$$

$$Y_1 = Y + L \sin \theta \quad (2)$$

The control section 24 reads map data which is centered on offset position coordinates $(X_1, Y_1)$ obtained in such a way through the memory drive 26 from the map memory 25 and a map image is displayed centering on the offset position coordinates $(X_1, Y_1)$ on a display section 27. A present position mark is displayed as a triangular mark which can discriminate a position and direction of travel on the present position coordinates (X, Y) on the map image.

Figure 8:
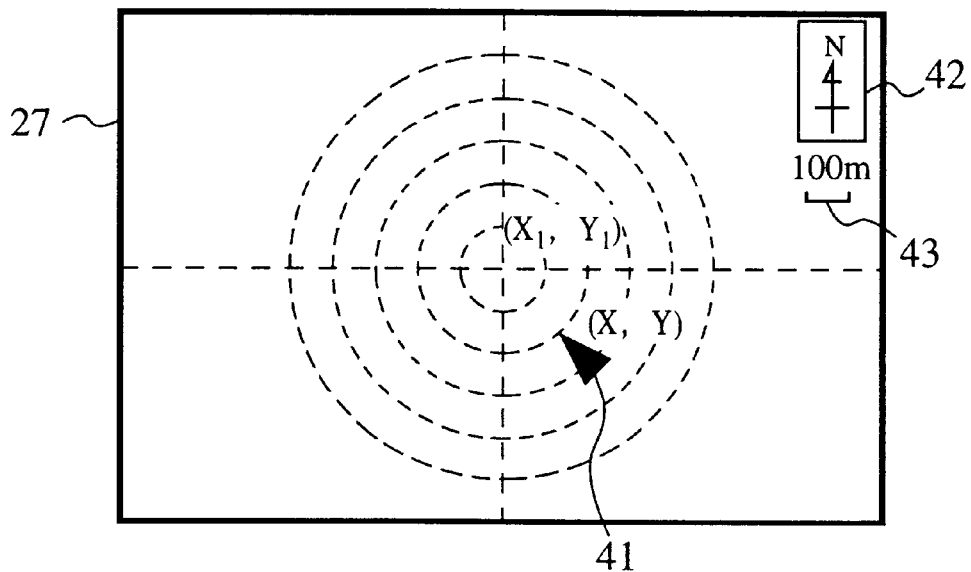
FIG. 8 is an explanatory diagram of a display example of a display screen according to a first embodiment of the present invention.
Figure 9:
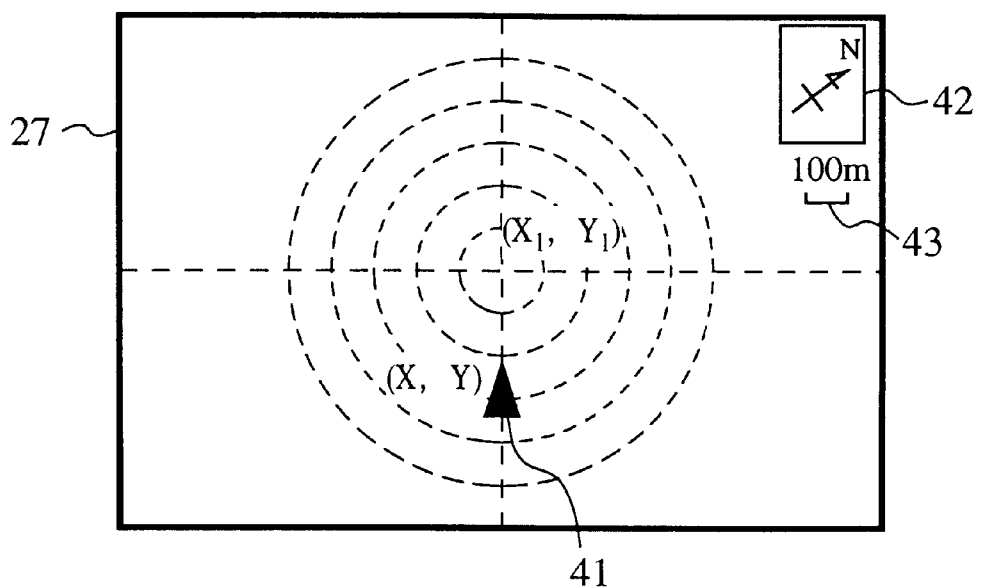
FIG. 9 is an explanatory diagram of another display example of a display screen according to a first embodiment of the present invention.

FIG. 8 and FIG. 9 are explanatory diagrams showing a display example of a present position mark on a display section 27. In the figure, 41 is a present position mark, 42 is a bearing mark which shows a bearing in the map and 43 is a scale showing the scale of the map.

If the map mode which displays a map image based on map data read from the last memory 28 is set to north up mode in which north is in the up direction, as shown in FIG. 8, the end of the present position mark 41 is displayed so that the direction of travel which corresponds with the displayed map image faces the center of the screen. The bearing mark 42 is displayed so that the north is facing up. If the map mode is the heading up mode in which the direction of travel is facing up, as shown in FIG. 9, the present position mark 5a is displayed so that north is facing a fixed direction.

The map scale at this time is 1/12500 and the scale 43 is 100 m.

Figure 10:
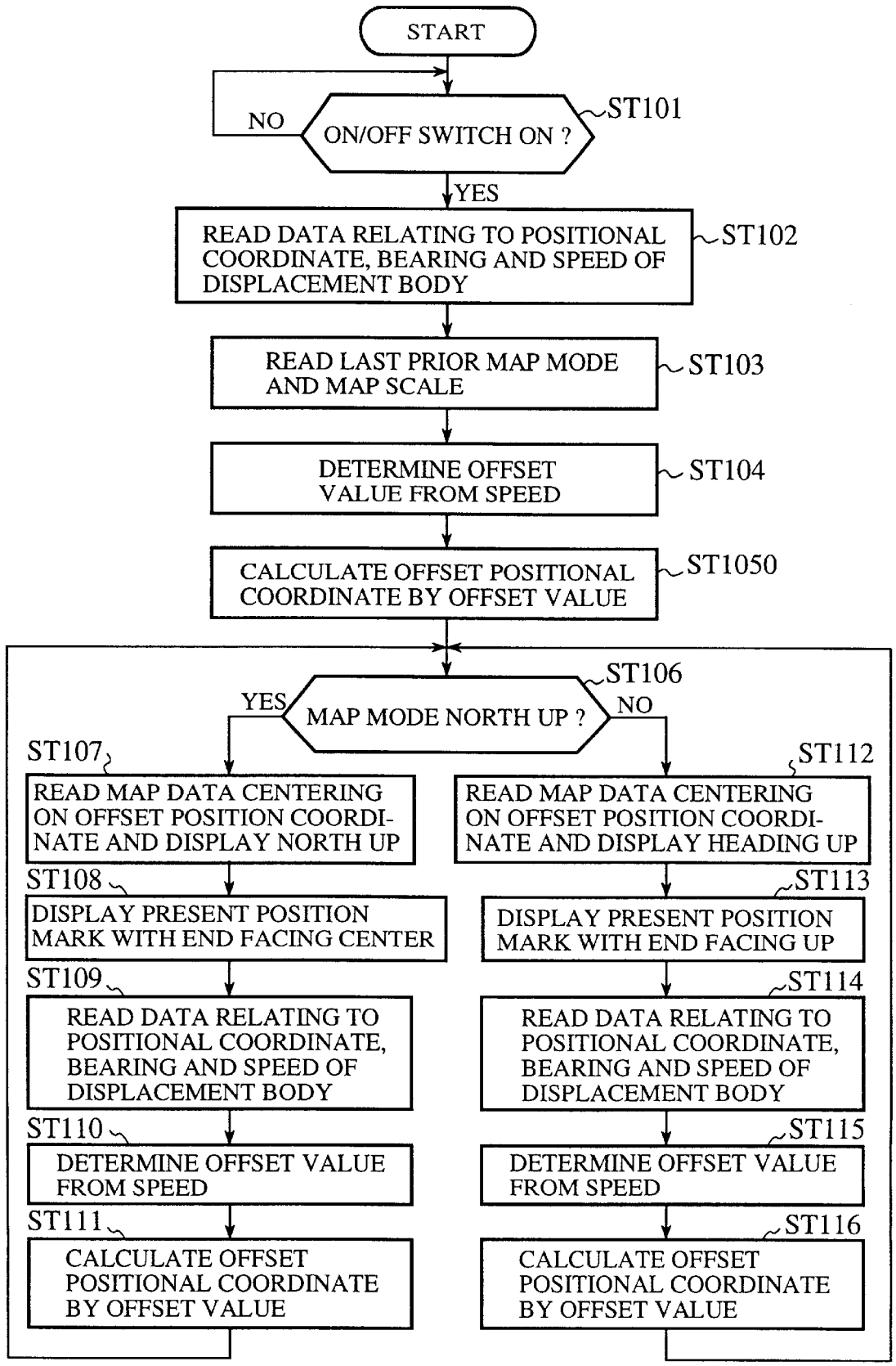
FIG. 10 is a flowchart of the basic operation of the control section according to a first embodiment of the present invention.

FIG. 10 is a flowchart which shows the flow of the basic operation of the control section 24. Below, the operation of the first embodiment of the present invention will be described on the basis of this flowchart.

The control section 24 monitors whether or not the map information display device is ON by the ON/OFF switch of the operational section 29 being in the ON position (step ST101). When the ON/OFF switch 33 is in the ON position, the control section 24 reads speed data, bearing data and position coordinate data (X, Y) of the displacement body from the position detection section 23 (step ST102). The map mode and map scale on the last prior time the ON/OFF switch 33 was placed in the OFF position is read from the last memory 28 (step ST103). An offset value is determined from the read speed of the displacement body (step ST104) and the offset position coordinates $(X_1, Y_1)$ are calculated from the offset value (step ST105).

Next it is determined whether or not the read map mode is north up (step ST106). When the result of this determination is that the map mode is north up and thus the screen is displayed with north is at the top of the screen, map data centering on the offset coordinates $(X_1, Y_1)$ are read from the map memory 25 through a memory drive 26. On this basis, the map image is displayed with north up on the display section 27 (step ST107). The present position mark 41 on the map image displayed in north up mode is displayed so that the end of the triangle which shows the direction of travel faces the center of the screen of the display device 27 (step ST108).

Reading of the speed data, bearing data and position coordinate data (X, Y) of the displacement body is performed again by the position detection section 23 (step ST109). Next an offset value is determined from the read speed of the displacement body (step ST110). The offset position coordinates $(X_1, Y_1)$ are calculated from the offset coordinates (step ST111). Thereafter the routine returns to the step ST 106 and offset display is performed depending on the speed of the displacement body in north up mode by re-executing the above process.

When the result of the determination in step ST106 is that map mode is heading up mode in which the display of the map is perform with the direction of travel being the top of the map, map data centering on offset position coordinates ($X_1$, $Y_1$) calculated in step ST105 are read from the map memory 25 through a memory drive 26. On that basis, the map image is displayed on the display device 27 with the direction of travel at the top (step ST112). The present position mark 41 on the map image displayed by heading up mode is displayed so that the end of the triangle which shows the direction of travel is facing up (step ST113).

Reading of the speed data, bearing data and position coordinate data (X, Y) of the displacement body is performed again by the position detection section 23 (step ST114). Next an offset value is determined from the read speed of the displacement body (step ST115). The offset position coordinates ($X_1$, $Y_1$) are calculated from the offset coordinates (step ST116). Thereafter the routine returns to the step ST106 and offset display is performed depending on the speed of the displacement body in heading up mode by re-executing the above process.

As shown above according to the first embodiment, it is possible to perform suitable offset display of the present position depending on the speed of the displacement body. Furthermore since it is possible to appropriately set the direction of the map display, the present position mark 41 of the displacement body may be displayed in the center of the screen of the display section 27 depending on the speed of the displacement body or may be displayed in front extended manner. Thus map screen display is enabled in a manner as desired by the driver without a complicated operation.

Embodiment 2

In the first embodiment the present position as determined by the offset value was explained with a fixed value for the offset. However the present position may be changed by varying the offset value by a variation of an offset coefficient arbitrarily set by an operation of the driver.

Figure 11:
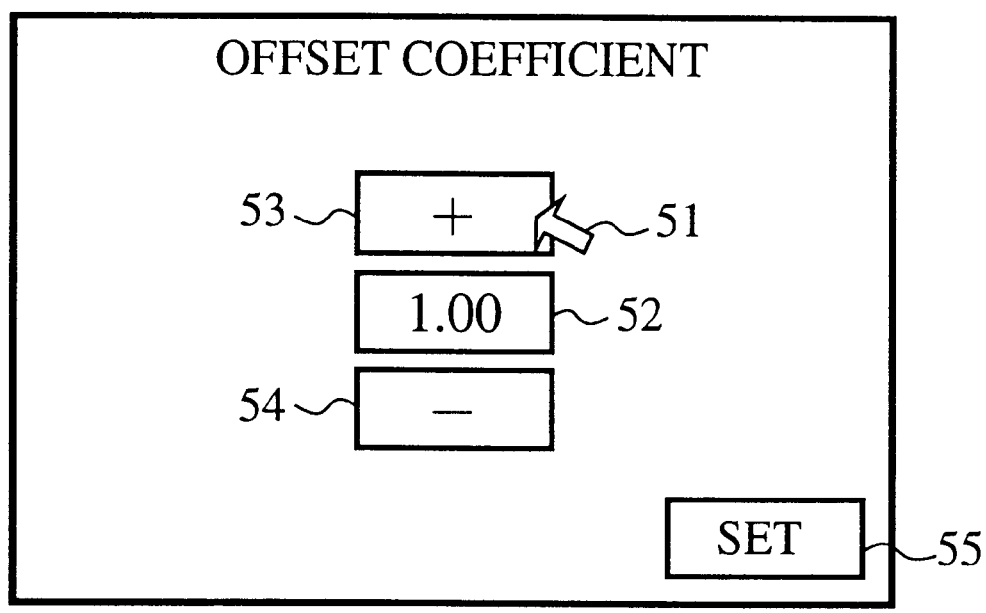
FIG. 11 is an explanatory diagram of the set screen of an offset coefficient in a map information display device according to a second embodiment of the present invention.
Figure 12:
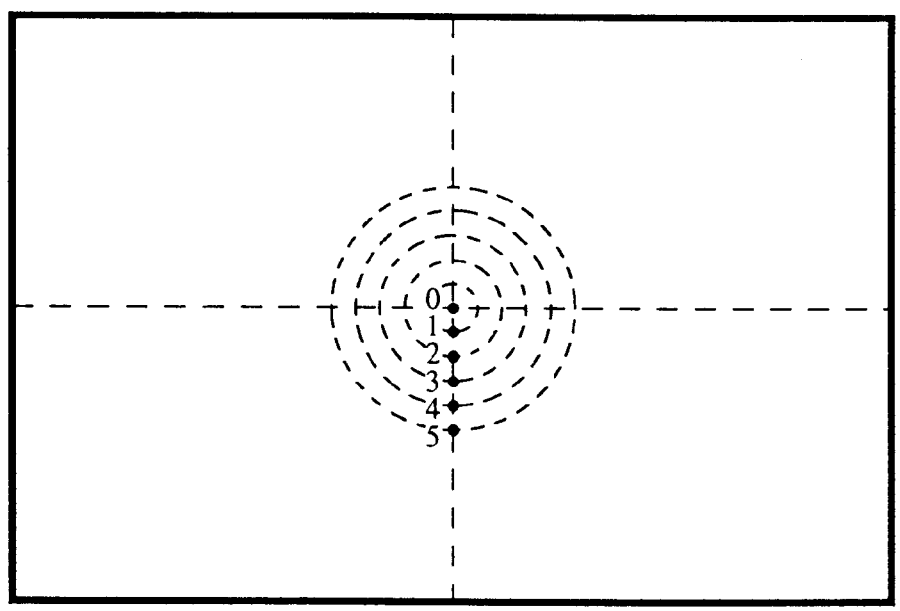
FIG. 12 is an explanatory diagram of an offset position according to a second embodiment of the present invention.

FIG. 11 is an explanatory diagram of the set screen of an offset coefficient in a map information display device according to a second embodiment of the present invention. In the figure, 51 is an arrow cursor which is displayed on the display device 27, 52 is an offset coefficient display device, 53 is an icon which is depressed when the offset coefficient is increased, 54 is an icon which is depressed when the offset coefficient decreased, 55 is an icon which is depressed when the offset coefficient is set. FIG. 12 is an explanatory diagram of an offset position at this time.

As shown in FIG. 11 a set screen is prepared beforehand for the offset coefficient. The driver depresses the icon 54 or 53 with the arrow cursor 51 when varying the offset coefficient with a default 1.00. Thus the offset coefficient displayed on the offset coefficient screen 52 is varied. When the icon 55 is depressed as the offset coefficient is a desired value for example 0.50, the value of the coefficient is set at that value for example 0.50. In this way, the distance of the offset is half the value of the default. As shown in FIG. 12, each offset position at which a present position is displayed depending on displacement body speed is on a concentric circle having a diameter of ½ as in the first embodiment as shown in FIG. 7.

According to embodiment 2, it is possible to appropriately regulate a value which offsets a present position depending on desired use or the ability of the driver since it is possible to arbitrarily vary the offset coefficient.

Embodiment 3

Figures 13, 14:
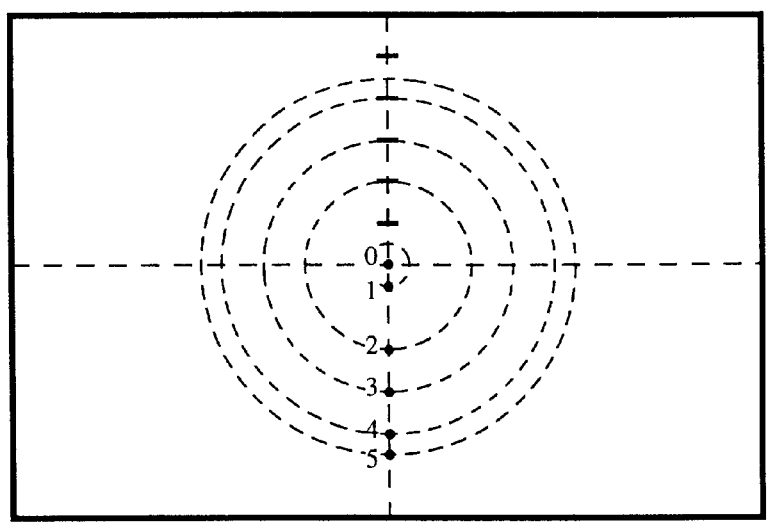
FIG. 13 is an explanatory diagram of the set screen of an offset value in a map information display device according to a third embodiment of the present invention.
FIG. 14 is an explanatory diagram of an offset position according to a third embodiment of the present invention.

In embodiment 2, a value which is offset by variation in the offset coefficient was described as being regulated together. However offset values may be separately and respectively set. FIG. 13 is an explanatory diagram showing a set screen of an offset value in a third embodiment of the present invention. FIG. 14 is a diagram showing the offset position at that time. The sections of FIG. 13 which are the same as those in FIG. 11 are represented by the same reference numerals and will not be explained further.

As shown in FIG. 13, separate icons are prepared: an icon 53 for increasing an offset value at each displacement body speed and an icon 54 for reducing the offset icons. An offset value with a default of 0.00–5.00 is separately varied by depressing the corresponding icon 53 or 54. After varying the offset value, when the icon 55 is depressed and set, as shown in FIG. 14, the offset distance becomes concentric circles of the respectively set values.

In this way, according to embodiment 3, the offset value of a present position may be appropriately regulated depending on the ability of the driver or the desired use since it is possible to set each offset value separately.

Embodiment 4

In the first embodiment, as shown in FIG. 6, a display position on a screen of a present position of a displacement body was varied by an offset value which varies stepwise depending on the speed of the displacement body. However a display position on a screen of a present position of a displacement body can be varied by an offset value which varies linearly depending on the speed of the displacement body. Such a map information display device according to a fourth embodiment of the present invention will be described below. The structure of a map information display device according to a fourth embodiment is the same as that of the first embodiment as shown in the block diagram in FIG. 4 and those parts will not be explained further.

The operation of the invention according to embodiment 4 will be outlined below.

When the map information display device is placed in the ON position by operation of the operational section 29, the control section 24 receives information about the speed and bearing of the displacement body and the coordinates of the present position of the displacement body from the position detection section 23. The control section 29 then reads the map mode and map scale used on the last prior occasion from the last memory 28. The control section 24 calculates an offset value from the center with respect to the present position which is displayed on the display section 27 from received information relating to the speed of the displacement body. In embodiment 4, the speed of the displacement body is taken to be 50 km/h.

Figure 15:
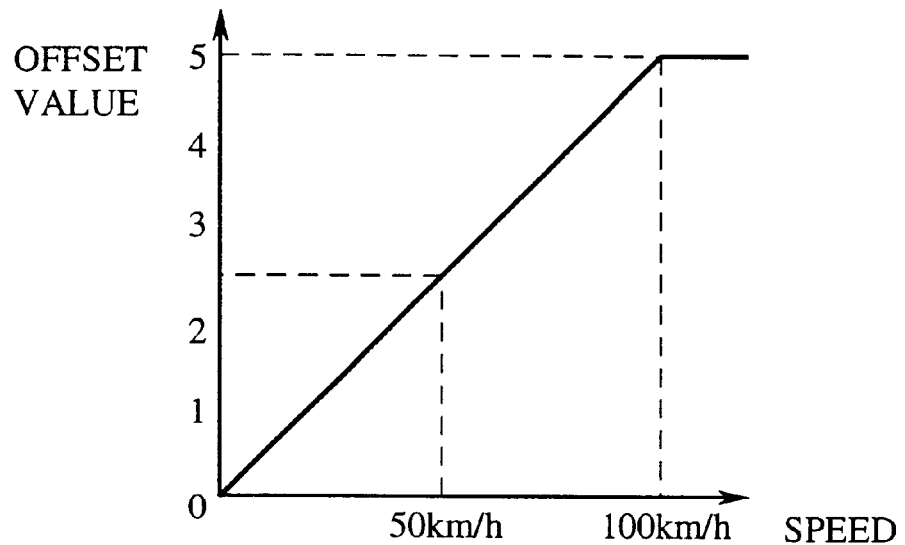
FIG. 15 is an explanatory diagram of an offset value according to a fourth embodiment of the present invention.
Figure 16:
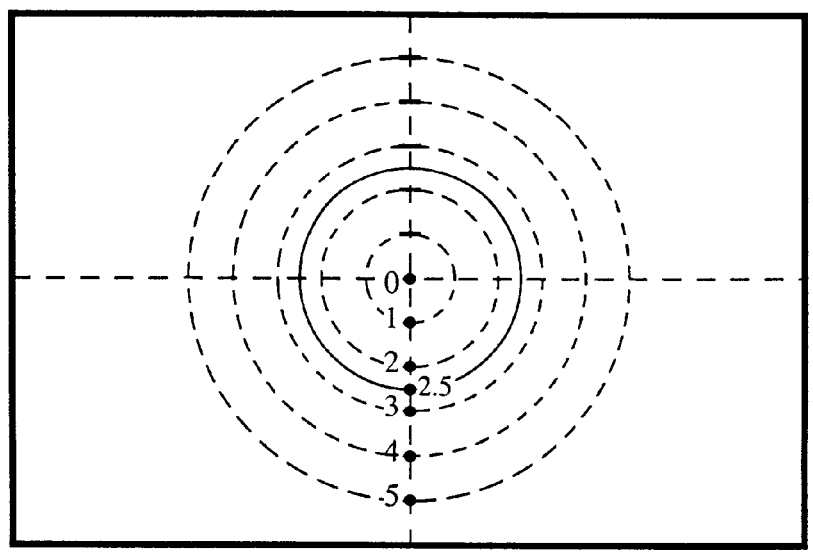
FIG. 16 is an explanatory diagram of an offset position according to a fourth embodiment of the present invention.

FIG. 15 is an explanatory diagram of an offset value according to a fourth embodiment of the present invention. As shown in the figure, the offset value increases proportional to increases in speed of the displacement body. (However a maximum speed is taken to be 100 km/h, and the offset value does not increase at higher speeds). In embodiment 4, since the speed of the displacement body is 50 km/h as stated above, the offset value is 2.5. The display position of the present position in the display device 27 with an offset value determined in this way is as shown in FIG. 16. That is to say, an offset value of 0 is taken to be the center of the screen and thereafter values from 1 to 5 are increasingly removed concentrically from the center. The present position of the displacement body at 50 km/h is displayed on a circle on the line with an offset value of 2.5.

The control section 24 performs the calculation of the offset position coordinates ($X_1$, $Y_1$) with an offset from the coordinates of the present position (X, Y) of the displacement body with an offset value of 2.5. The control section 24 reads map data centering on the offset position coordinates ($X_1$, $Y_1$) from the map memory 25 through the memory drive 26 and displays a map image in which the offset position coordinates ($X_1$, $Y_1$) are in the center in the display device 27. A present position mark is displayed by a triangular mark which can discriminate the direction of travel at the present position coordinates (X, Y) on the display screen.

The screen which is displayed on the display device 27 is the same as that in the first embodiment and will not be further explained.

Figure 17:
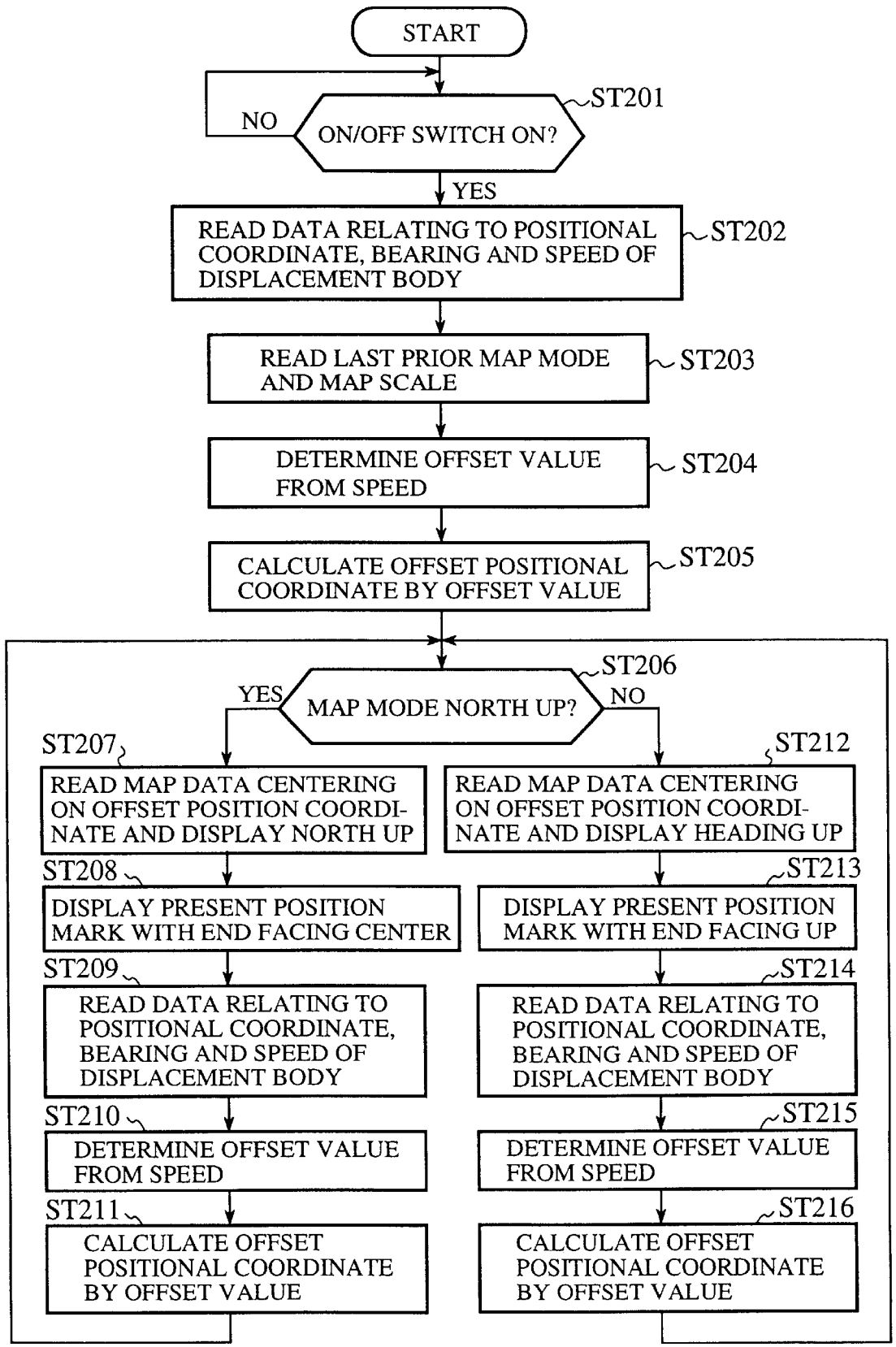
FIG. 17 is a flowchart showing the basic operation of a control section according to a fourth embodiment of the present invention.

FIG. 17 is a flowchart showing the basic operation of a control section 24 according to a fourth embodiment of the present invention. The operation of the fourth embodiment will be explained below with reference to the flowchart in FIG. 17.

The control section 24 detects the fact that the ON/OFF switch of the operational section 29 has been placed in the ON position (step ST201). First the control section 24 reads data relating to the speed, bearing and position coordinates (X, Y) of the displacement body from the position detection section 23 (step ST202). The map mode and map scale on the last prior occasion the ON/OFF switch 33 was placed in the OFF position is read from the last memory 28 (step ST203). An offset value is determined from the read speed of the displacement body using the graph shown in FIG. 15 (step ST204) and the offset position coordinates ($X_1$, $Y_1$) are calculated from the offset value (step ST205).

Next it is determined whether or not the read map mode is north up (step ST206). When the result of this determination is that the map mode is north up and thus the screen is displayed with north is at the top of the screen, map data centering on the offset coordinates ($X_1$, $Y_1$) are read from the map memory 25. On this basis, a map image is displayed with north up on the display section 27 (step ST207). The present position mark on the map image is displayed so that the end of the triangle which shows the direction of travel faces the center of the screen of the display device 27 (step ST208).

Reading of the speed data, bearing data and position coordinate data (X, Y) is performed again by the position detection section 23 (step ST209). Next an offset value is determined from the read speed of the displacement body (step ST210). The offset position coordinates ($X_1$, $Y_1$) are calculated from the offset value (step ST211). Thereafter the routine returns to the step ST206 and offset display is performed depending on the speed of the displacement body in north up mode by re-executing the above process.

When the result of the determination in step ST206 is that the map mode is in heading up mode, map data centering on offset position coordinates ($X_1$, $Y_1$) calculated in step ST205 are read from the map memory 25. On that basis, the map image is displayed on the display device 27 with the direction of travel at the top (step ST212). The present position mark on the map image is displayed so that the end of the triangle which shows the direction of travel is facing up (step ST213).

Reading of the speed data, bearing data and position coordinate data (X, Y) is performed again by the position detection section 23 (step ST214). Next an offset value is determined from the read speed of the displacement body (step ST215). The offset position coordinates ($X_1$, $Y_1$) are calculated from the offset value (step ST216). Thereafter the routine returns to the step ST206 and offset display is performed depending on the speed of the displacement body in heading up mode by re-executing the above process.

In this way in the fourth embodiment, since the level of displaying in front extended display increases as the speed of the displacement body increases, the driver can obtain information further in front of the displacement body as the displacement body speed increases. Thus it is possible to provided a map screen which is suitably matched to the operating conditions.

Embodiment 5

Figure 18:
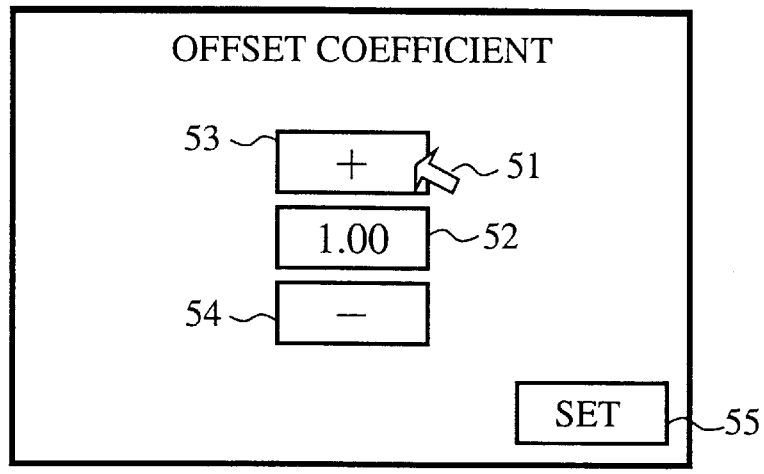
FIG. 18 is an explanatory diagram of the set screen of an offset coefficient in a map information display device according to a fifth embodiment of the present invention.
Figure 19:
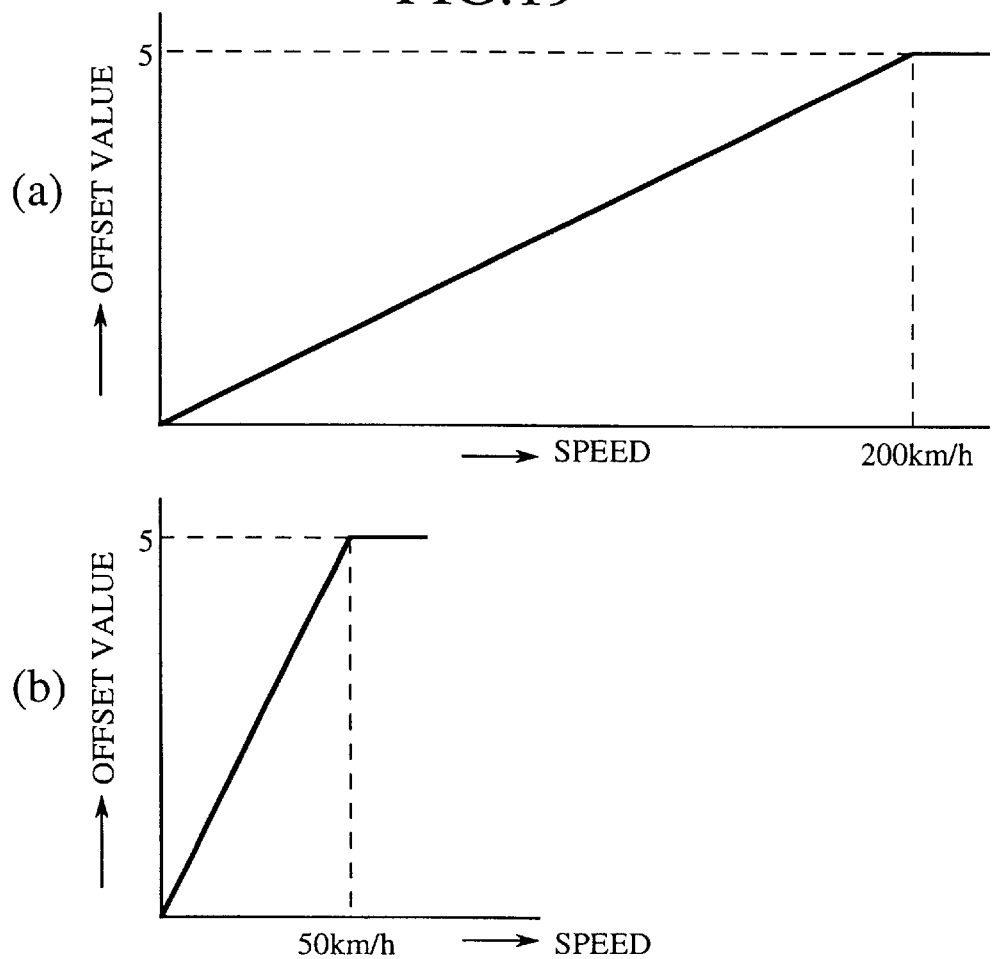
FIG. 19 is an explanatory diagram of an offset value according to a fifth embodiment of the present invention.

In embodiment 4, the offset value and the speed of the displacement body were described as being proportional to a fixed proportional coefficient. However it is possible to arbitrarily set the proportional coefficient (offset coefficient) by an operation of the driver. FIG. 18 is an explanatory diagram of the set screen of an offset coefficient in a map information display device according to a fifth embodiment of the present invention. FIG. 19 is an explanatory diagram of an offset value according to a fifth embodiment of the present invention. Those sections of FIG. 18 which are the same as those of FIG. 11 are designated by the same numerals and will not be explained further.

A set screen for an offset coefficient as shown in FIG. 18 is prepared beforehand. The driver varies the offset coefficient with a default of 1.00 by depressing the icon 53 and 54 with the arrow shaped cursor 51. Thus the offset coefficient which is displayed on the offset coefficient display section 52 is varied. When the icon 55 is depressed as the offset coefficient is a desired value for example 0.50, the value of the coefficient is set at that value for example 0.50. In this way, the distance of the offset is half the value of the default as shown in FIG. 19(*a*). When the icon 55 is depressed as the offset coefficient is a desired value for example 2.00, the value of the coefficient is set at that value for example 2.00. In this way, the distance of the offset is double the value of the default as shown in FIG. 19(*b*).

According to embodiment 5, it is possible to appropriately regulate a value which offsets a present position depending on desired use.

Embodiment 6

In embodiment 5, an offset value of a displacement body was varied proportionally in linear fashion with respect to the speed of the displacement body. However it is possible to vary the value in a non-linear manner. Below such a map information display device will be explained according to embodiment 6 of the present invention. Those parts of the map information display device according to embodiment 6 which are the same of those of embodiment 1 as shown in the block diagram in FIG. 4 will not be further explained.

The operation of embodiment 6 will be outlined below.

When the map information display device is placed in the ON position by operation of the operational section 29, the control section 24 receives information about the speed and bearing of the displacement body and the coordinates (X, Y) of the present position of the displacement body from the position detection section 23. The control section 29 then reads the map mode and map scale used on the last prior occasion from the last memory 28. The control section 24 calculates an offset value from the center of the present position which is displayed on the display section 27 from received information relating to the speed of the displacement body. In embodiment 6, the speed of the displacement body is taken to be 50 km/h.

Figure 20:
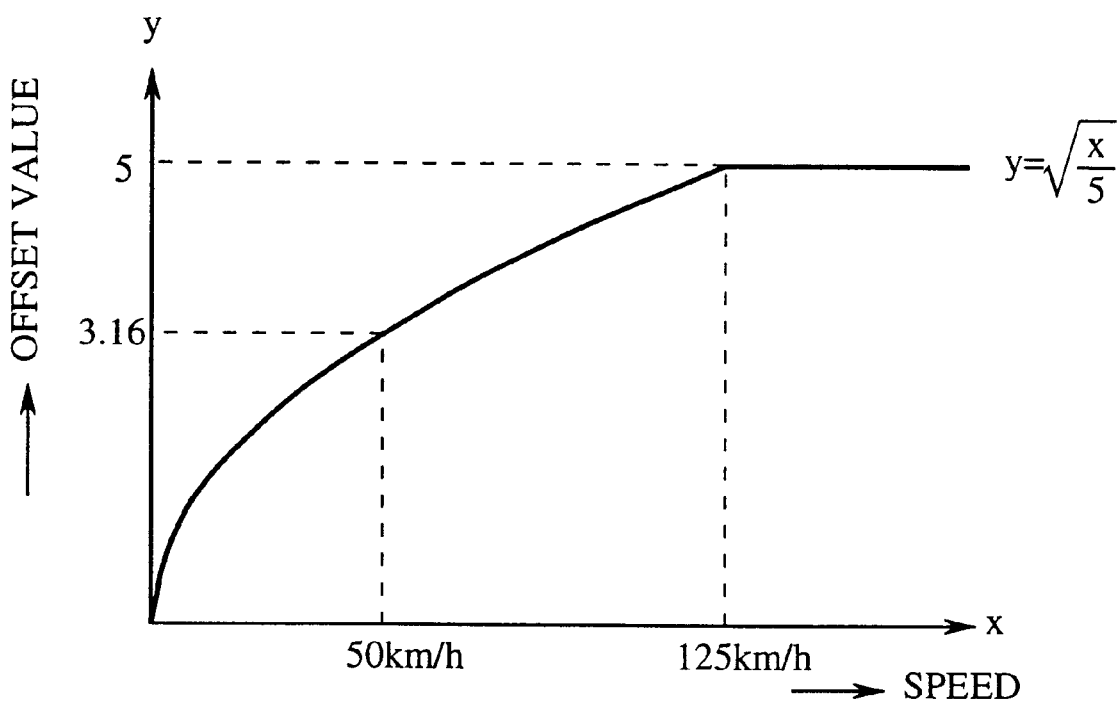
FIG. 20 is an explanatory diagram of an offset value in a map information display device according to a sixth embodiment of the present invention.

FIG. 20 is an explanatory diagram showing a graph of the relationship of an offset value to displacement body speed according to a sixth embodiment of the present invention. As shown in the figure, if x is the speed of the displacement body and y is the offset value, the offset value y varies non-linearly with respect to displacement body speed x by Formula (3).

$$y=(x/5)^{1/2} \qquad (3)$$

Figure 21:
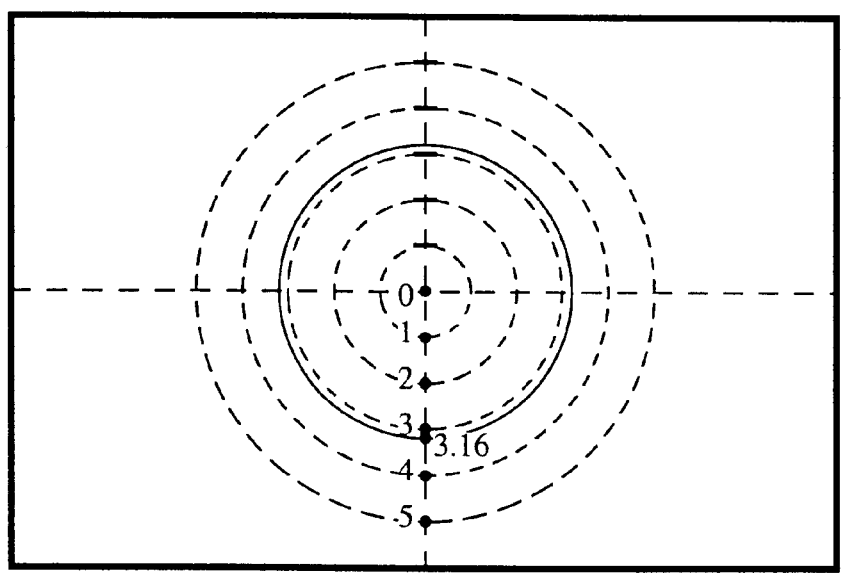
FIG. 21 is an explanatory diagram of an offset position according to a sixth embodiment of the present invention.

In this way, the offset value y increases as the displacement body speed x increases. (However a maximum speed is taken to be 125 km/h and the offset value y does not increase at higher speeds). In embodiment 6, the speed x of the displacement body is 50 km/h as stated above and thus the offset value y is 3.16. The display position of the present position in the display device 27 with an offset value y determined in this way is as shown in FIG. 21. That is to say, an offset value of 0 is taken to be the center of the screen and thereafter values from 1 to 5 are increasingly removed concentrically from the center. The present position of the displacement body at 50 km/h is displayed on a circle on the line with an offset value of 3.16.

The control section 24 performs the calculation of the offset position coordinates $(X_1, Y_1)$ with an offset from the coordinates of the present position (X,Y) of the displacement body with an offset value of 3.16. The control section 24 reads map data centering on the offset position coordinates $(X_1, Y_1)$ from the map memory 25 through the memory drive 26 and displays a map image in which the offset position coordinates $(X_1, Y_1)$ are in the center in the display device 27. A present position mark is displayed by a triangular mark which can discriminate the direction of travel at the present position coordinates (X, Y) on the display screen.

The screen which is displayed on the display device 27 is the same as that in the first embodiment and will not be further explained.

Figure 22:
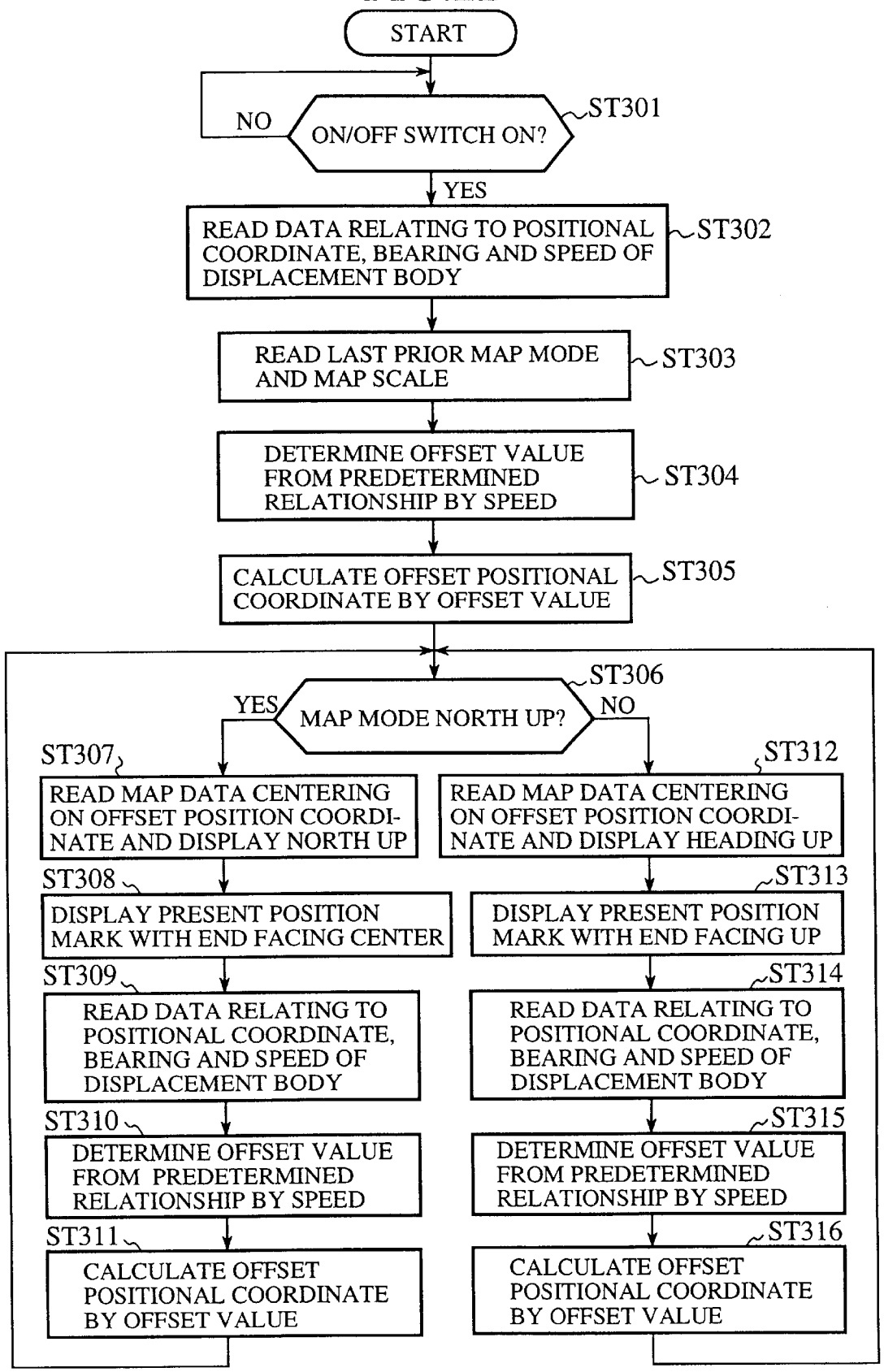
FIG. 22 is a flowchart showing the basic operation of a control section according to a sixth embodiment of the present invention.

FIG. 22 is a flowchart showing the basic operation of the control section 24. The operation of the sixth embodiment will be explained below with reference to the flowchart in FIG. 22.

The control section 24 detects the fact that the ON/OFF switch of the operational section 29 has been placed in the ON position (step ST301). First the control section 24 reads data relating to the speed, bearing and position coordinates (X, Y) of the displacement body from the position detection section 23 (step ST302). The map mode and map scale on the last prior time the ON/OFF switch 33 was placed in the OFF position is read from the last memory 28 (step ST303). An offset value is determined from the read speed of the displacement body using Formula (3) (step ST304) and the offset position coordinates $(X_1, Y_1)$ are calculated from the offset value (step ST305).

Next it is determined whether or not the read map mode is north up (step ST306). When the result of this determination is that the map mode is north up, map data centering on the offset coordinates $(X_1, Y_1)$ are read from the map memory 25. On this basis, a map image is displayed with north up on the display section 27 (step ST307). The present position mark on the map image is displayed so that the end of the triangle which shows the direction of travel faces the center of the screen of the display device 27 (step ST308).

Reading of the speed data, bearing data and position coordinate data (X, Y) is performed again by the position detection section 23 (step ST309). Next an offset value is determined from the speed of the displacement body using the Formula (3) (step ST310). The offset position coordinates $(X_1, Y_1)$ are calculated from the offset coordinates (step ST311). Thereafter the routine returns to the step ST306 an offset display is performed depending on the speed of the displacement body in north up mode by re-executing the above process.

When the result of the determination in step ST306 is that the map mode is in heading up mode, map data centering on offset position coordinates $(X_1, Y_1)$ calculated in step ST305 are read from the map memory 25. On that basis, the map image is displayed on the display device 27 with the direction of travel at the top (step ST312). The present position mark on the map image is displayed so that the end of the triangle which shows the direction of travel is facing up (step ST313).

Reading of the speed data, bearing data and position coordinate data (X, Y) is performed again by the position detection section 23 (step ST314). Next an offset value is determined from the speed of the displacement body using Formula (3) (step ST315). The offset position coordinates $(X_1, Y_1)$ are calculated from the offset coordinates (step ST316). Thereafter the routine returns to the step ST306 and offset display is performed depending on the speed of the displacement body in heading up mode by re-executing the above process.

In this way in the sixth embodiment, since the offset value can be varied non-linearly with respect to the speed of the displacement body, the degree of front extension does not change in regions in which the displacement body is traveling at a low speed and is convenient for traveling in urban areas. Conversely the degree of front extension increases in high-speed regions and thus the device increases the convenience of high speed traveling. Thus it is possible to provided a suitable map screen which is matched to operational conditions.

Embodiment 7

Figure 23:
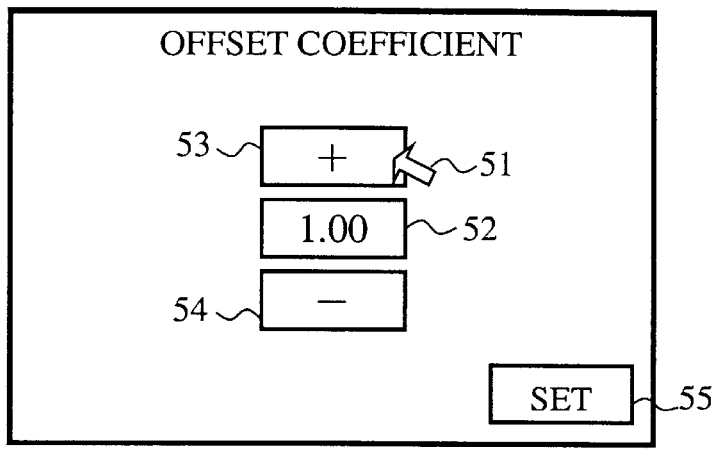
FIG. 23 is an explanatory diagram of the set screen of an offset coefficient according to a seventh embodiment of the present invention.
Figure 24:
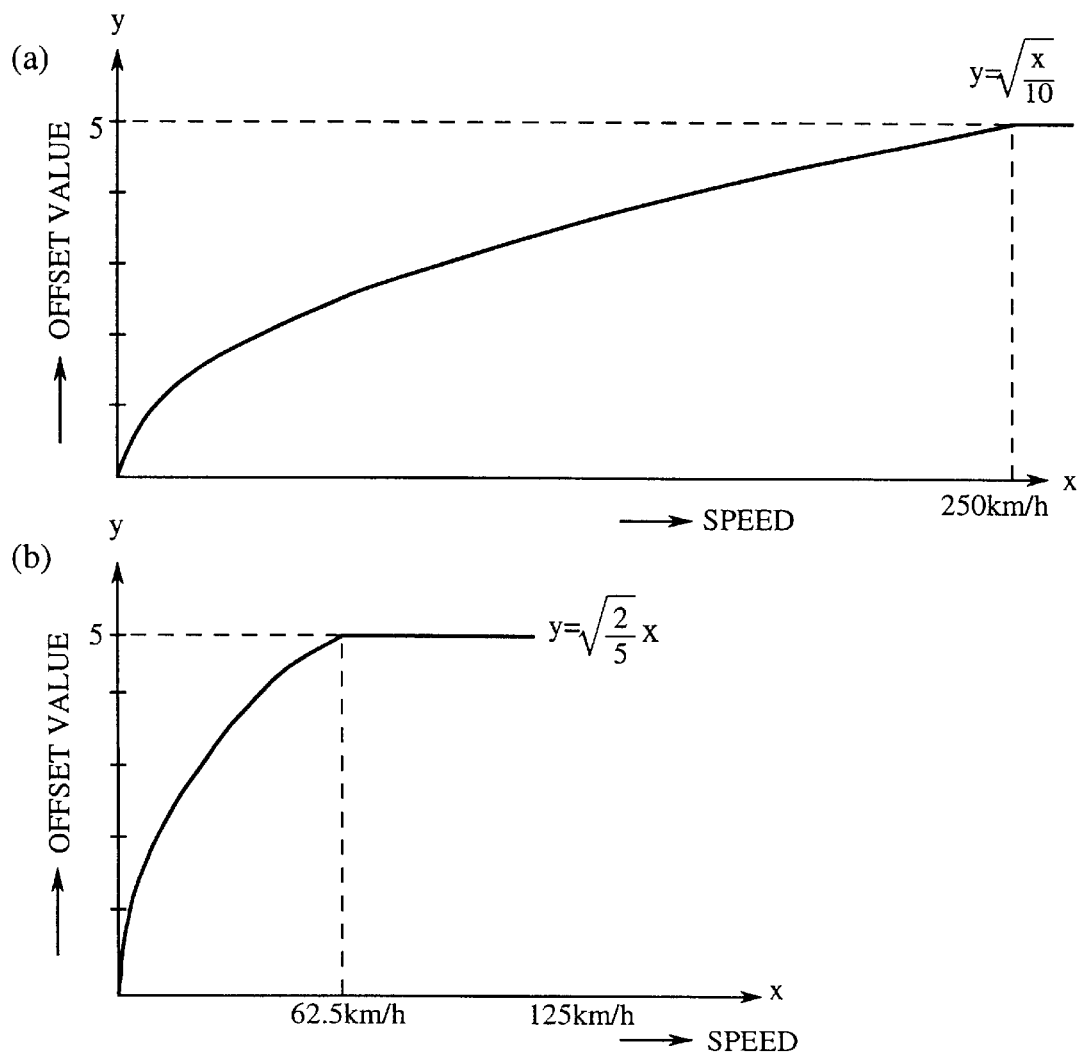
FIG. 24 is an explanatory diagram of an offset value according to a seventh embodiment of the present invention.

In embodiment 6, the offset value of the displacement body varied depending on a fixed formula due to speed. However it is possible to set an offset coefficient which determines the formula arbitrarily by an action of the driver. FIG. 23 is an explanatory diagram of the set screen of an offset coefficient according to a seventh embodiment of the present invention. FIG. 24 is an explanatory diagram of an offset value according to a seventh embodiment of the present invention. Those sections of FIG. 23 which are the same as those in FIG. 11 are designated by the same reference numerals and will not be described again.

A set screen of the offset coefficient as shown in FIG. 23 is prepared beforehand. The driver varies the offset coefficient with a default of 1.00 by depressing the icon 53 and 54 with the arrow shaped cursor 51. Thus the offset coefficient which is displayed on the offset coefficient display section 52 is varied. When the icon 55 is depressed as the offset coefficient is a desired value for example 0.50, the value of the coefficient is set at that value, for example 0.50. In this way, the formula (4) showing the relationship of the offset value y and the speed x of the displacement body becomes:

$$y=(x10)^{1/2} \qquad (4)$$

The offset value y is calculated from the speed x of the displacement body at that time using the Formula (4). The offset value y calculated in this way is shown in the graph in FIG. 24(a).

When the icon 55 is depressed as the offset value has a value of 2.00, the offset value is set at 2.00, and the formula expressing the relationship of the offset value y and the speed x of the displacement body becomes:

$$y=(x \cdot 2/5)^{1/2} \qquad (5)$$

The offset value y is calculated from the speed x of the displacement body at that time using the Formula (5). The offset value y calculated in this way is shown in the graph in FIG. 24(b).

In this way, according to embodiment 7, a value which offsets the present position can be regulated suitably depending on a desired use.

Embodiment 8

In embodiments 1 to 7, the display of a present position of a displacement body was described as depending on the speed of the displacement body as an operating condition of the displacement body. At low speeds, the present position is displayed in the center of the screen of the display section 27 and at high speeds the present position is displayed in an extended front display. However it is possible to display the present position of the displacement body in the center of the screen or in extended front display depending on the type of road currently traveled by the displacement body. The map information display device according to embodiment 8 is adapted to vary the level of display of a present position to front extended display depending on a category of road. Those parts of the map information display device according to embodiment 8 which are the same of those of embodiment 1 as shown in the block diagram in FIG. 4 will not be further explained.

The operation of 8 will be outlined below.

When the map information display device is placed in the ON position by operation of the operational section 29, the control section 24 receives information about the speed and bearing of the displacement body and the coordinates (X, Y) of the present position of the displacement body from the position detection section 23. The control section 24 then reads the map mode and map scale used on the last prior occasion from the last memory 28. The control section 24 determines the type road of the road currently traveled on from information of the coordinates (X, Y) of the received presently position. The road on the map is recorded as a composite body of segments called links which are formed from two coordinates called node points in the map memory 25. Each road is stored in respective categories of general roads or high-speed roads.

Figures 25, 26:
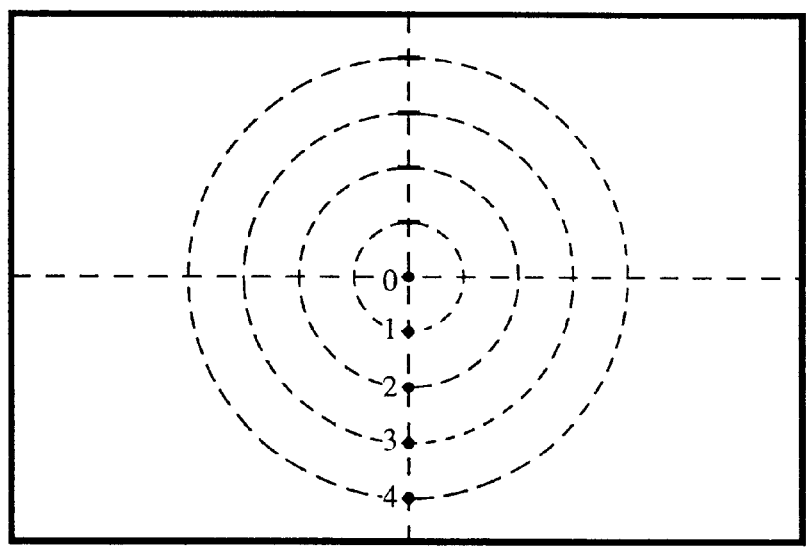
FIG. 25 is an explanatory diagram of an offset value in a map information display device according to an eighth embodiment of the present invention.
FIG. 26 is an explanatory diagram of an offset position according to an eighth embodiment of the present invention.

The determination of road type of a currently traveled road by the control section 24 is performed with reference to the stored data in the map memory 25. FIG. 25 is an explanatory diagram showing an offset value depending on road type of each road. As shown in the FIG. 25, there are five categories of roads from a small street No. 0 to a highway No. 4. Offset values 0–4 are respectively assigned. For example, if the displacement body is currently traveling on a general road, the offset value of 3 is determined based on the road type. The display position of the present position in the display section 27 of offset values obtained in this way is as shown in FIG. 26. That is to say, an offset value of 0 is in the center of the screen. Thereafter figures of 1–4 move concentrically away from the center of the screen in ascending order. The present position of a displacement body currently traveling on a general road is displayed on a circle shown by an offset value of 3.

The control section 24 performs the calculation of the offset position coordinates ($X_1$, $Y_1$) with an offset from the coordinates of the present position (X, Y) of the displacement body on the basis of an offset value of 3 determined by the road type of the currently traveled road. The control section 24 reads map data centering on the offset position coordinates ($X_1$, $Y_1$) from the map memory 25 through the memory drive 26 and displays a map image centering on the offset position coordinates ($X_1$, $Y_1$) in the display device 27. A present position mark is displayed by a triangular mark which can discriminate the direction of travel at the present position coordinates (X, Y) on the display screen.

The screen which is displayed on the display device 27 is the same as that in the first embodiment and will not be further explained.

Figure 27:
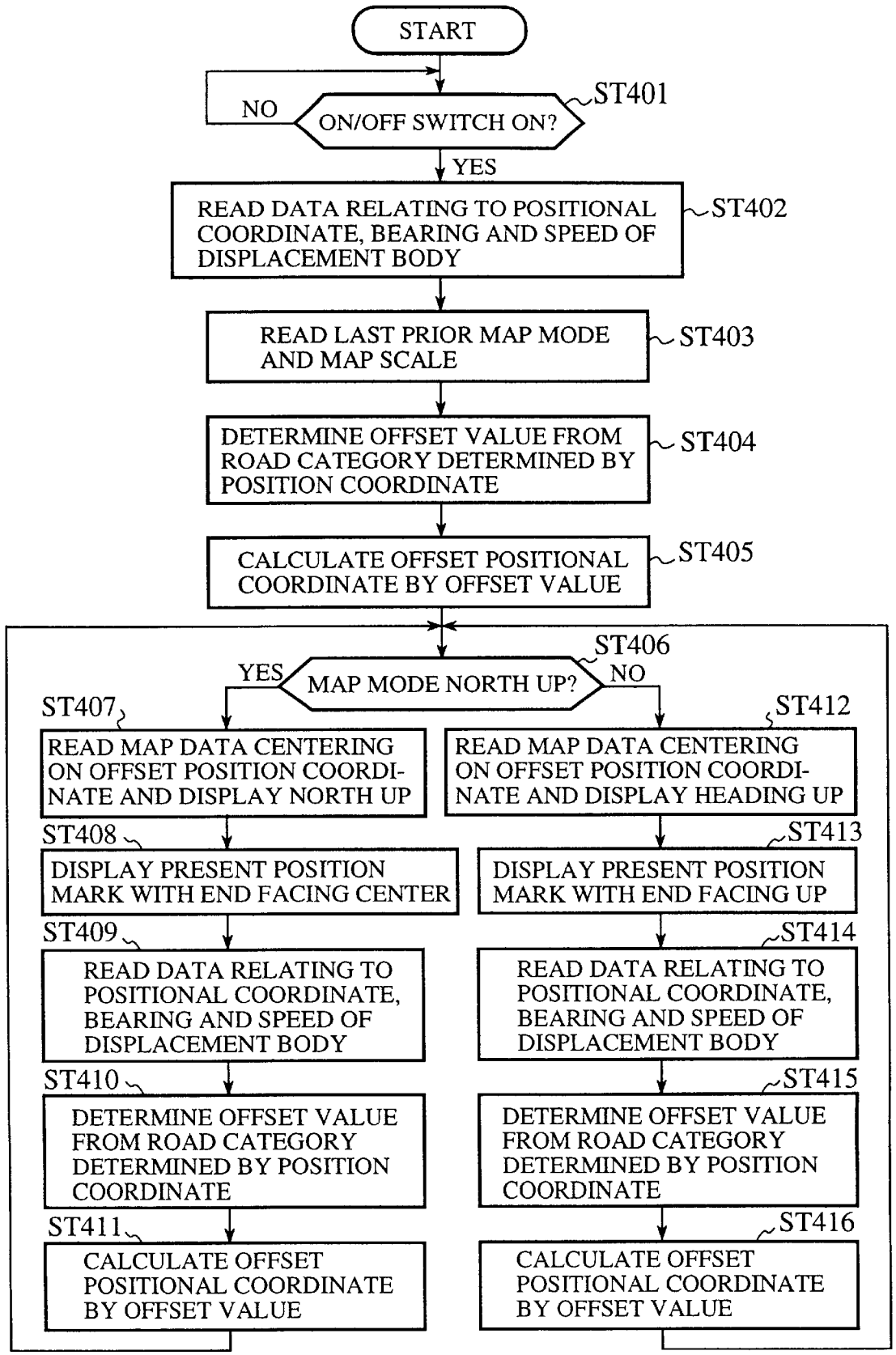
FIG. 27 is a flowchart showing the basic operation of a control section according to an eighth embodiment of the present invention.

FIG. 27 is a flowchart showing the basic operation of the control section 24. The operation of the eighth embodiment will be explained below with reference to the flowchart in FIG. 27.

The control section 24 detects the fact that the ON/OFF switch of the operational section 29 has been placed in the ON position (step ST401). First the control section 24 reads data relating to the speed, bearing and position coordinates (X, Y) of the displacement body from the position detection section 23 (step ST402). The map mode and map scale on the last prior time the ON/OFF switch 33 was placed in the OFF position is read from the last memory 28 (step ST403).

Then the road type of the road currently traveled on by the displacement body is determined from the read position coordinates (X, Y) of the displacement body and an offset value is determined from the road type (step ST404). Data of road type is stored in the map memory 25 corresponding to each stored road as a composite body of segments which are formed from two node coordinates in the map memory 25. The currently traveled road type is determined by reference to the contents of the map memory 25 based on the position coordinate data (X, Y) of the displacement body. The offset value is determined by corresponding the road type and the offset value as shown in FIG. 25 based on the present road type.

Thereafter the offset position coordinates ($X_1$, $Y_1$) are calculated from the offset value (step ST405). Next it is determined whether or not the map mode read from the map memory 28 is north up (step ST406).

When the result of this determination is that the map mode is north up, map data centering on the offset coordinates ($X_1$, $Y_1$) are read from the map memory 25. On this basis, a map image is displayed with north up on the display section 27 (step ST407). The present position mark on the map image is displayed so that the end of the triangle which shows the direction of travel faces the center of the screen of the display device 27 (step ST408).

Speed data, bearing data and position coordinate data (X, Y) of the displacement body is read again from the position detection section 23 (step ST409). The road type of the currently traveled road is determined and an offset value is determined based on the road type (step ST410).

The offset position coordinates ($X_1$, $Y_1$) are calculated from the offset value (step ST411). Thereafter the routine returns to the step ST406 and an offset display of the present position is performed in north up mode depending on road type of the currently traveled road by re-executing the above process.

When the result of the determination in step ST406 is that the map mode is in heading up mode, map data centering on offset position coordinates ($X_1$, $Y_1$) calculated in step ST405 are read from the map memory 25. On that basis, the map image is displayed on the display device 27 with the direction of travel at the top (step ST412). The present position mark is displayed on the map image so that the end of the triangle which shows the direction of travel is facing up (step ST413). Speed data, bearing data and position coordinate data (X, Y) are read again from the position detection section 23 (step ST414). Next the type of the current traveled road is determined and an offset value is determined from the road type (step ST415).

The offset position coordinates ($X_1$, $Y_1$) are calculated from the offset coordinates (step ST416). Thereafter the routine returns to the step ST406 and offset display of the present position is performed depending on the road type of the currently traveled road in heading up mode by re-executing the above process.

In this way, according to embodiment 8, the level of displaying in front extended display is varied on the basis of road type of the currently traveled road by the national standards of highway, national road and prefectural road. Thus it is possible to supply a suitable map screen which is matched to operational conditions in which the driver can reduce the level of front extended display when traveling on small streets with large levels of variation in the route such as left or right turnings or can increase the level of front extended display when traveling on high speed roads without variation in the route and with respect to which information further forward it necessary.

Embodiment 9

Figures 28, 29:
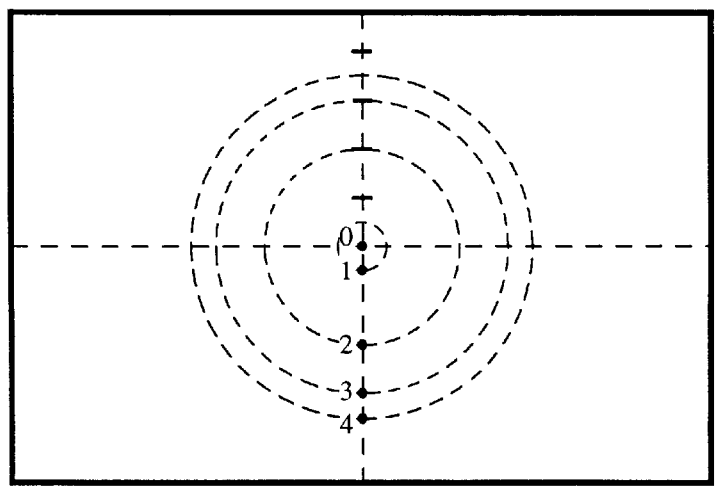
FIG. 28 is an explanatory diagram of the set screen of an offset value in a map information display device according to a ninth embodiment of the present invention.
FIG. 29 is an explanatory diagram of an offset position according to a ninth embodiment of the present invention.

In embodiment 8, an offset value which offsets a present position was determined on the basis of road type. However it is possible to set an offset value arbitrarily by an operation of the driver. FIG. 28 is an explanatory diagram of the set screen of an offset value in a map information display device according to a ninth embodiment of the present invention. FIG. 29 is an explanatory diagram of an offset position according to a ninth embodiment of the present invention. Those elements of FIG. 28 which are the same as those in FIG. 13 are designated with the same reference numerals and will not be further described.

As shown in FIG. 28, an icon 53 for increasing the offset value for each road type and an icon 54 for decreasing the value are separately prepared. An offset value with a default of 0.00–4.00 can be separately varied by depressing the corresponding icon 53 or 54. After varying the offset value and setting and depressing the icon 55, as shown in FIG. 29, the offset distance comprises respective values on concentric circles.

As shown above according to embodiment 9, since it is possible to set each offset value separately to each road type, it is possible to regulate the offset value of the present position appropriately depending on a use purpose.

Embodiment 10

In embodiment 8, the level of front extended display of a present position of a displacement body was described as depending on road type as an attribute of the road currently traveled. However the present position may be displayed in the center of the screen of the display section 27 or displayed in an extended front display depending on the speed limit of the road taken as a road attribute. The map information display device according to embodiment 10 is described below. Those parts of the map information display device according to embodiment 10 which are the same of those of embodiment 1 as shown in the block diagram in FIG. 4 will not be further explained.

The operation of embodiment 10 will be outlined below.

When the map information display device is placed in the ON position by operation of the operational section 29, the control section 24 receives information about the speed and bearing of the displacement body and the coordinates (X, Y) of the present position of the displacement body from the position detection section 23. The control section 24 then reads the map mode and map scale used on the last prior occasion from the last memory 28. The control section 24 determines the speed limit of the road currently traveled on from information of the coordinates (X, Y) of the received present position. The road on the map is recorded as a composite body of segments called links which are formed from two coordinates called node points in the map memory 25. Each road is recorded with respect to speed limits of 40 km/h or 50 km/h.

Figures 30, 31:
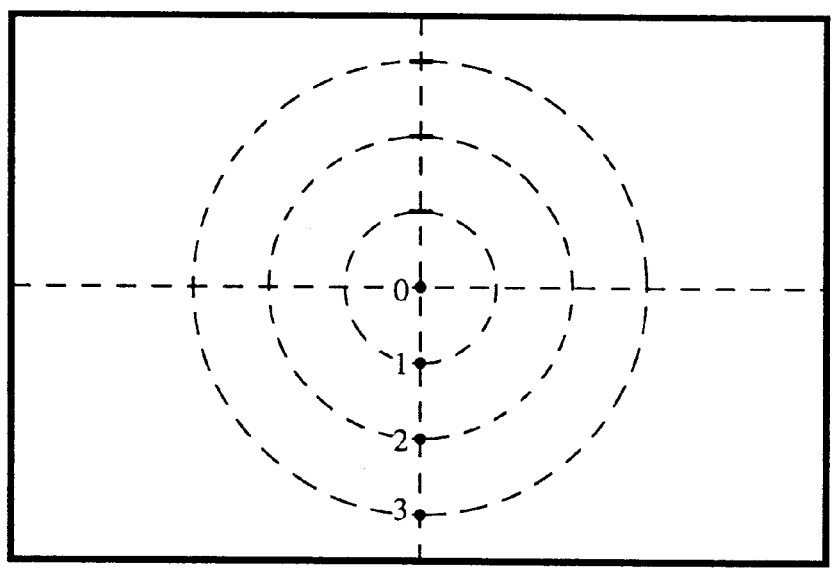
FIG. 30 is an explanatory diagram of an offset value according to a ninth embodiment of the present invention.
FIG. 31 is an explanatory diagram of an offset position according to a tenth embodiment of the present invention.

The determination of speed limit of a currently traveled road by the control section 24 is performed with reference to the stored data in the map memory 25. FIG. 30 is an explanatory diagram showing an offset value depending on a speed limit of each road. As shown in the FIG. 30, there are four categories of speed limit from No. 0 of under 30 km/h to No. 3 of more than or equal to 60 km/h. Offset values 0–3 are respectively assigned. For example, if the displacement body is currently traveling on a road with a speed limit of 50 km/h, the offset value of 2 is determined based on the speed limit. The display position of the present position in the display section 27 of offset values obtained in this way is as shown in FIG. 31. That is to say, an offset value of 0 is in the center of the screen. Thereafter figures of 1–3 move concentrically away from the center of the screen in ascending order. The present position of a displacement body currently traveling on a road with a speed limit of 50 km/h is displayed on a circle shown by an offset value of 2.

The control section 24 performs the calculation of the offset position coordinates ($X_1$, $Y_1$) with an offset from the coordinates of the present position (X, Y) of the displacement body on the basis of an offset value of 2 determined by the speed limit of the currently traveled road. The control section 24 reads map data centering on the offset position coordinates ($X_1$, $Y_1$) from the map memory 25 through the memory drive 26 and displays a map image centering on the offset position coordinates ($X_1$, $Y_1$) in the display device 27. A present position mark is displayed by a triangular mark which can discriminate the direction of travel at the present position coordinates (X, Y) on the display image.

The screen which is displayed on the display device 27 is the same as that in the first embodiment and will not be further explained.

Figure 32:
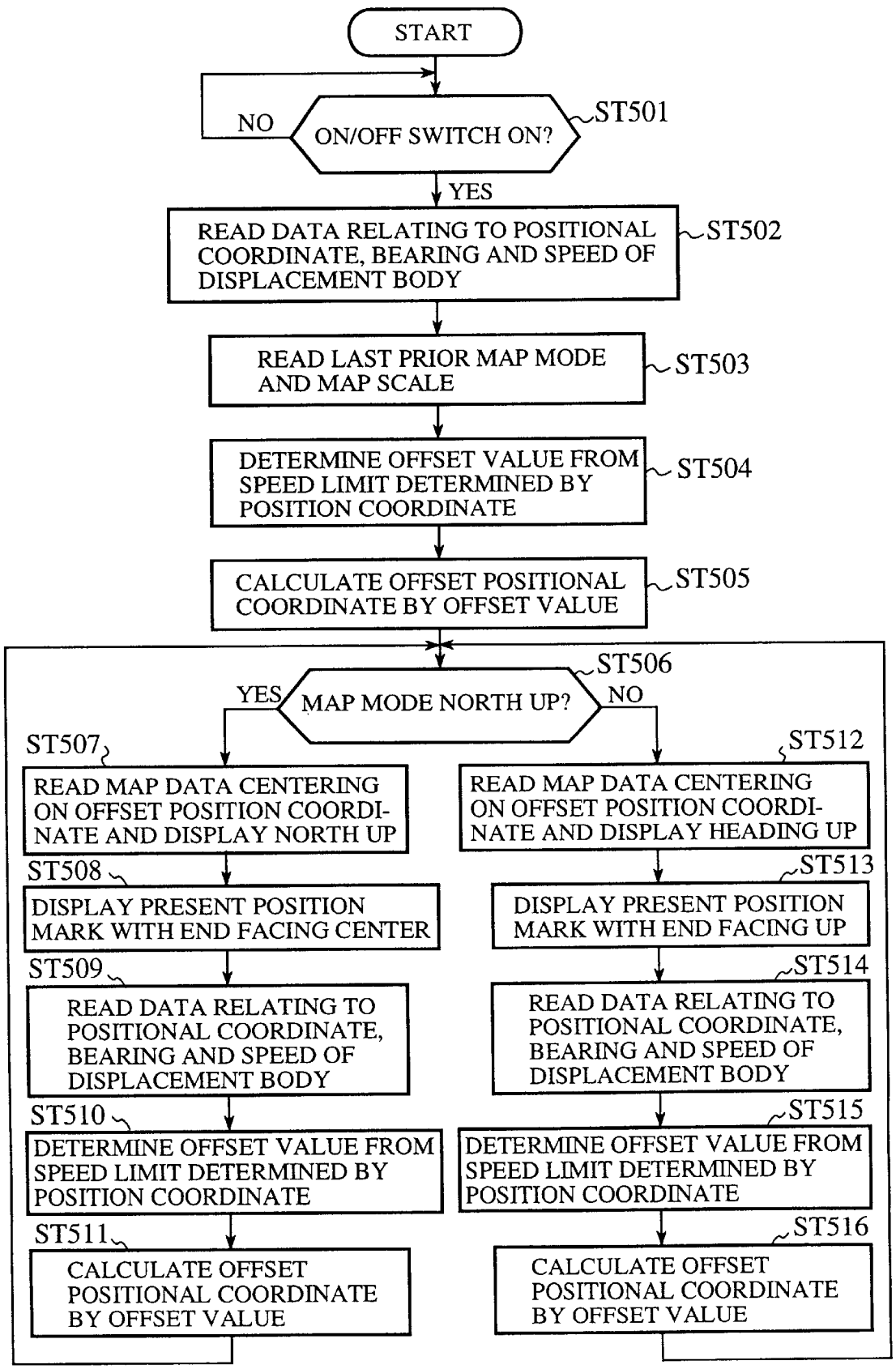
FIG. 32 is a flowchart showing the basic operation of a control section according to a tenth embodiment of the present invention.

FIG. 32 is a flowchart showing the basic operation of the control section 24. The operation of the tenth embodiment will be explained below with reference to the flowchart in FIG. 32.

The control section 24 detects the fact that the ON/OFF switch of the operational section 29 has been placed in the ON position (step ST501). First the control section 24 reads data relating to the speed, bearing and position coordinates (X, Y) of the displacement body from the position detection section 23 (step ST502). The map mode and map scale on the last prior time the ON/OFF switch 33 was placed in the OFF position is read from the last memory 28 (step ST503).

Then the speed limit of the road currently traveled on by the displacement body is determined from the read position coordinates (X, Y) of the displacement body and an offset value is determined from the speed limit (step ST504). Data of speed limits are stored in the map memory 25 corresponding to each stored road. The speed limit of the currently traveled road is determined by reference to the contents of the map memory 25 based on the position coordinate data (X, Y) of the displacement body. The offset value is determined corresponding to the offset value and the road type shown in FIG. 30 based on the speed limit.

Thereafter the offset position coordinates $(X_1, Y_1)$ are calculated from the offset value (step ST505). Next it is determined whether or not the map mode read from the map memory 28 is north up (step ST506).

When the result of this determination is that the map mode is north up, map data centering on the offset coordinates $(X_1, Y_1)$ are read from the map memory 25. On this basis, a map image is displayed with north up on the display section 27 (step ST507). The present position mark on the map image is displayed so that the end of the triangle which shows the direction of travel faces the center of the screen of the display device 27 (step ST508). Speed data, bearing data and position coordinate data (X, Y) is read again from the position detection section 23 (step ST509). The currently traveled road and its speed limit are determined and an offset value is determined based on the speed limit (step ST510).

The offset position coordinates $(X_1, Y_1)$ are calculated from the offset coordinates (step ST511). Thereafter the routine returns to the step ST 506 and an offset display of the present position is performed in north up mode depending on road type of the currently traveled road by re-executing the above process.

When the result of the determination in step ST506 is that the map mode is in heading up mode, map data centering on offset position coordinates $(X_1, Y_1)$ calculated in step ST505 are read from the map memory 25. On that basis, the map image is displayed on the display device 27 with the direction of travel at the top (step ST512). The present position mark is displayed on the map image so that the end of the triangle which shows the direction of travel is facing up (step ST513). Speed data, bearing data and position coordinate data (X, Y) is read again from the position detection section 23 (step ST514). Next the current traveled road and its speed limit are determined and an offset value is determined from the speed limit (step ST515).

The offset position coordinates $(X_1, Y_1)$ are calculated from the offset value (step ST516). Thereafter the routine returns to the step ST 506 and offset display of the present position is performed depending on the speed limit of the currently traveled road in heading up mode by re-executing the above process.

In this way, according to embodiment 10, the level of displaying in front extended display is varied on the basis of the speed limit of the currently traveled road. Thus the driver can recognize map information in a range further forward when traveling on a road with a high speed limit than when traveling on a road with a low speed limit. The driver can recognize speed limits by merely looking at the map displayed on the screen. Thus it is possible to maintain road rules and determine a likely displacement body speed from the speed limit. Furthermore it is possible to control front extended display depending on displacement body speed.

Embodiment 11

Figure 33:
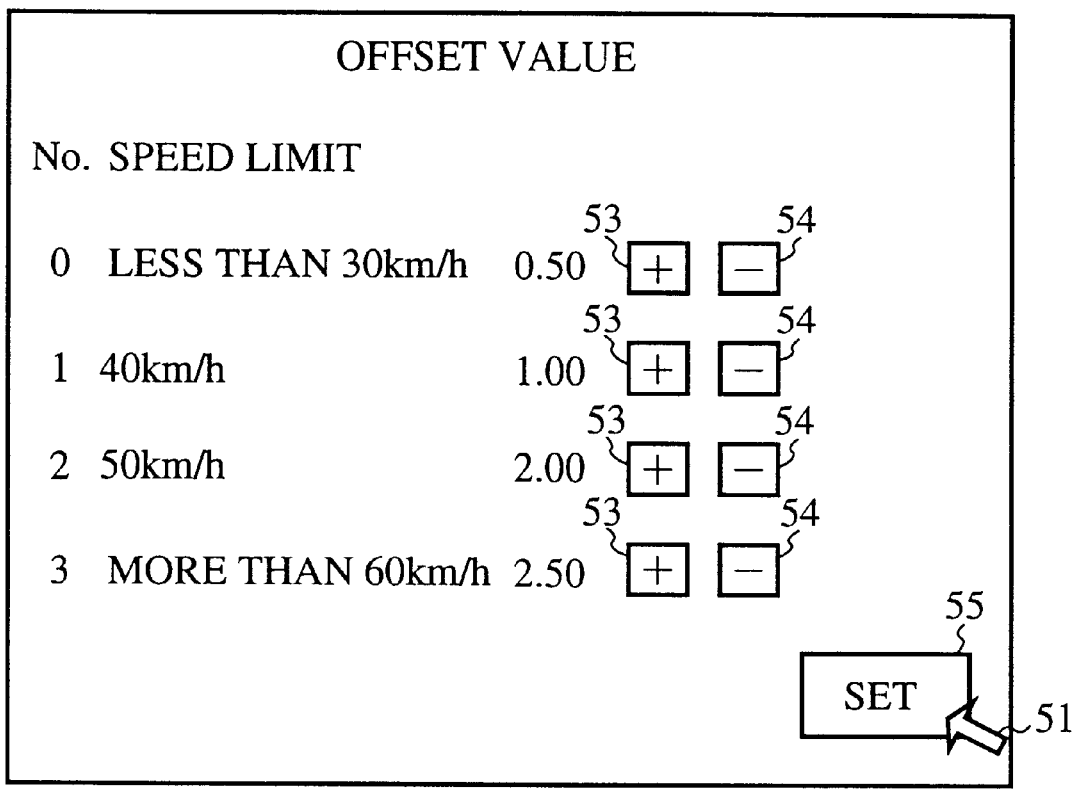
FIG. 33 is an explanatory diagram of the set screen of an offset value in a map information display device according to an eleventh embodiment of the present invention.
Figure 34:
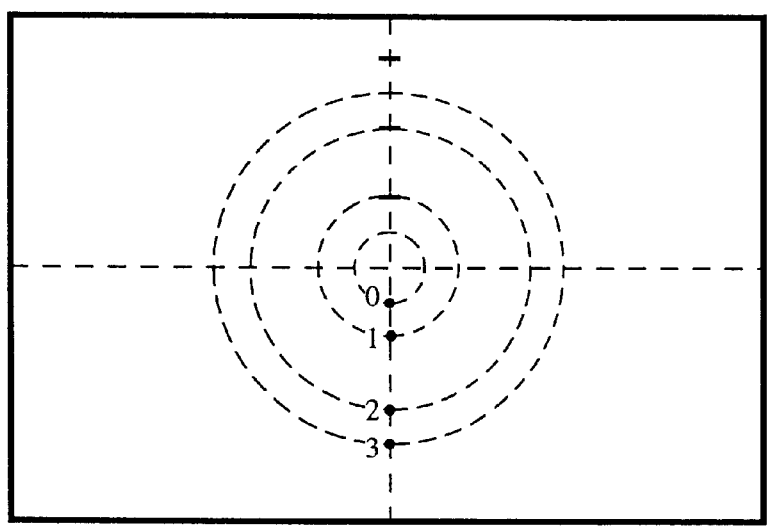
FIG. 34 is an explanatory diagram of an offset position according to an eleventh embodiment of the present invention.

In embodiment 10, an offset value which offsets a present position was determined on the basis of a speed limit of a currently traveled road. However it is possible to set an offset value arbitrarily by an operation of the driver. FIG. 33 is an explanatory diagram of the set screen of an offset value in a map information display device according to an eleventh embodiment of the present invention. FIG. 34 is an explanatory diagram of an offset position according to an eleventh embodiment of the present invention. Those elements of FIG. 33 which are the same as those in FIG. 13 are designated with the same reference numerals and will not be described further.

As shown in FIG. 33, an icon 53 for increasing the offset value for each road type and an icon 54 for decreasing the value are separately prepared. An offset value with a default of 0.00–3.00 can be separately varied by depressing the corresponding icon 53 or 54. After varying the offset value, it is set by depressing the icon 55, as shown in FIG. 34, and thus the offset distance comprises respectively set values on concentric circles.

As shown above according to embodiment 11, since it is possible to set each offset value separately to each speed limit, it is possible to regulate the offset value of the present position appropriately depending on a use purpose Embodiment 12

In embodiment 8, the level of front extended display of a present position of a displacement body was described as depending on road type as an attribute of the road currently traveled. In embodiment 10, the level of front extended display of a present position of a displacement body was described as depending a speed limit. However the present position may be displayed in the center of the screen of the display section 27 or displayed in an extended front display depending on the width of the road taken as a road attribute. The map information display device according to embodiment 12 is described below. Those parts of the map information display device according to embodiment 12 which are the same of those of embodiment 1 as shown in the block diagram in FIG. 4 will not be further explained.

The operation of embodiment 12 will be outlined below.

When the map information display device is placed in the ON position by operation of the operational section 29, the control section 24 receives information about the speed and bearing of the displacement body and the coordinates (X, Y) of the present position of the displacement body from the position detection section 23. The control section 29 then reads the map mode and map scale used on the last prior occasion from the last memory 28. The control section 24 determines the speed limit of the road currently traveled on from information of the coordinates ('X, Y) of the received present position. The road on the map is recorded as a composite body of segments called links which are formed from two coordinates called node points in the map memory 25. Each road is recorded with respect to road widths of less than 3 m or more than or equal to 3 m and less than 4 m.

Figures 35, 36:
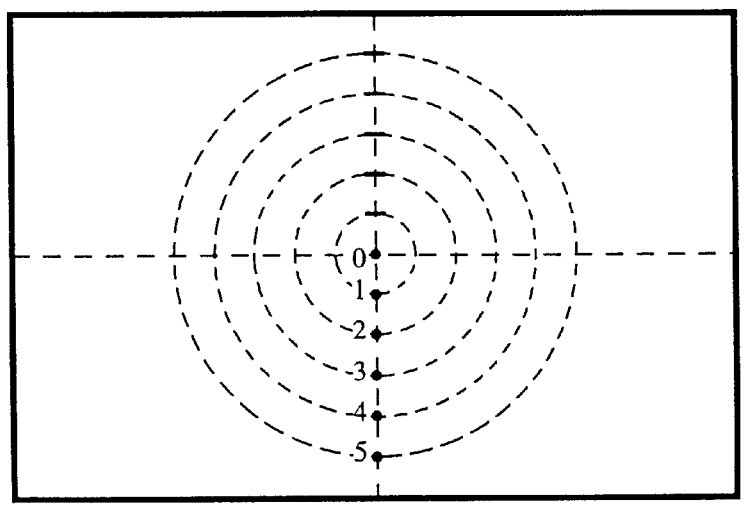
FIG. 35 is an explanatory diagram of an offset value in a map information display device according to a twelfth embodiment of the present invention.
FIG. 36 is an explanatory diagram of an offset position according to an twelfth embodiment of the present invention.

The determination of speed limit of a currently traveled road by the control section 24 is performed with reference to the stored data in the map memory 25. FIG. 35 is an explanatory diagram showing an offset value depending on width of each road. As shown in the FIG. 35, there are six categories of width from No. 0 of less than 3 m to No. 5 of more than 7 m. Offset values 0–5 are respectively assigned. For example, if the displacement body is currently traveling on a road with a width of more than or equal to 4 m and less than 5 m, the offset value of 2 is determined based on the width. The display position of the present position in the display section 27 of offset values obtained in this way is as shown in FIG. 36. That is to say, an offset value of 0 is in the center of the screen. Thereafter values of 1–5 move concentrically away from the center of the screen in ascending order. The present position of a displacement body currently traveling on a road with a width of more than or equal to 4 m and less than 5 m is displayed on a circle shown by an offset value of 2.

The control section 24 performs the calculation of the offset position coordinates $(X_1, Y_1)$ with an offset from the coordinates of the present position (X, Y) of the displacement body on the basis of an offset value of 2 determined by the width of the currently traveled road. The control section 24 reads map data centering on the offset position coordinates $(X_1, Y_1)$ from the map memory 25 through the memory drive 26 and displays a map image centering on the offset position coordinates $(X_1, Y_1)$ in the display device 27. A present position mark is displayed by a triangular mark which can discriminate the direction of travel at the present position coordinates (X, Y) on the display image.

The screen which is displayed on the display device 27 is the same as that in the first embodiment and will not be further explained.

Figure 37:
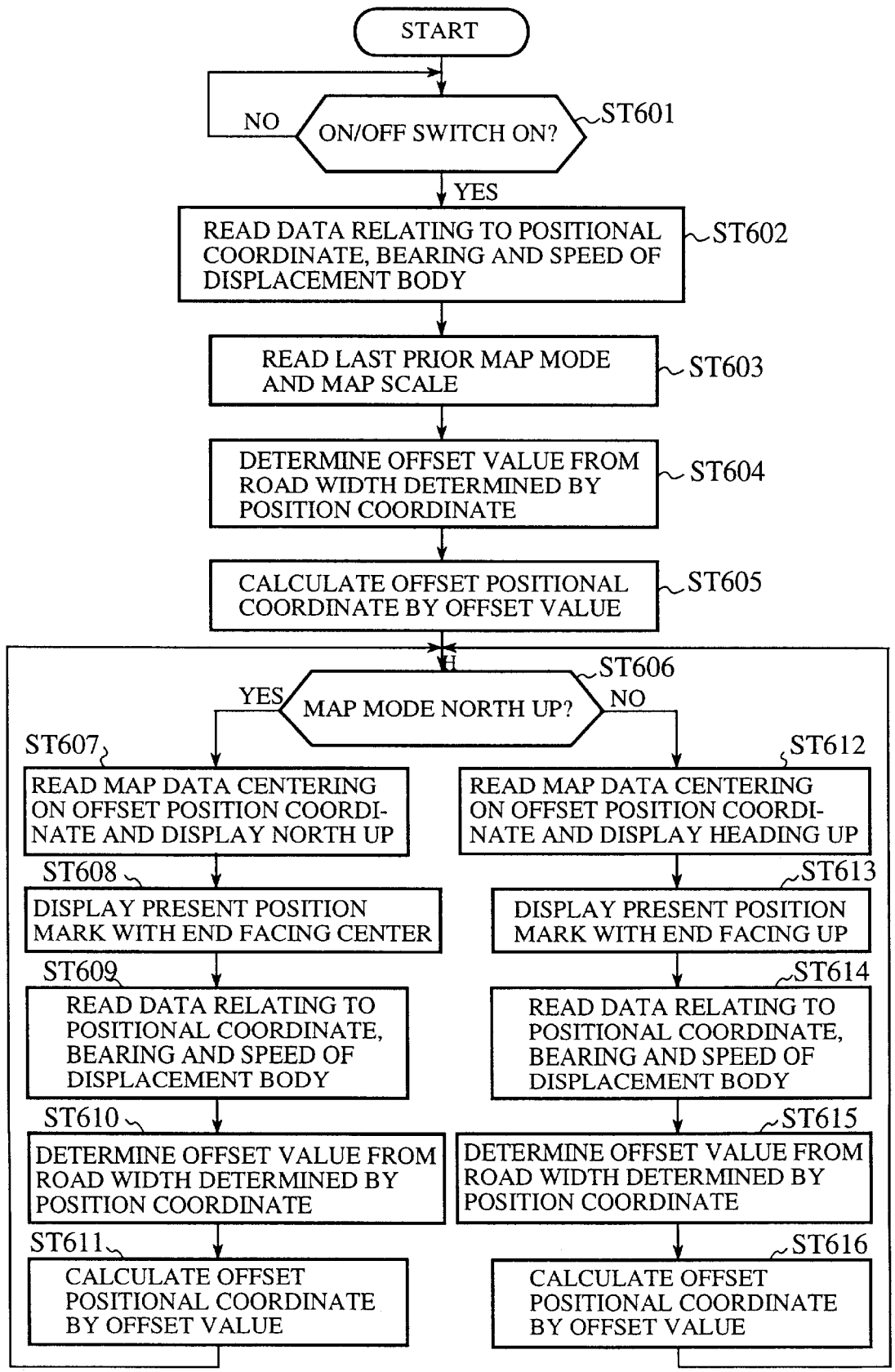
FIG. 37 is a flowchart showing the basic operation of a control section according to a twelfth embodiment of the present invention.

FIG. 37 is a flowchart showing the basic operation of the control section 24. The operation of the twelfth embodiment will be explained below with reference to the flowchart in FIG. 37.

The control section 24 detects the fact that the ON/OFF switch of the operational section 29 has been placed in the ON position (step ST601). First the control section 24 reads data relating to the speed, bearing and position coordinates (X, Y) of the displacement body from the position detection section 23 (step ST602). The map mode and map scale on the last prior time the ON/OFF switch 33 was placed in the OFF position is read from the last memory 28 (step ST603).

Then the width of the road currently traveled on by the displacement body is determined from the read position coordinates (X, Y) of the displacement body and an offset value is determined from the width (step ST604). Data of widths are stored in the map memory 25 corresponding to each stored road. The width of the currently traveled road is determined by reference to the contents of the map memory 25 based on the position coordinate data (X, Y) of the displacement body. The offset value is determined corresponding to the offset value and the road type shown in FIG. 35 based on the width.

Thereafter the offset position coordinates $(X_1, Y_1)$ are calculated from the offset value (step ST605). Next it is determined whether or not the map mode read from the map memory 28 is north up (step ST606).

When the result of this determination is that the map mode is north up, map data centering on the offset coordinates $(X_1, Y_1)$ are read from the map memory 25. On this basis, a map image is displayed with north up on the display section 27 (step ST607). The present position mark on the map image is displayed so that the end of the triangle which shows the direction of travel faces the center of the screen of the display device 27 (step ST608). Speed data, bearing data and position coordinate data (X, Y) is read again from the position detection section. 23 (step ST609). The width of the currently traveled road is determined and an offset value is determined based on the road width (step ST610).

The offset position coordinates $(X_1, Y_1)$ are calculated from the offset coordinates (step ST611). Thereafter the routine returns to the step ST 606 and an offset display of the present position is performed in north up mode depending on road type of the currently traveled road by re-executing the above process.

When the result of the determination in step ST606 is that the map mode is in heading up mode, map data centering on offset position coordinates $(X_1, Y_1)$ calculated in step ST605 are read from the map memory 25. On that basis, the map image is displayed on the display device 27 with the direction of travel at the top (step ST612). The present position mark is displayed on the map image so that the end of the triangle which shows the direction of travel is facing up (step ST613). Speed data, bearing data and position coordinate data (X, Y) is read again from the position detection section 23 (step ST614). Next the width of the current traveled road and its width are determined and an offset value is determined from the road type (step ST515).

The offset position coordinates $(X_1, Y_1)$ are calculated from the offset coordinates (step ST616). Thereafter the routine returns to the step ST 606 and offset display is performed depending on the width of the currently traveled road in heading up mode by re-executing the above process.

In this way, according to embodiment 12, the level of displaying in front extended display is varied on the basis of the width of the currently traveled road. Thus the driver can recognize map information in a range further forward when traveling on a road with a wide width than when traveling on a road with a narrow width. The driver can determine a likely displacement body speed from the road width and can determine the amount of change in the road such as left and right turns.

Embodiment 13

Figures 38, 39:
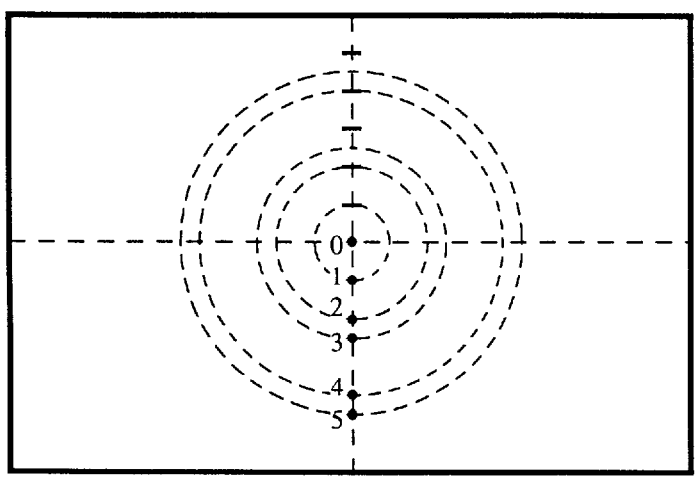
FIG. 38 is an explanatory diagram of the set screen of an offset value in a map information display device according to a thirteenth embodiment of the present invention.
FIG. 39 is an explanatory diagram of an offset position according to a thirteenth embodiment of the present invention.

In embodiment 12, an offset value which offsets a present position was determined on the basis of a width of a currently traveled road. However it is possible to set an offset value arbitrarily by an operation of the driver. FIG. 38 is an explanatory diagram of the set screen of an offset value in a map information display device according to an thirteenth embodiment of the present invention. FIG. 39 is an explanatory diagram of an offset position according to an thirteenth embodiment of the present invention. Those elements of FIG. 38 which are the same as those in FIG. 13 are designated with the same reference numerals and will not be further described.

As shown in FIG. 38, an icon 53 for increasing the offset value for each road type and an icon 54 for decreasing the value are separately prepared. Offset values with a default of 0.00–5.00 can be separately varied by depressing the corresponding icon 53 or 54. After varying the offset value, it is set by depressing the icon 55, as shown in FIG. 39, thus the offset distance comprises respectively set values on concentric circles.

As shown above according to embodiment 13, since it is possible to set each offset value separately to each width, it is possible to regulate the offset value of the present position appropriately depending on a use purpose.

Embodiment 14

In embodiment 8, the level of front extended display of a present position of a displacement body was described as depending on road type as an attribute of the road currently traveled. In embodiment 12, the level of front extended display of a present position of a displacement body was described as depending on a road width. However the present position may be displayed in the center of the screen of the display section 27 or displayed in an extended front display depending on the lane number of the road taken as a road attribute. The map information display device according to embodiment 14 is described below. Those parts of the map information display device according to embodiment 14 which are the same of those of embodiment 1 as shown in the block diagram in FIG. 4 will not be further explained.

The operation of embodiment 14 will be outlined below.

When the map information display device is placed in the ON position by operation of the operational section 29, the control section 24 receives information about the speed and bearing of the displacement body and the coordinates (X, Y)

of the present position of the displacement body from the position detection section 23. The control section 29 then reads the map mode and map scale used on the last prior occasion from the last memory 28. The control section 24 determines the number of lanes of the road currently traveled on from information of the coordinates (X, Y) of the received present position. The road on the map is recorded as a composite body of segments called links which are formed from two coordinates called node points in the map memory 25. Each road is recorded with respect to lane numbers of one lane in one direction, two lanes in one direction and so on.

Figures 40, 41:
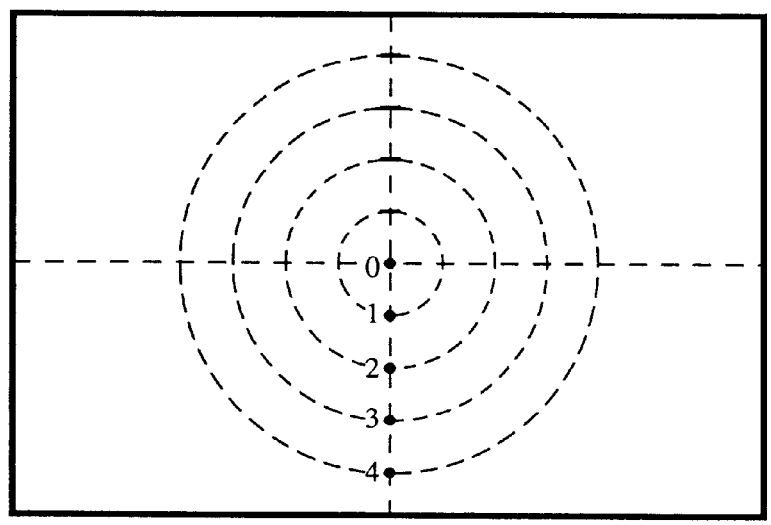
FIG. 40 is an explanatory diagram of an offset value in a map information display device according to a fourteenth embodiment of the present invention.
FIG. 41 is an explanatory diagram of an offset position in a map information display device according to a fourteenth embodiment of the present invention.

The determination of lane number of a currently traveled road by the control section 24 is performed with reference to the stored data in the map memory 25. FIG. 40 is an explanatory diagram showing an offset value depending on a lane number of each road. As shown in the FIG. 40, there are five categories of lane number from No. 0 of a two-lane road to No. 4 of four lanes or more in one direction. Offset values 0–4 are respectively assigned. For e example, if the displacement body is currently traveling on a road with a lane number of two lanes in one direction, the offset value of 2 is determined based on the lane number. The display position of the present position in the display section 27 of offset values obtained in this way is as shown in FIG. 41. That is to say, an offset value of 0 is in the center of the screen. Thereafter values of 1–4 move concentrically away from the center of the screen in ascending order. The present position of a displacement body currently traveling on a road with a lane number of two lanes in one direction is displayed on a circle shown by an offset value of 2.

The control section 24 performs the calculation of the offset position coordinates ($X_1$, $Y_1$) with an offset from the coordinates of the present position (X, Y) of the displacement body on the basis of an offset value of 2 determined by the lane number of the currently traveled road. The control section 24 reads map data centering on the offset position coordinates ($X_1$, $Y_1$) from the map memory 25 through the memory drive 26 and displays a map image centering on the offset position coordinates ($_1$, $Y_1$) in the display device 27. A present position mark is displayed by a triangular mark which can discriminate the direction of travel at the present position coordinates (X, Y) on the display image.

The screen which is displayed on the display device 27 is the same as that in the first embodiment and will not be further explained.

Figure 42:
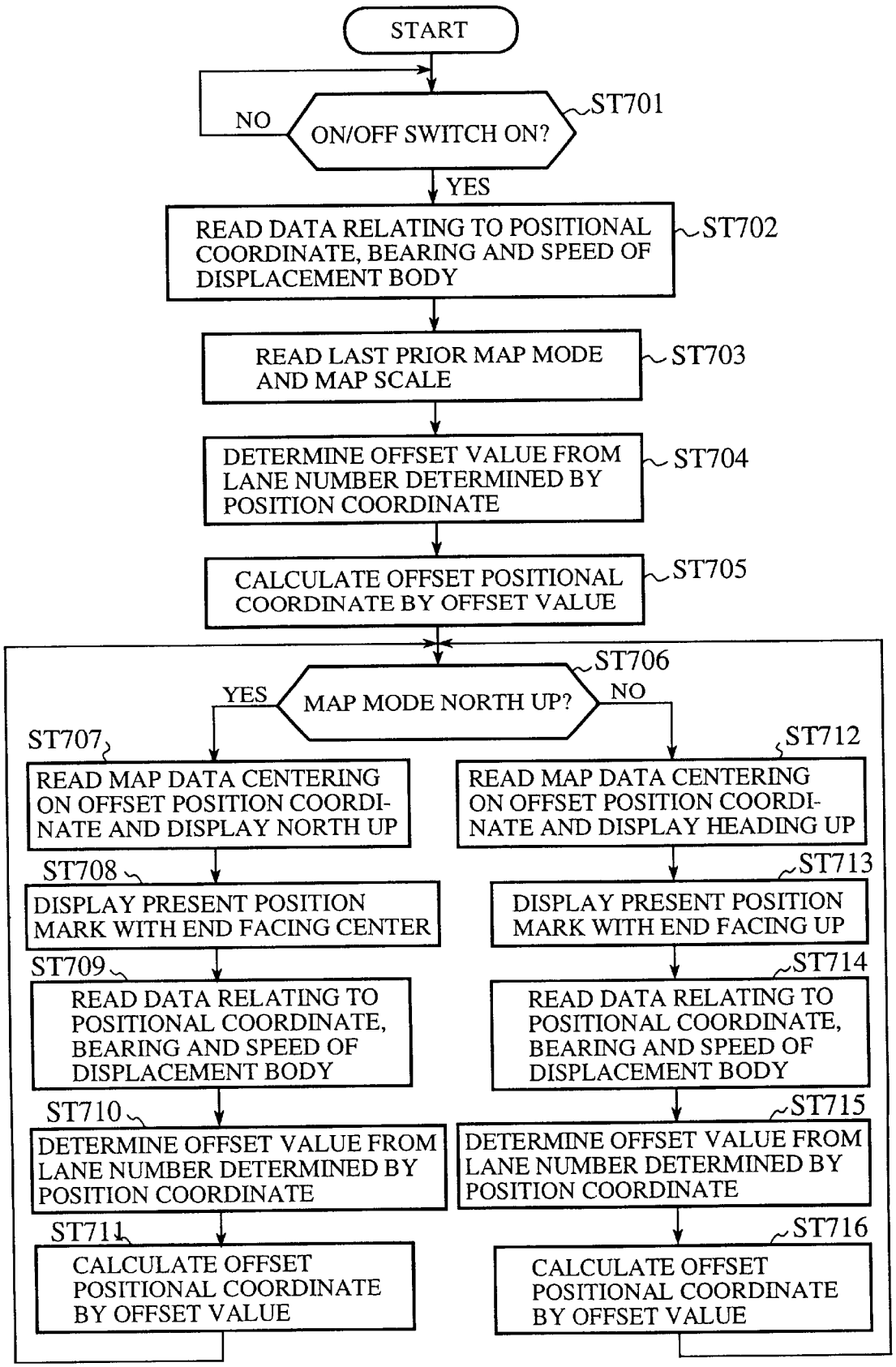
FIG. 42 is a flowchart showing the basic operation of a control section according to a fourteenth embodiment of the present invention.

FIG. 42 is a flowchart showing the basic operation of the control section 24. The operation of the fourteenth embodiment will be explained below with reference to the flowchart in FIG. 42.

The control section 24 detects the fact that the ON/OFF switch of the operational section 29 has been placed in the ON position (step ST701).

First the control section 24 reads data relating to the speed, bearing and position coordinates (X, Y) of the displacement body from the position detection section 23 (step ST702). The map mode and map scale on the last prior time the ON/OFF switch 33 was placed in the OFF position is read from the last memory 28 (step ST703).

Then the road currently traveled on and its lane number is determined from the read position coordinates (X, Y) of the displacement body and an offset value is determined from the width (step ST704). Data for lane number of each road are stored in the map memory 25 corresponding to each road. The lane number of the currently traveled road is determined by reference to the contents of the map memory 25 based on the position coordinate data (X, Y) of the displacement body. The offset value is determined corresponding to the offset value and the road width shown in FIG. 40 based on the number of lanes.

Thereafter the offset position coordinates ($X_1$, $Y_1$) are calculated from the offset value (step ST705). Next it is determined whether or not the map mode read from the map memory 28 is north up (step ST706).

When the result of this determination is that the map mode is north up, map data centering on the offset coordinates ($X_1$, $Y_1$) are read from the map memory 25. On this basis, a map image is displayed with north up on the display section 27 (step ST707). The present position mark on the map image is displayed so that the end of the triangle which shows the direction of travel faces the center of the screen of the display device 27 (step ST708). Speed data, bearing data and position coordinate data (X, Y) is read again from the position detection section 23 (step ST709). The lane number of the currently traveled road is determined and an offset value is determined based on the width (step ST710).

The offset position coordinates ($X_1$, $Y_1$) are calculated from the offset coordinates (step ST711). Thereafter the routine returns to the step ST 706 and an offset display of the present position is performed in north up mode depending on lane number of the currently traveled road by re-executing the above process.

When the result of the determination in step ST706 is that the map mode is in heading up mode, map data centering on offset position coordinates ($X_1$, $Y_1$) calculated in step ST705 are read from the map memory 25. On that basis, the map image is displayed on the display device 27 with the direction of travel at the top (step ST712). The present position mark is displayed on the map image so that the end of the triangle which shows the direction of travel is facing up (step ST713). Speed data, bearing data and position coordinate data (X, Y) is read again from the position detection section 23 (step ST714). Next the currently traveled road and it lane number are determined and an offset value is determined from the lane number (step ST715).

The offset position coordinates ($X_1$, $Y_1$) are calculated from the offset coordinates (step ST716). Thereafter the routine returns to the step ST706 and offset display is performed depending on the lane number of the currently traveled road in heading up mode by re-executing the above process.

In this way, according to embodiment 14, the level of displaying in front extended display is varied on the basis of the lane number of the currently traveled road. Thus the driver can recognize map information in a range further forward when traveling on a road with a high lane number than when traveling on a road with a low lane number.

Embodiment 15

Figure 43:
FIG. 43 is an explanatory diagram of the set screen of an offset value in a map information display device according to a fifteenth embodiment of the present invention.
Figure 44:
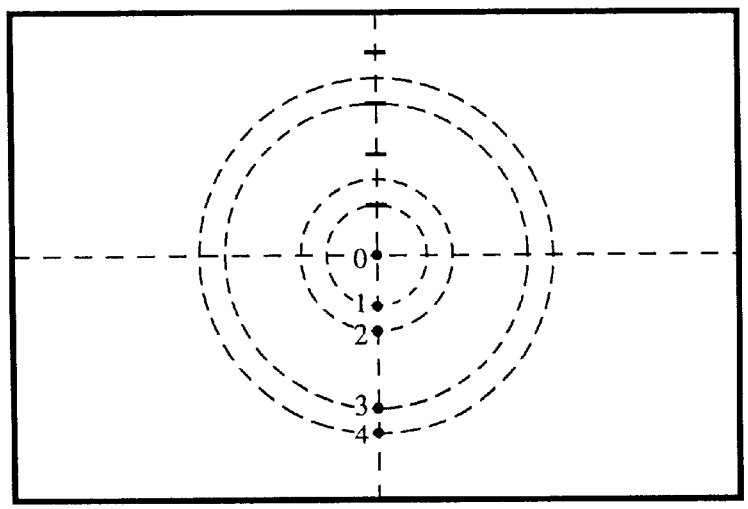
FIG. 44 is an explanatory diagram of an offset position according to a fifteenth embodiment of the present invention.

In embodiment 14, an offset value which offsets a present position was determined on the basis of a lane number of a currently traveled road. However it is possible to set an offset value arbitrarily by an operation of the driver. FIG. 43 is an explanatory diagram of the set screen of an offset value in a map information display device according to a fifteenth embodiment of the present invention. FIG. 44 is an explanatory diagram of an offset position according to an fifteenth embodiment of the present invention. Those elements of FIG. 43 which are the same as those in FIG. 13 are designated with the same reference numerals and will not be further described.

As shown in FIG. 43, an icon 53 for increasing the offset value for each road type and an icon 54 for decreasing the value are separately prepared. An offset value with a default of 0.00–4.00 can be separately varied by depressing the corresponding icon 53 or 54. After varying the offset value and setting and depressing the icon 55, as shown in FIG. 44, the offset distance comprises respective values on concentric.

As shown above according to embodiment 15, since it is possible to set each offset value separately to each lane number, it is possible to regulate the offset value of the present position appropriately depending on a use purpose.

Embodiment 16

In embodiment 8, the level of front extended display of a present position of a displacement body was described as depending on road type as an attribute of the road currently traveled. In embodiment 12, the level of front extended display of a present position of a displacement body was described as depending on road width as a road attribute. In embodiment 14, the level of front extended display of a present position of a displacement body was described as depending on a lane number. However the present position may be displayed in the center of the screen of the display section 27 or displayed in an extended front display depending on the road state of the road taken as a road attribute. The map information display device according to embodiment 16 is described below. Those parts of the map information display device according to embodiment 16 which are the same of those of embodiment 1 as shown in the block diagram in FIG. 4 will not be further explained.

The operation of embodiment 16 will be outlined below.

When the map information display device is placed in the ON position by operation of the operational section 29, the control section 24 receives information about the speed and bearing of the displacement body and the coordinates (X, Y) of the present position of the displacement body from the position detection section 23. The control section 29 then reads the map mode and map scale used on the last prior occasion from the last memory 28. The control section 24 determines the speed limit of the road currently traveled on from information of the coordinates ('X, Y) of the received present position. The road on the map is recorded as a composite body of segments called links which are formed from two coordinates called node points in the map memory 25. Each road is recorded with respect to a road state of being divided into sealed or unsealed roads.

Figures 45, 46:
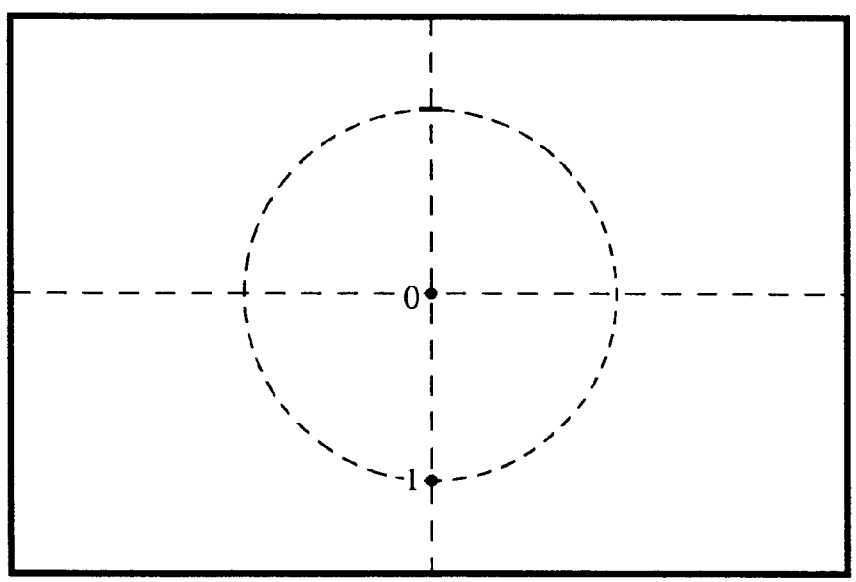
FIG. 45 is an explanatory diagram of an offset value according to a sixteenth embodiment of the present invention.
FIG. 46 is an explanatory diagram of an offset position according to a sixteenth embodiment of the present invention.

The determination of the road state of a currently traveled road by the control section 24 is performed with reference to the stored data in the map memory 25. FIG. 45 is an explanatory diagram showing an offset value depending on a road state of each road. As shown in the FIG. 45, there are two categories of road state from No. 0 of unsealed to No. 1 of sealed. Offset values 0, 1 are respectively assigned. For example, if the displacement body is currently traveling on a sealed road, the offset value of 1 is determined based on the road state. The display position of the present position in the display section 27 of offset values obtained in this way is as shown in FIG. 46. That is to say, an offset value of 0 is in the center of the screen. Thereafter an offset value of 1 is removed from the center by a distance of ¼ the screen. The present position of a displacement body currently traveling on a sealed road is displayed on a circle shown by an offset value of 1.

The control section 24 performs the calculation of the offset position coordinates $(X_1, Y_1)$ with an offset from the coordinates of the present position (X, Y) of the displacement body on the basis of an offset value of 1 determined by the road state of the currently traveled road. The control section 24 reads map data centering on the offset position coordinates $(X_1, Y_1)$ from the map memory 25 through the memory drive 26 and displays a map image centering on the offset position coordinates $(X_1, Y_1)$ in the display device 27. A present position mark is displayed by a triangular mark which can discriminate the direction of travel at the present position coordinates (X, Y) on the display image.

The screen which is displayed on the display device 27 is the same as that in the first embodiment and will not be further explained.

Figure 47:
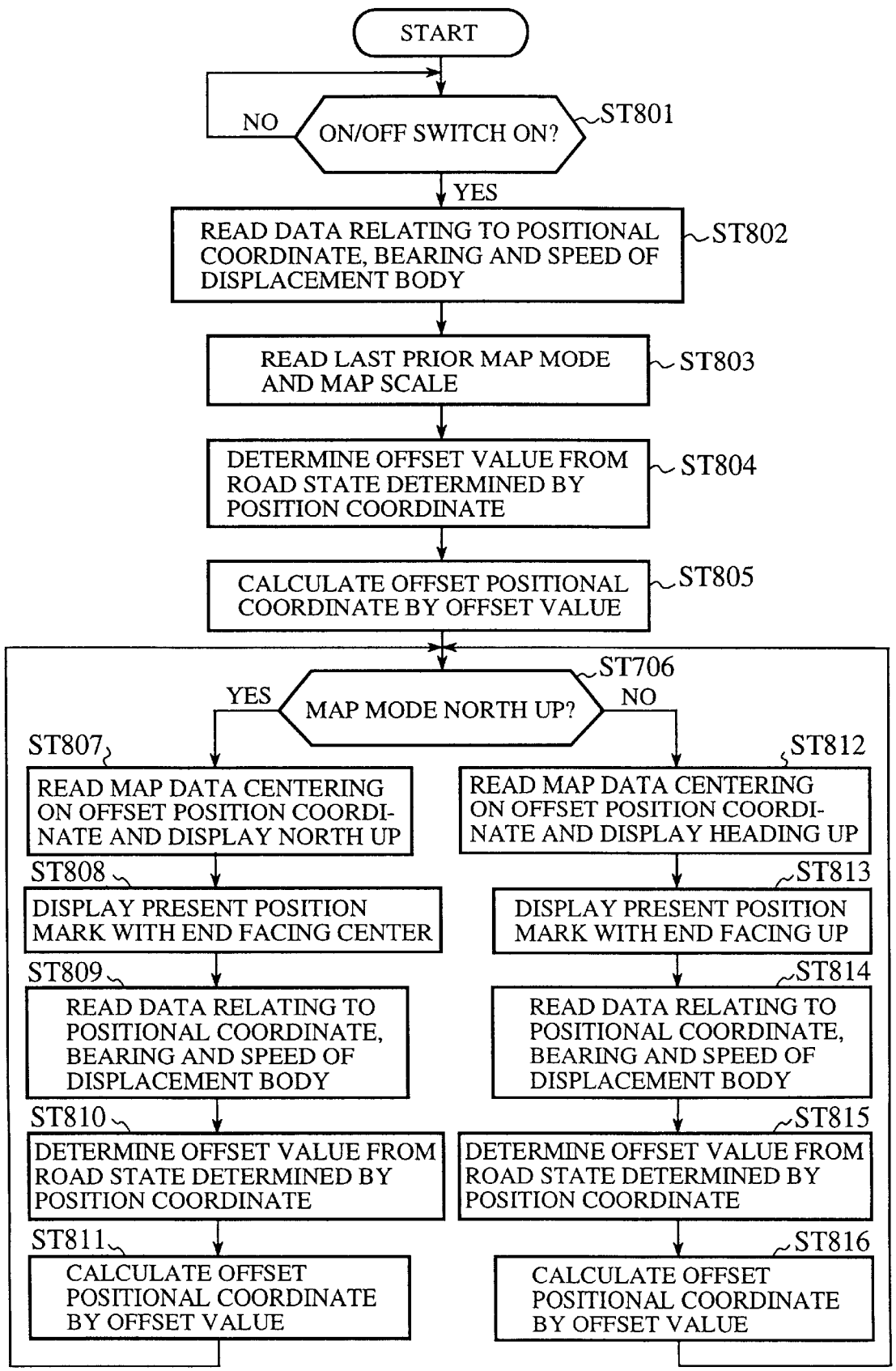
FIG. 47 is a flowchart showing the basic operation of a control section according to a sixteenth embodiment of the present invention.

FIG. 47 is a flowchart showing the basic operation of the control section 24. The operation of the sixteenth embodiment will be explained below with reference to the flowchart in FIG. 47.

The control section 24 detects the fact that the ON/OFF switch of the operational section 29 has been placed in the ON position (step ST801). First the control section 24 reads data relating to the speed, bearing and position coordinates (X, Y) of the displacement body from the position detection section 23 (step ST802). The map mode and map scale on the last prior time the ON/OFF switch 33 was placed in the OFF position is read from the last memory 28 (step ST803).

Then the road and the state of the road currently traveled on by the displacement body is determined from the read position coordinates (X, Y) of the displacement body and an offset value is determined from the road state (step ST804). Data for road state are stored in the map memory 25 corresponding to each road. The road state (sealed/unsealed) of the currently traveled road is determined by reference to the contents of the map memory 25 based on the position coordinate data (X, Y) of the displacement body. The offset value is determined from corresponding the offset value and the road state shown in FIG. 45 based on the current road state.

Thereafter the offset position coordinates $(X_1, Y_1)$ are calculated from the offset value (step ST805). Next it is determined whether or not the map mode read from the map memory 28 is north up (step ST806).

When the result of this determination is that the map mode is north up, map data centering on the offset coordinates $(X_1, Y_1)$ are read from the map memory 25. On this basis, a map image is displayed with north up on the display section 27 (step ST807). The present position mark on the map image is displayed so that the end of the triangle which shows the direction of travel faces the center of the screen of the display device 27 (step ST808). Speed data, bearing data and position coordinate data (X, Y) is read again from the position detection section 23 (step ST809). The road and the road state of the currently traveled road is determined and an offset value is determined based on the road state (sealed/unsealed) (step ST810).

The offset position coordinates $(X_1, Y_1)$ are calculated from the offset value (step ST811). Thereafter the routine returns to the step ST 806 and an offset display of the present position is performed in north up mode depending on road state of the currently traveled road by re-executing the above process.

When the result of the determination in step ST806 is that the map mode is in heading up mode, map data centering on offset position coordinates $(X_1, Y_1)$ calculated in step ST805 are read from the map memory 25. On that basis, the map image is displayed on the display device 27 with the direction of travel at the top (step ST812). The present position mark is displayed on the map image so that the end of the triangle which shows the direction of travel is facing up (step ST813). Speed data, bearing data and position coordinate data (X, Y) is read again from the position detection section 23 (step ST814). Next the road state (sealed/unsealed) of the current traveled road is determined and an offset value is determined from the road state (sealed/unsealed) (step ST815).

The offset position coordinates ($X_1$, $Y_1$) are calculated from the offset value (step ST816). Thereafter the routine returns to the step ST806 and offset display is performed depending on the road state of the currently traveled road in heading up mode by re-executing the above process.

In this way, according to embodiment 16, the level of displaying in front extended display is varied on the basis of the road state (sealed/unsealed) of the currently traveled road. Thus it is possible to suppress unnecessary variation in the display screen by reducing the level of front extended display when running on an unsealed road since unsealed roads often wind through mountainous regions and vary greatly in the forward direction. That is to say, the present embodiment is adapted to present map information on a wider forward range and increase the level of extended front display when traveling on sealed roads. When traveling on unsealed roads such as mountain roads, it is possible to suppress unnecessary variation of the display screen resulting from variation in the forward direction by displaying the present position mark at a central position on the screen.

Embodiment 17

Figure 48:
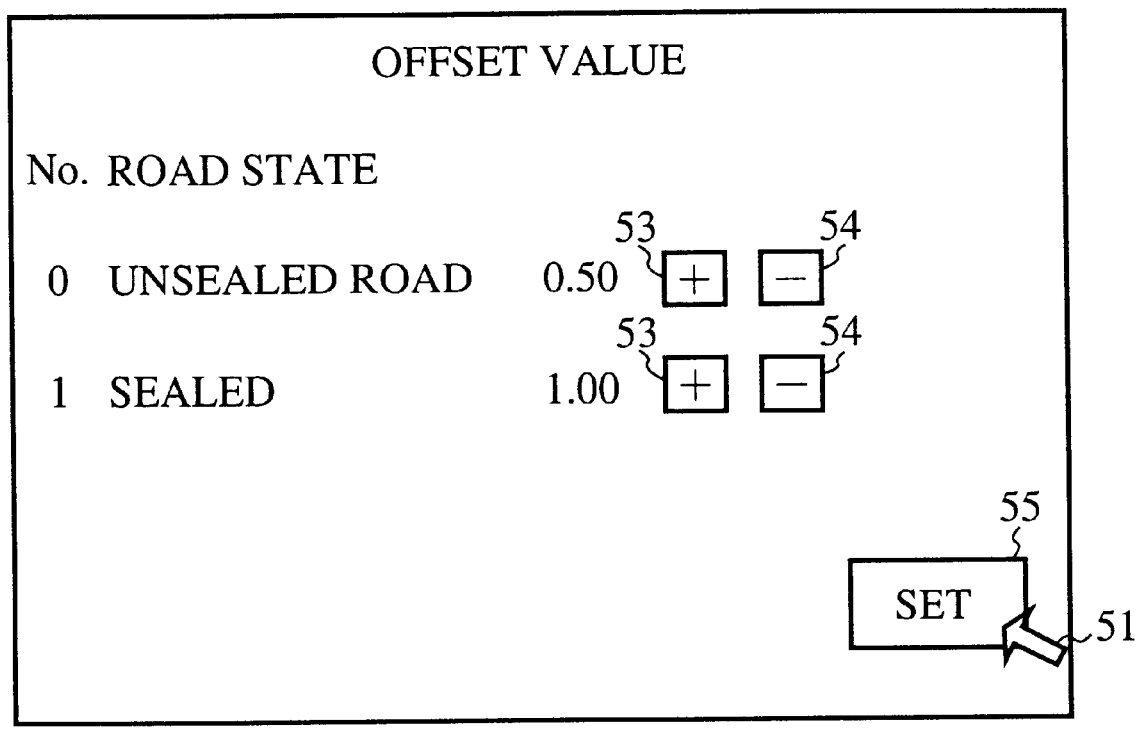
FIG. 48 is an explanatory diagram of the set screen of an offset value in a map information display device according to a seventeenth embodiment of the present invention.
Figure 49:
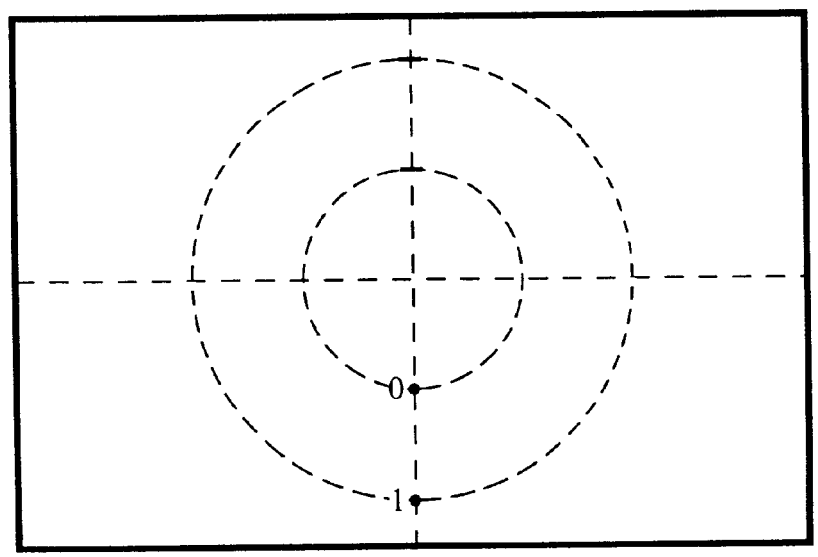
FIG. 49 is an explanatory diagram of an offset position according to a seventeenth embodiment of the present invention.

In embodiment 16, an offset value which offsets a present position was determined on the basis of the road state of the road presently traveled. However it is possible to set the offset value arbitrarily by an operation performed by the driver. FIG. 48 is an explanatory diagram of the set screen of an offset value in a map information display device according to a seventeenth embodiment of the present invention. FIG. 49 is an explanatory diagram of an offset position according to a seventeenth embodiment of the present invention. Those sections of FIG. 48 which are the same as those in FIG. 13 are designated by the same reference numerals and will not be described again.

As shown in FIG. 48, an icon 53 for increasing the offset value for each road state and an icon 54 for decreasing the value are separately prepared. An offset value with a default of 0.00–1.00 can be separately varied by depressing the corresponding icon 53 or 54. After varying the offset value, it is set by depressing the icon 55, as shown in FIG. 49, and thus the offset distance comprises respective values on concentric.

In this way, according to embodiment 17, since it is possible to set offset values for sealed or unsealed roads states separately, it is possible to appropriately regulate the offset value of the present position depending on the use purpose.

Embodiment 18

In embodiments 8 to 16, the level of display of respective present positions on front extended display varied depending on road attributes of the type of road currently traveled, speed limit, road width, lane number and road state. However regions may be divided into urban or non-urban categories and stored in the map memory 25. When the displacement body is traveling on a road, the present position of the displacement body may be displayed on the center of the screen or in extended front display of the display section 27 depending on the region currently traveled. The map information display device of embodiment 18 of the present invention will be explained below on this basis. The structure of the map information display device of embodiment 18 is the same as that described in embodiment 1 shown in the block diagram in FIG. 4 and will not be described further.

Next the operation of embodiment 18 will be outlined.

When the map information display device is placed in the ON position by operation of the operational section 29, information regarding the speed and bearing of the displacement body and the coordinates (X, Y) of the present position of the displacement body are received. The map mode and map scale at the last prior occasion are read from the last memory 28. Thereafter the control section 24 determines the region currently traveled from the received present coordinates (X, Y). The road on the map is recorded as a composite body of segments called links which are formed from two coordinates called node points in the map memory 25. For each road, the regions in which roads exist are recognized on the division of urban and non-urban areas. Area data is stored by correlation with the road data.

Figures 50, 51:
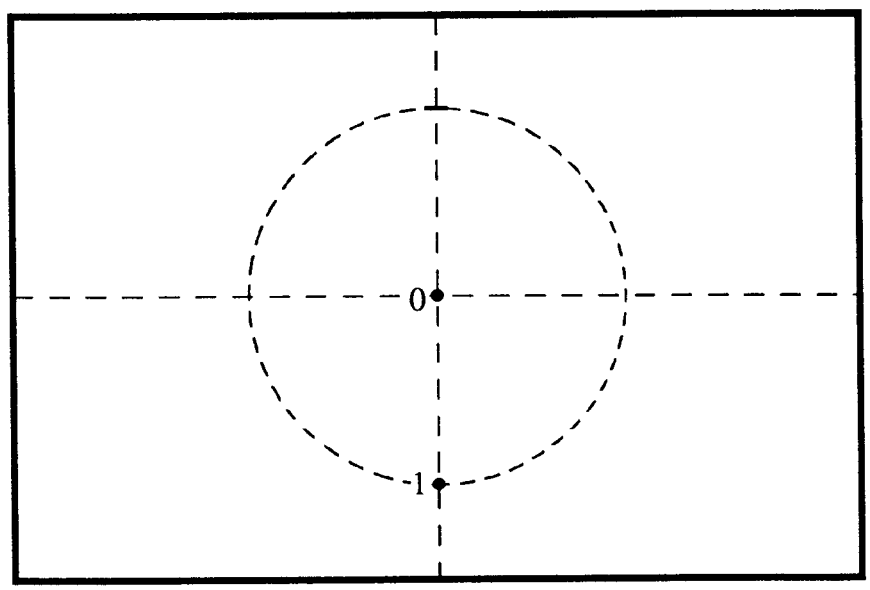
FIG. 50 is an explanatory diagram of an offset value in a map information display device according to an eighteenth embodiment of the present invention.
FIG. 51 is an explanatory diagram of an offset position according to an eighteenth embodiment of the present invention.

The determination of the area of the currently traveled road in the control section 24 is performed by referring to stored data in the map memory 25. FIG. 50 is an explanatory diagram showing an offset value corresponding to an area of a currently traveled road. As shown in FIG. 50, areas have the two divisions of urban No. 0 and non-urban No. 1 with respective offset values of 0 and 1 being assigned. For example, if the region of the road on which the displacement body is currently traveling is non-urban, it is determined that the offset value is 1 based on that map data (non-urban). The display position of the present position in the display section 27 which determines the offset value in this way is as shown in FIG. 51. That is to say, an offset value with a value of 0 is taken to be the center of the screen and an offset value 1 is a position removed from the center by one quarter of the screen. Thus the present position of a displacement body which is currently traveling in a non-urban area is displayed on a circle shown at an offset value of 1.

The control section 24 calculates the offset position coordinates ($X_1$, $Y_1$) which are offset from the present position coordinates (X, Y) of the displacement body based on an offset value of 1 determined from the region in which the displacement body is currently traveling. The control section 24 then reads map data centering on the offset position coordinates ($X_1$, $Y_1$) from the map memory 25 through the memory drive 26. A map image the center of which is the offset position coordinates ($X_1$, $Y_1$) is displayed on the display section 27 and a present position mark is displayed by a triangular mark in which the direction of travel can be distinguished on the present position coordinates (X, Y) on the screen.

Figure 52:
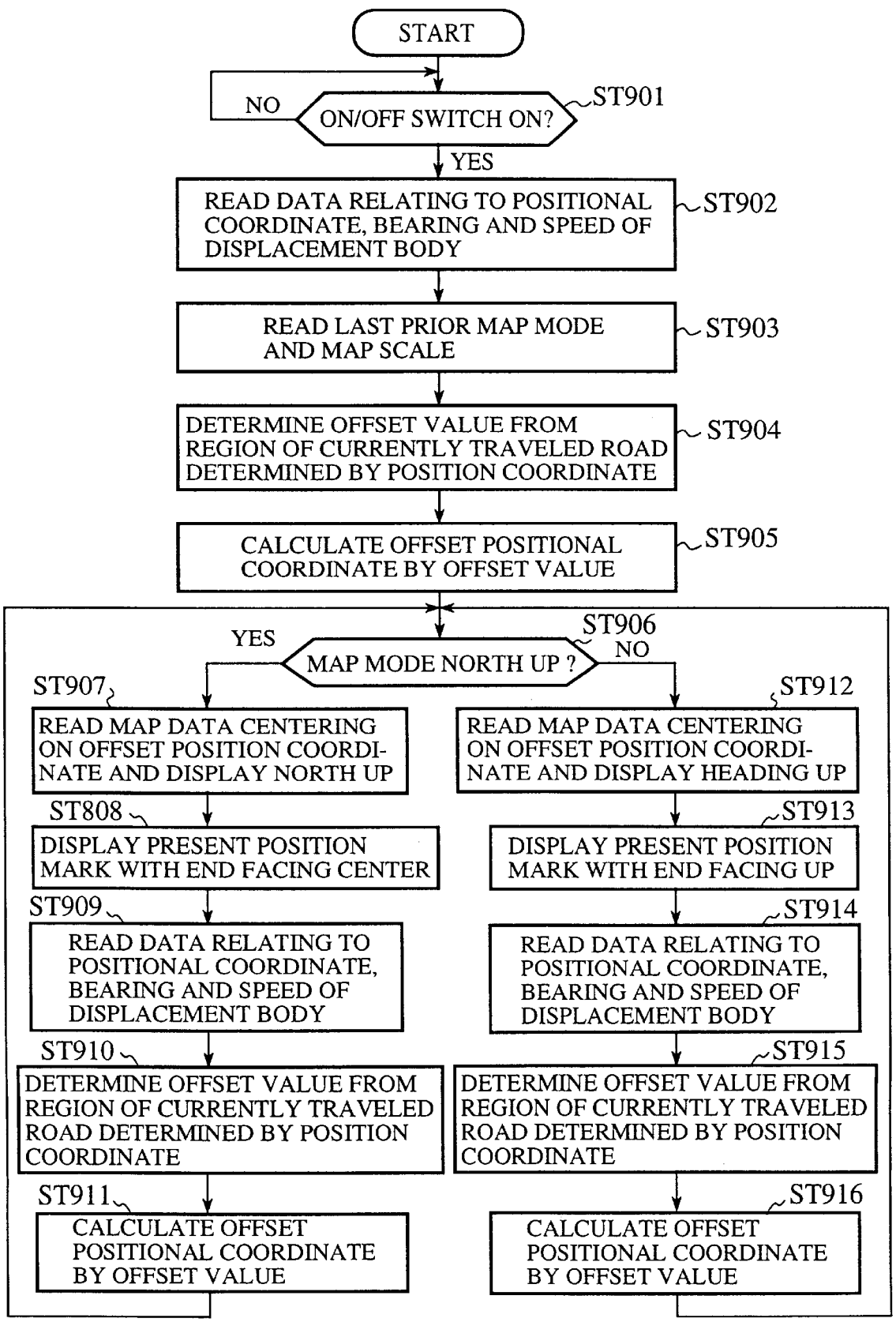
FIG. 52 is a flowchart showing the basic operation of a control section according to an eighteenth embodiment of the present invention.

The screen which is displayed on the screen section 27 at this time is the same as that described in embodiment 1 and will not be further described. FIG. 52 is a flowchart showing the flow of the basic operation of the control section 24. Below the operation of embodiment 18 of the present invention will be described with reference to the flowchart.

The control section 24 detects the fact that the ON/OFF switch 33 of the operational section 29 has been placed in the ON position (step ST901). First the control section 24 reads data relating to the speed, bearing and position coordinates (X, Y) of the displacement body from the position detection section 23 (step ST902). The map mode and map scale on the last prior occasion the ON/OFF switch 33 was placed in the OFF position are read from the last memory 28 (step ST903).

An offset value is determined based on the region by determining the road currently traveled and the region of the road currently traveled by the displacement body from the read position coordinates data (X, Y) of the displacement body (step ST904). Data relating to regions for each road are stored in the map memory 25 corresponding to each road. Thus it is determined whether or not the currently traveled region, in which the road on which the displacement body is traveling is situated, is urban or non-urban by referring to the contents of the map memory 25 based on the position coordinate data (X, Y) of the displacement body. Furthermore an offset value is determined from corresponding the offset value and the state of the road shown in FIG. 50 based on the region.

Thereafter the calculation of the offset position coordinates $(X_1, Y_1)$ is performed on the basis of the offset value (step ST905). It is determined whether or not the map mode read from the last memory 28 is north up mode (step ST906).

As a result, if the map mode is north up mode, map data the center of which is the offset position coordinates $(X_1, Y_1)$ are read from the map memory 25 and on this basis, a map image with north being up is displayed on the display section 27 (step ST907). A present position mark is displayed on the map image so that the end of a triangular mark which shows the direction of travel points to the center of the screen of the display section 27 (step ST908). Then the control section 24 again reads data relating to the speed, bearing and position coordinates (X, Y) of the displacement body from the position detection section 23 (step ST909). The road on which the displacement body is currently traveling and the area in which the currently traveled road is located are determined based on position coordinates (X, Y) and thus an offset value is determined depending on whether the area is urban or non-urban (step ST910).

The calculation of the offset coordinates $(X_1, Y_1)$ is performed depending on the offset value (step ST911). Thereafter the routine returns to a step ST906 and the above process is repeated whereby the offset display of the present position in north up mode is performed depending on the area in which the road currently traveled by the displacement body is located.

In the step ST906, if it is determined that the map mode is in heading up mode, map data centering on the offset position coordinates $(X_1, Y_1)$ obtained in step ST905 is read from the map memory 25 and a map image is displayed on the display section 27 on this basis with the direction of travel in the up direction (step ST912). A present position mark is displayed by a triangular mark in which the direction of travel can be distinguished on the present position coordinates (X, Y) facing up on the screen (step ST913).

Then the control section 24 again reads data relating to the speed, bearing and position coordinates (X, Y) of the displacement body from the position detection section 23 (step ST914). The road on which the displacement body is currently traveling and the area in which the currently traveled road is located are determined based on position coordinates (X, Y) and thus an offset value is determined depending on whether the area is urban or non-urban (step ST915).

The calculation of the offset coordinates $(X_1, Y_1)$ is performed depending on the offset value (step ST916). Thereafter the routine returns to a step ST906 and the above process is repeated whereby the offset display of the present position in heading up mode is performed depending on the area in which the road currently traveled by the displacement body is located.

As shown above, according to embodiment 18, variation is possible of the level of front extended display depending on the region in which the road currently traveled by the displacement body is located. Thus it is possible to prevent reductions in the ease of understanding the layout of the display screen by reducing the level of front extended display if the region varies greatly in the direction of travel with many left and right turns as when currently traveling in a municipal region for example. When traveling in a non-municipal region outside a town, if variation in the route in low, it is possible to recognize map information on a wider range in the forward direction by increasing the level of front extended display.

Embodiment 19

Figure 53:
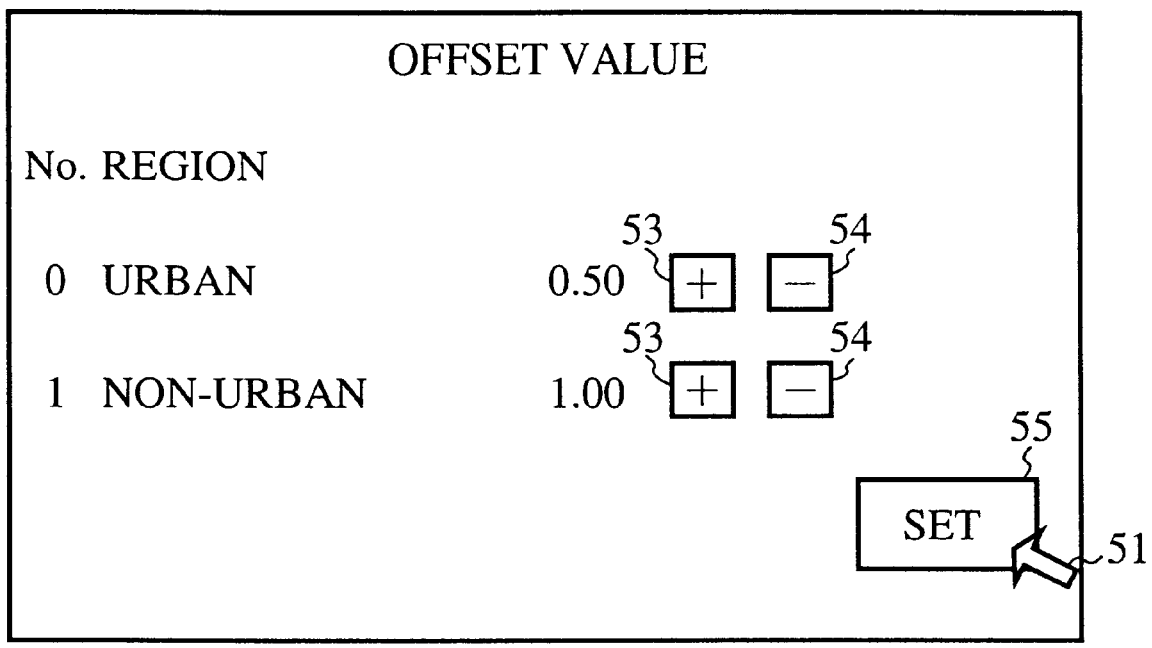
FIG. 53 is an explanatory diagram of the set screen of an offset value in a map information display device according to a nineteenth embodiment of the present invention.
Figure 54:
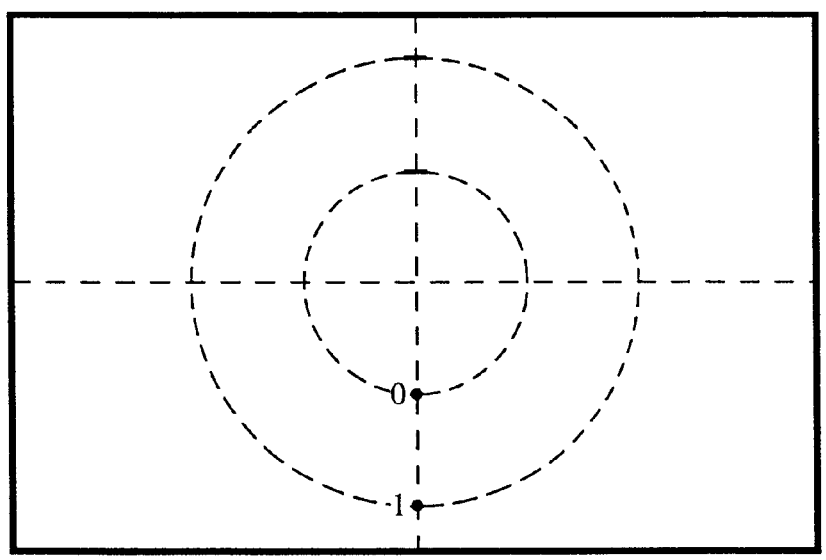
FIG. 54 is an explanatory diagram of an offset position according to a nineteenth embodiment of the present invention.

In embodiment 18 above, an offset value which offsets a present position was determined by the region in which the currently traveled road is located. However the offset value may be set by an arbitrary operation of the driver. FIG. 53 is an explanatory diagram of the set screen of an offset value in a map information display device according to a nineteenth embodiment of the present invention. FIG. 54 is an explanatory diagram of an offset position according to a nineteenth embodiment of the present invention. Those sections of FIG. 53 which are the same as those in FIG. 13 are designated by the same reference numerals and will not be described again.

As shown in FIG. 53, an icon 53 for increasing the offset value for each area and an icon 54 for decreasing the value are separately provided. An offset value with a default of 0.00–1.00 can be separately varied by depressing the corresponding icon 53 or 54. After varying the offset value and setting and depressing the icon 55, as shown in FIG. 54, the offset distance comprises respectively set values on concentric circles.

In this way according to embodiment 19, it is possible to appropriately regulate an offset value of a present position depending on a use purpose since it is possible to set an offset value separately for each area namely urban or non-urban area in which currently traveled roads are located.

Embodiment 20

In each of the embodiments above, the level of extended front display of a present position was varied depending on the operational characteristics of the displacement body such as the speed of the displacement body, the attribute of the road on which the displacement body is traveling, or the region currently traveled. However it is possible to display the present position of the displacement body in the center of the screen of the display device 27 or in extended front display depending on map scale or detail of the displayed map. Below the level of extended front display depends on the map scale of the displayed map. A map information display device will be described with reference to an embodiment 20 of the present invention. The structure of the map information display device according to embodiment 20 is the same as that shown in embodiment 1 as shown in the block diagram in FIG. 4 and so will not be described further.

The operation of embodiment 20 will be outlined below.

When the map information display device is placed in the ON position by operation of the operational section 29, information regarding the speed and bearing of the displacement body and the coordinates (X, Y) of the present position of the displacement body are received. The map mode and map scale on the last prior occasion are read from the last memory 28.

Thereafter the control section 24 determines the offset coordinates based on the map scale read from the last memory 28. The road on the map is stored as a composite body of segments called links which are formed from two coordinates called node points in the map memory 25.

Figures 55, 56:
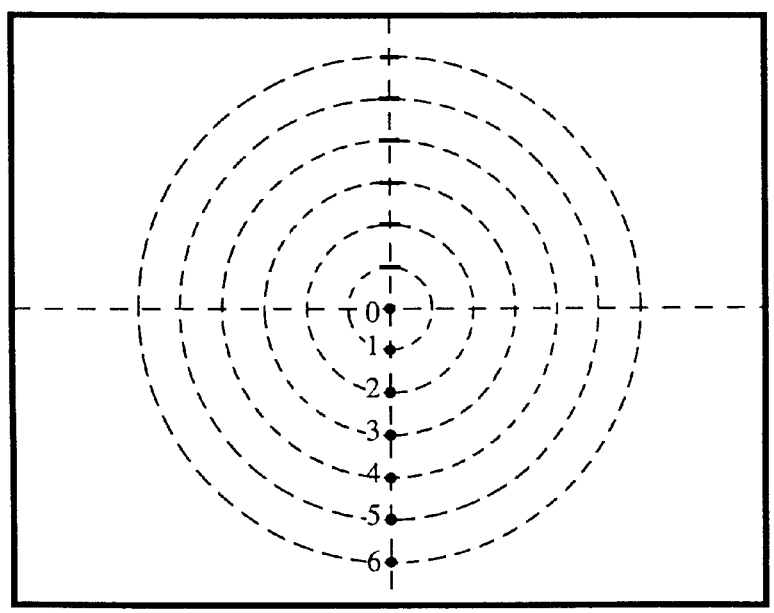
FIG. 55 is an explanatory diagram of an offset value in a map information display device according to a twentieth embodiment of the present invention.
FIG. 56 is an explanatory diagram of an offset position according to a twentieth embodiment of the present invention.

FIG. 55 is an explanatory view showing an offset value corresponding to the map scale of the map. The map scale as shown in the figure ranges in seven types from No. 0 with a scale of 1/6400000 to No. 6 with a scale of 1/12500. Offset values 0–6 are assigned to these scales. For example, if a map image with a scale of 1/400000 is being displayed, an offset value with a value of 2 will be determined. The display position of a present position in the display section 27 which determines an offset value obtained in this way is as shown in FIG. 56. That is to say, an offset value with a value of 0 is taken to be the center of the screen. Thereafter the values ranging from 1–6 are removed from the center on concentric circles in ascending order. The present position of the displacement body in the display is displayed on a map with a scale of 1/400000 on a circle shown at an offset value of 2.

The control section 24 calculates the offset position coordinates $(X_1, Y_1)$ which are offset from the present position coordinates $(X, Y)$ of the displacement body based on an offset value of 2 determined from the scale of the displayed map. The control section 24 then reads map data on a map with a scale of 1/400000 centering on the offset position coordinates $(X_1, Y_1)$ from the map memory 25 through the memory drive 26. A map image the center of which is the offset position coordinates $(X_1, Y_1)$ is displayed on the display section 27 and a present position mark is displayed by a triangular mark in which the direction of travel can be distinguished on the present position coordinates $(X, Y)$ on the screen.

Figure 57:
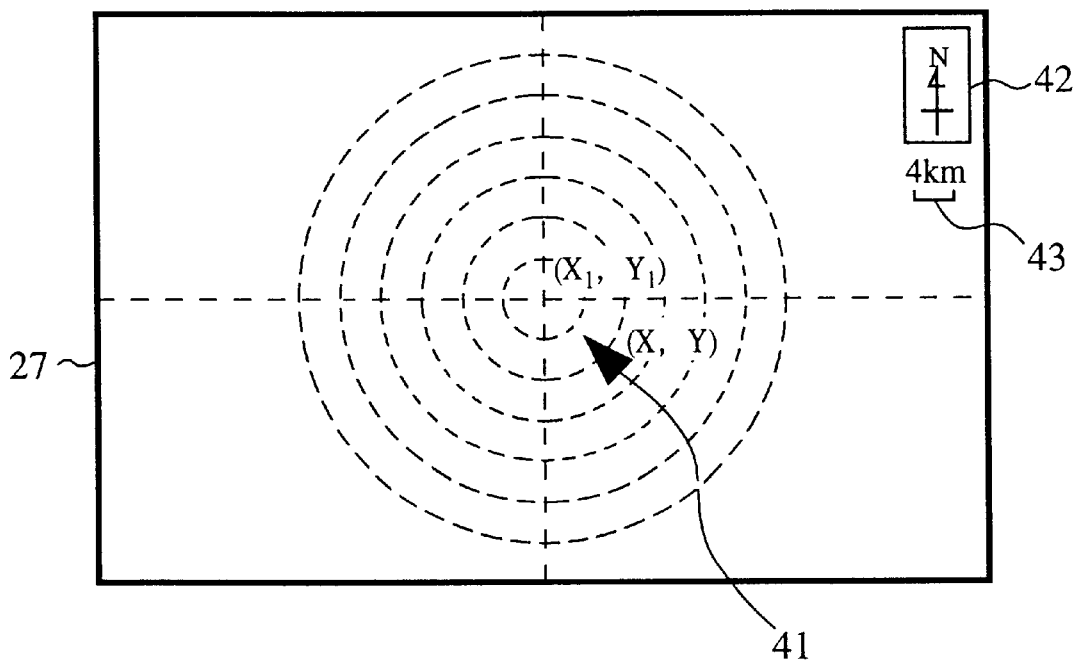
FIG. 57 is a display example of a display screen of the display section in a twentieth embodiment of the present invention.
Figure 58:
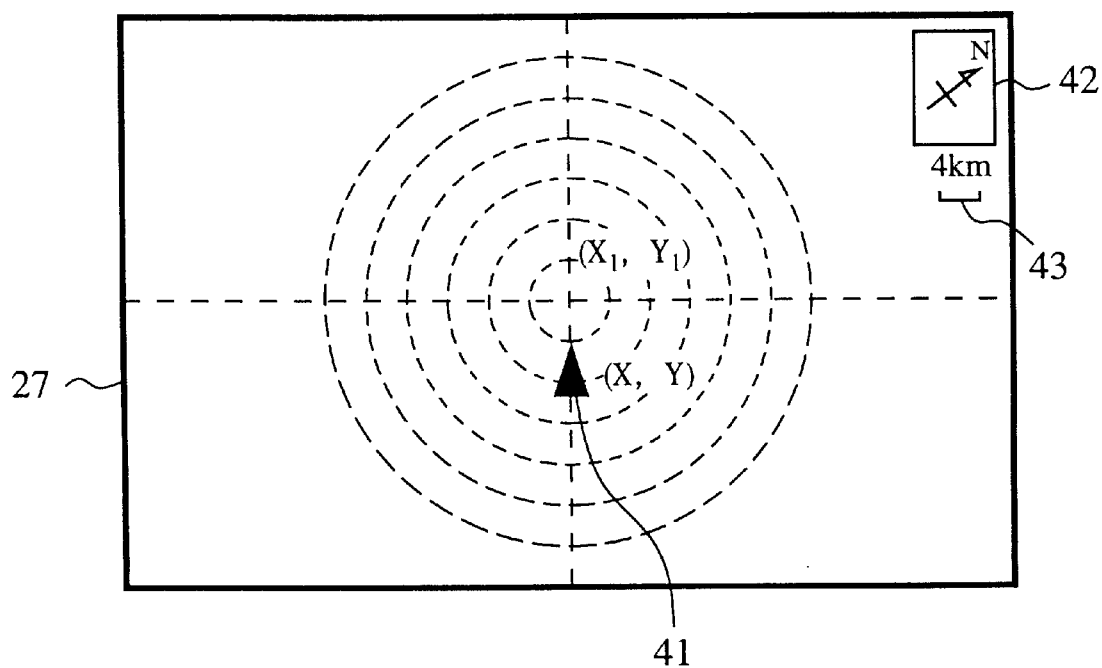
FIG. 58 is another display example of a display screen of the display section in a twentieth embodiment of the present invention.

FIG. 57 and FIG. 58 are explanatory views showing a display example on the display section 27 of a present position mark. Reference numeral 41 in the figure is a present position mark, 42 is a bearing mark showing the bearing of the map and 43 is a scale showing the scale of the map.

If the map mode for displaying the map based on map data read from the last memory 28 is north up in which the direction north is at the top of the screen, as shown in FIG. 57, the present position mark 41 is displayed so that the direction of travel which corresponds to the displayed map faces the center and displays the bearing mark so that north faces up. If the map mode is heading up in which the direction of travel faces the top of the screen, as shown in FIG. 58, the present position mark 41 is displayed to that the direction of travel faces up and the bearing mark 42 is displayed so that north faces a fixed direction. At this time, the map scale is 1/400000 and the scale 43 is 4 km.

Figure 59:
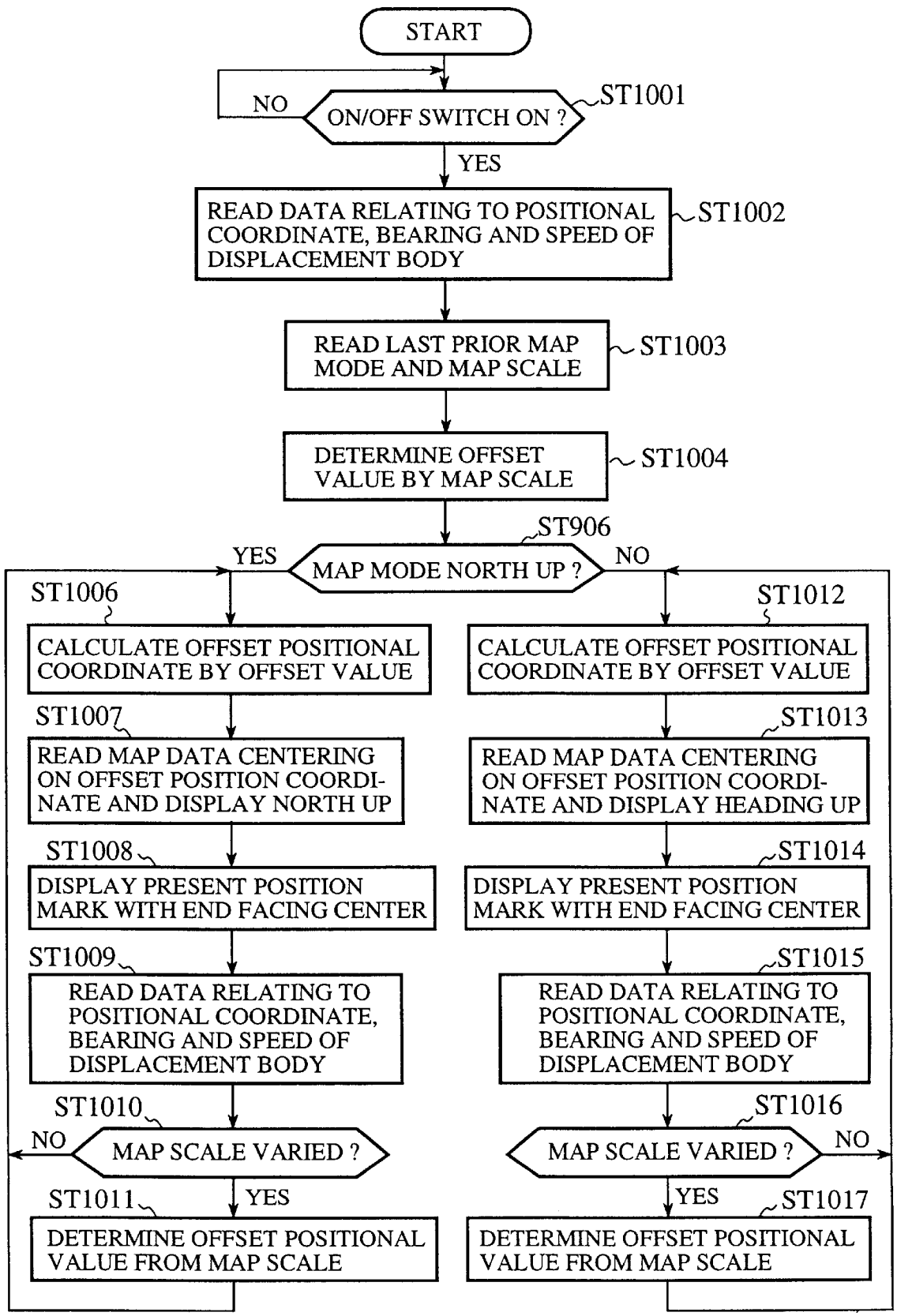
FIG. 59 is a flowchart showing the basic operation of a control section according to a twentieth embodiment of the present invention.

FIG. 59 is a flowchart showing the flow of the basic operation of the control section 24. The operation of embodiment 20 of the present invention will be described with reference to the flowchart in FIG. 59.

The control section 24 detects the fact that the ON/OFF switch 33 of the operational section 29 has been placed in the ON position (step ST1001). First the control section 24 reads data relating to the speed, bearing and position coordinates $(X, Y)$ of the displacement body from the position detection section 23 (step ST1002). The map mode and map scale on the last prior occasion the ON/OFF switch 33 was placed in the OFF position are read from the last memory 28 (step ST1003). Next determination of the offset value is performed from the map scale read from the last memory 28 (step ST1004). The offset value is determined depending corresponding offset values and map scales shown in FIG. 55 based on the read map scale.

Thereafter it is determined whether or not the map mode read from the last memory 28 is north up mode (step ST1005). As a result, if the map mode is north up mode, the calculation of the offset position coordinates $(X_1, Y_1)$ is performed from the offset value (step ST1006). Then map data centering on the offset position coordinates $(X_1, Y_1)$ are read from the map memory 25 and on this basis, a map image with north being the top of the screen is displayed on the display section 27 (step ST1007). A present position mark is displayed on the map image so that the end of a triangular mark which shows the direction of travel points to the center of the screen of the display section 27 (step ST1008). Then the control section 24 again reads data relating to the speed, bearing and position coordinates $(X, Y)$ of the displacement body from the position detection section 23 (step ST1009).

Then it is determined whether or not the map scale has been varied (step ST1010). If the scale has been varied, a new offset value is determined based on the varied map scale (step ST1011). Thereafter the routine returns to a step ST1006 and the above process is repeated. If there is no variation, the routine returns directly to step ST1006. By repeating the process after step ST1006, an offset display in north up mode is performed which depends on the map scale of the displayed map.

In the step ST1005, if it is determined that the map mode is heading up mode, offset position coordinates $(X_1, Y_1)$ are calculated from the offset value obtained in step ST1005 (step ST1012). Map data centering on the offset position coordinates $(X_1, Y_1)$ are read from the map memory 25 and a map image is displayed on the display section 27 on this basis with the direction of travel in the up direction (step ST1013). A present position mark is displayed on the map image by a triangular mark in which the direction of travel can be distinguished facing up on the screen (step ST1014). Then the control section 24 again reads data relating to the speed, bearing and position coordinates $(X, Y)$ of the displacement body from the position detection section 23 (step ST1015).

Then it is determined whether or not the map scale has been varied (step ST1016). If the scale has been varied, a new offset value is determined based on the varied map scale (step ST1017). Thereafter the routine returns to a step ST1012. If there is no variation, the routine returns directly to step ST1012. By repeating the process after step ST1012, an offset display of a present position in heading up mode is performed which depends on the map scale of the displayed map.

In this way according to embodiment 20, a present position can be displayed in the center of the screen when a wide area map display with a high scale is used and can be displayed in front extended view when a detailed map is displayed with a low scale. This is because the level of displaying in front extended view is varied due to the map scale of the displayed map. Thus it is possible for the driver to obtain suitable information in the direction of travel in any map scale.

Embodiment 21

Figure 60:
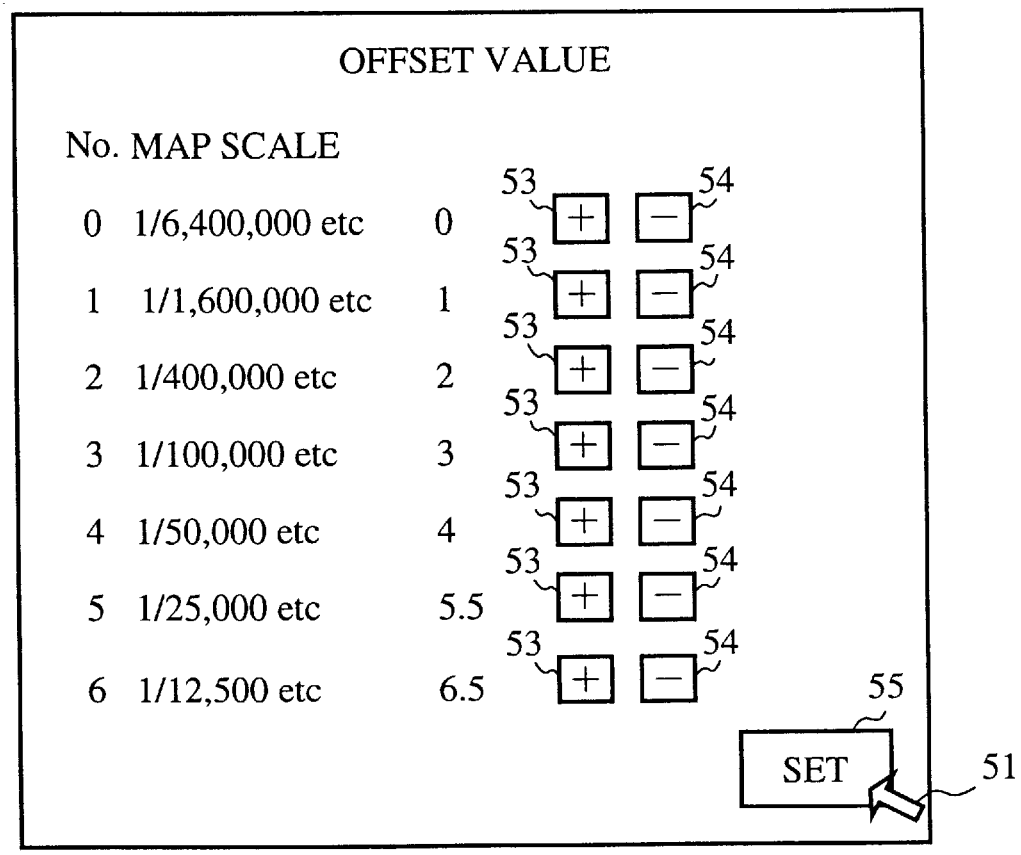
FIG. 60 is an explanatory diagram of the set screen of an offset value in a map information display device according to a twenty-first embodiment of the present invention.
Figure 61:
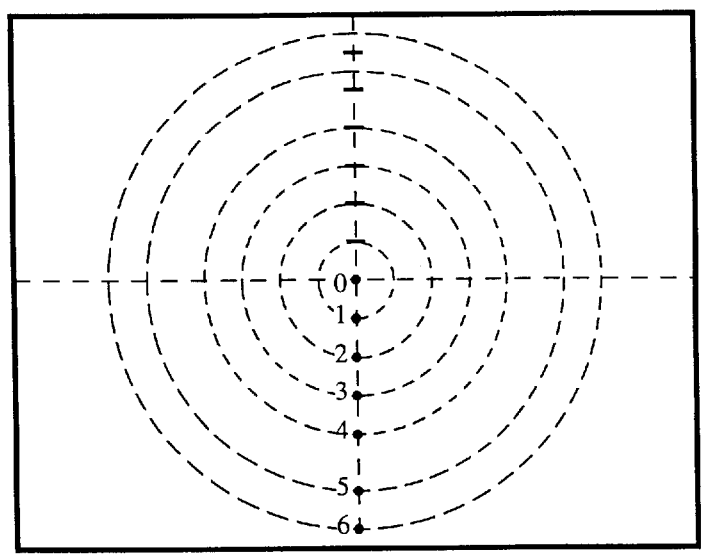
FIG. 61 is an explanatory diagram of an offset position according to a twenty-first embodiment of the present invention.

In embodiment 20 above, an offset value which offsets a present position was determined from a map scale of a displayed map. However it is possible to set the offset value arbitrarily by an operation of the driver. FIG. 60 is an explanatory diagram of the set screen of an offset value in a map information display device according to a twenty-first embodiment of the present invention. FIG. 61 is an explanatory diagram of an offset position according to a twenty-first embodiment of the present invention. Those sections of FIG. 60 which are the same as those in FIG. 13 are designated by the same reference numerals and will not be described again.

As shown in FIG. 60, an icon 53 for increasing the offset value in each map scale and an icon 54 for decreasing the value are separately provided. An offset value with a default of 0.00–6.00 can be separately varied by depressing the corresponding icon 53 or 54. After varying the offset value, it is set by depressing the icon 55, as shown in FIG. 61, and thus the offset distance comprises respectively set values on concentric circles.

In this way according to embodiment 21, it is possible to appropriately regulate an offset value of a present position depending on a use purpose since it is possible to set an offset value separately for each map scale.

Embodiment 22

In embodiment 20 and embodiment 21 above, the level which displays a front extended view of a present position was varied depending on the map scale of a displayed map as a display state of a map on a display section 27. However the display position on the screen of a present position displayed on the display section 27 may be displayed by presenting the destination in wide format in which map information in a wider range with respect to the direction of the destination. This is performed based on the position relationship of the present position and the destination of the displacement body as a display state of the map on the display section 27. A map information display device will be described with reference to an embodiment 22 of the present invention. The structure of the map information display device of an embodiment 22 is the same as that shown in embodiment 1 as shown in the block diagram in FIG. 4 and so will not be described further.

The operation of embodiment 22 will be outlined below.

When the map information display device is placed in the ON position by operation of the operational section 29, information regarding the speed and bearing of the displacement body and the coordinates (X, Y) of the present position of the displacement body are received. The map mode and map scale at the last prior occasion are read from the last memory 28. Thereafter the control section 24 determines the offset coordinates based on the map scale read from the last memory 28 or information of the coordinates (X, Y) of the present position or the speed of the displacement body. The determination of the offset values is performed by one of the means described in the embodiments above.

The control section 24 determines the position relationship of the present position and the destination from the separately set coordinates ($X_2$, $Y_2$) of the destination and the coordinates (X, Y) of the present position of the displacement body received from the position detection section 23. A straight line connecting the present position and the destination is calculated and map data is read from the map memory 25 through the map driver 26 so that the center of the screen is on the straight line obtained in the above manner. On this basis, a map image is displayed on the display section 27 depending on the map mode read from the last memory 28. At this time, the present position mark is displayed by a triangular mark, which can discriminate the direction of travel, on the present coordinates (X, Y) on the map image.

Figure 62:
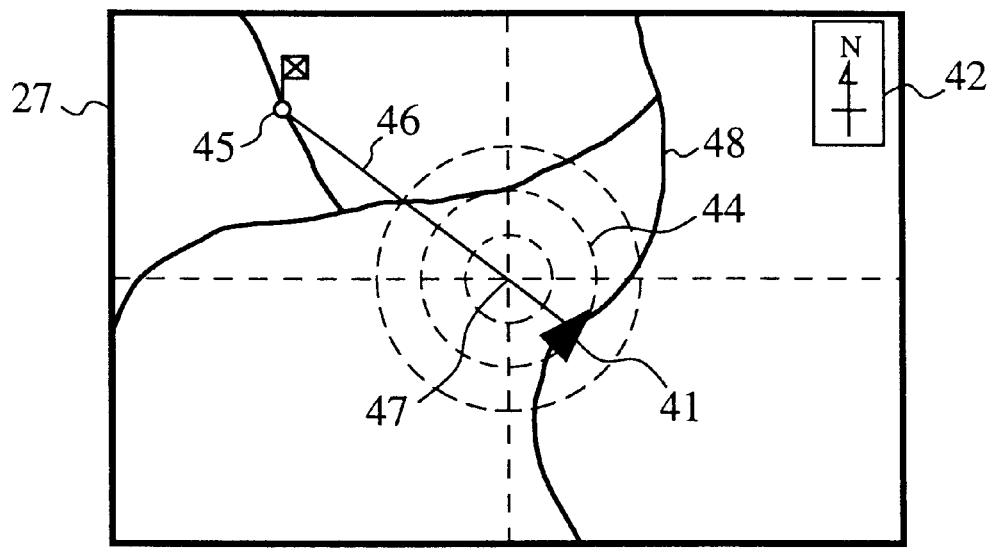
FIG. 62 is a display example of a display screen of the display section of a map information display device in a twenty-first embodiment of the present invention.
Figure 63:
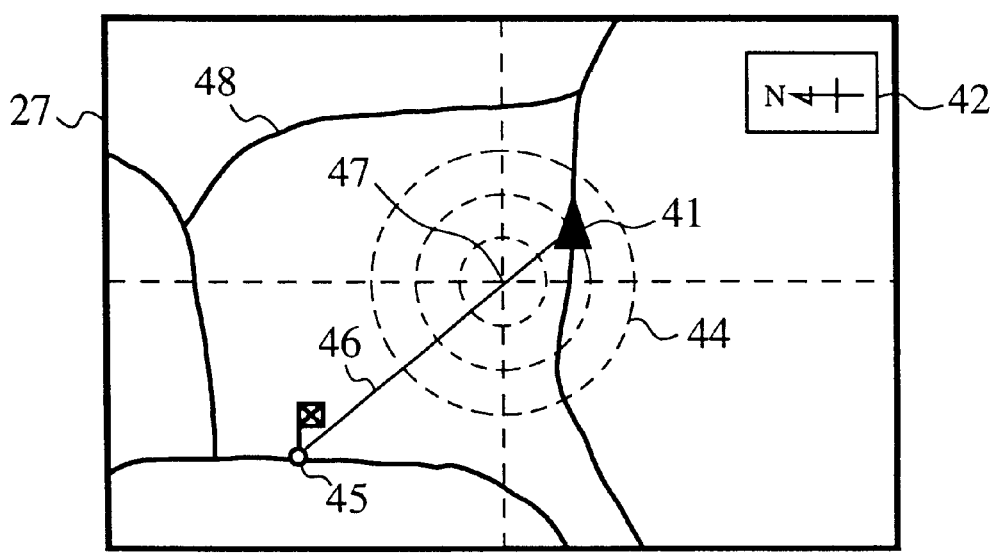
FIG. 63 is another display example of a display screen of the display section in a twenty-first embodiment of the present invention.

FIG. 62 and FIG. 63 are explanatory figures showing the present position mark and the map displayed on the display section 27 in this way. In the figures, reference numeral 41 is a present position mark, 42 is a bearing mark, 44 is a circle showing an offset position, 45 is a destination mark showing a position of a destination, 46 is a straight line connecting the present position of the displacement body and the destination, 47 is the center of the screen of the display section 27 and 48 is a road on which the displacement body is traveling. FIG. 62 shows the situation when the map mode is north up mode. The present position mark 41 is displayed on the circle 44 corresponding to the offset value so that the end of the triangle is in the direction of travel. FIG. 63 shows the situation when the map mode is heading up mode. The present position mark 41 is displayed on the circle 44 corresponding to the offset value so that the end of the triangle is facing the top of the screen.

In this way according to embodiment 22, it is possible to display map information on a wider range in the direction of the destination as it is possible to vary the positional relationship of the display position of the present position on the screen of the display section 27 and the destination. Thus it is possible to recognize more quickly a destination on the map displayed on the screen of the display section 27.

Embodiment 23

In the embodiments above, the present invention was described as adapted to vary the level of displaying the present position in front extended display based on the state of display of the map on the display section 27 or the running state of the displacement body. Alternatively, the present invention was described as adapted to display a destination in a wide display based on the state of display of the map to the display section 27. However it is possible to vary the map mode of the displayed map based on the state of display of the map to the display section 27 or the running state of the displacement body. A map information display device according to an embodiment 23 of the present invention is adapted to vary the map mode according to the scale of the displayed map as a display condition of the map to the display section 27. The structure of the map information display device of an embodiment 23 is the same as that shown in embodiment 1 as shown in the block diagram in FIG. 4 and so will not be described further.

The operation of embodiment 23 will be outlined below.

When the map information display device is placed in the ON position by operation of the operational section 29, the control section 24 receives information regarding the speed and bearing of the displacement body and the coordinates (X, Y) of the present position of the displacement body. The map scale at the last prior occasion are read from the last memory 28. Thereafter the control section 24 determines the map mode based on the map scale. In the map memory 25, the road on the map is recorded as a composite body of segments called links which are formed from two coordinates called node points in the map memory 25.

Figures 64, 65:
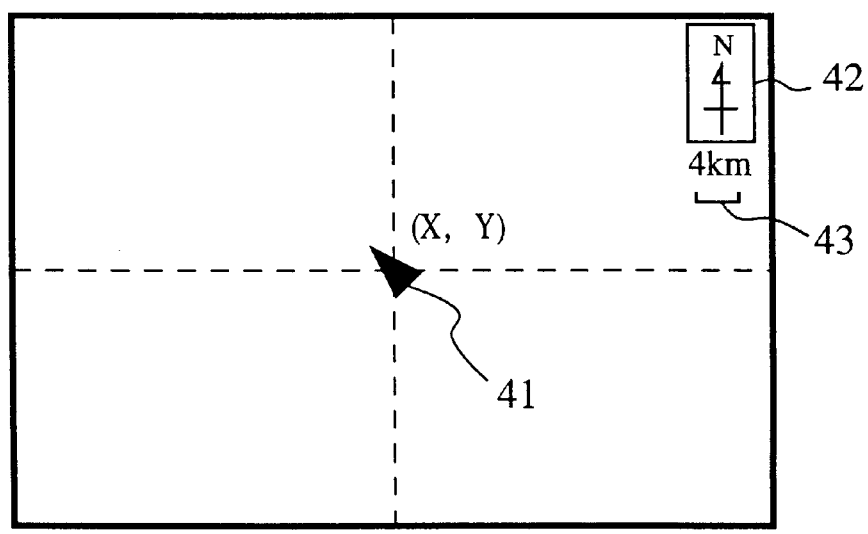
FIG. 64 is an explanatory view of the map mode of a map information display device according to a twenty-third embodiment of the present invention.
FIG. 65 is an explanatory view of a display screen of the display section of a twenty-third embodiment of the present invention.

FIG. 64 is an explanatory view showing correspondences of the map scale of the map and the map mode comprised by north up or heading up. As show in the figure, the map data can display maps according to seven map scales from No. 0 with a scale of 1/6400000 to No. 6 with a scale of 1/12500. The map scales 1/6400000 to 1/400000 are for north up maps and the scales 1/100000 to 1/125000 are for heading up maps.

The control section 24 determines the map mode of the displayed map depending on the scale of the map as read from the last memory 28. When a map with a scale of 1/400000 is displayed, it is determined that the map mode is north up based on the map scale. The control section 24 reads map data of maps with a scale of 1/400000 about coordinates (X, Y) of the present position of the displacement body received from the position detection section 23. The data is obtained from the map memory 25 through the memory drive 26. A map image is displayed the center of which is about the present position coordinates (X, Y) on the display section 27 with north facing up according to the obtained map modes. A present position mark is displayed by a triangular mark which can discriminate the direction of travel on the center of the map screen.

The screen displayed on the display section 27 at this time is as shown in FIG. 65. That is to say, a map image of a map with a scale of 1/400000 is displayed in a north up mode. Also the present position mark on the map image is displayed to that the end of the triangle faces the direction of travel. Furthermore the bearing mark 42 is displayed so that north is at the top of the screen and the scale is 4 km.

Figure 66:
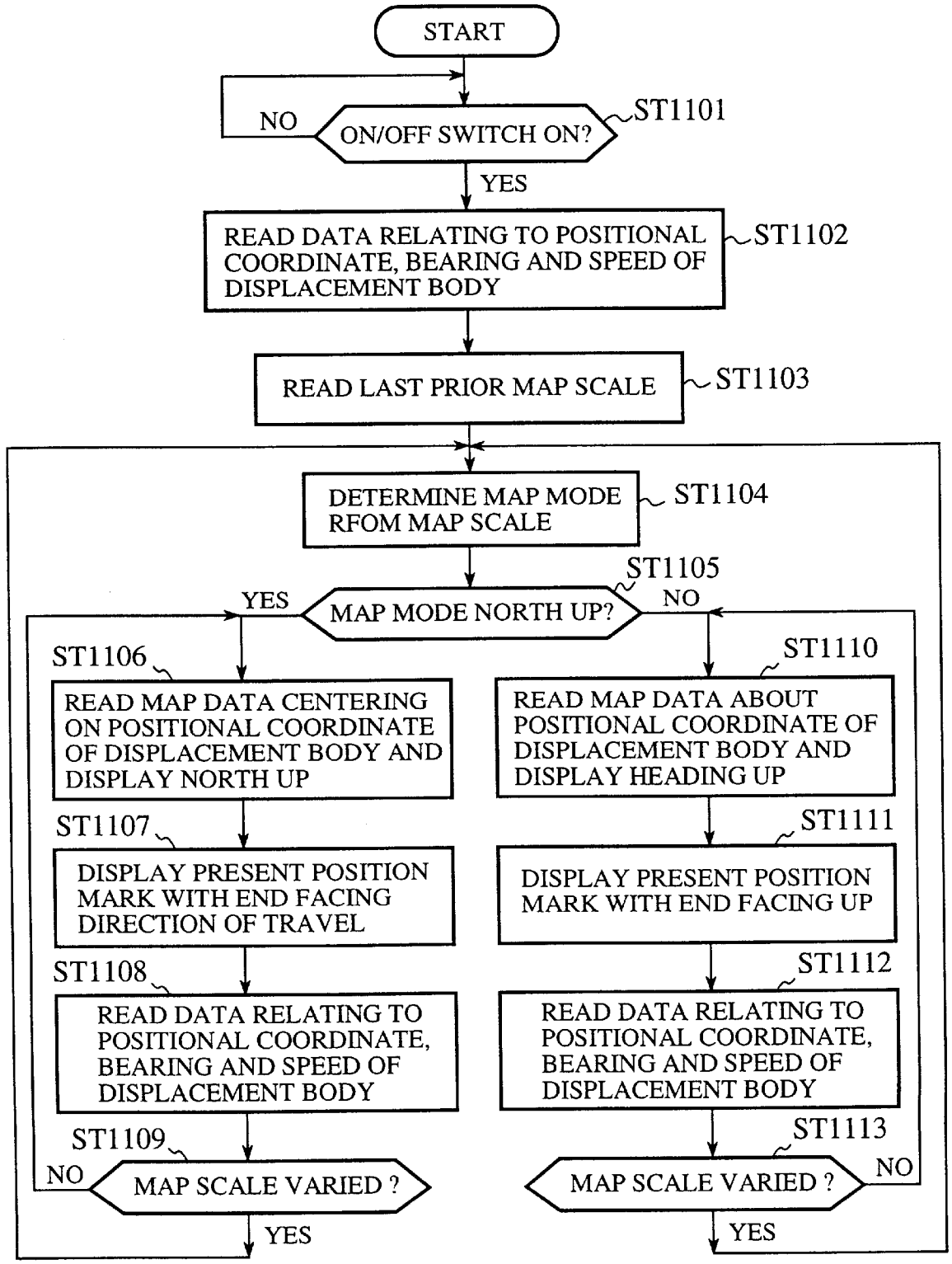
FIG. 66 a flowchart showing the basic operation of a control section according to a twenty-third embodiment of the present invention.

FIG. 66 is a flowchart of the flow of the basic operation of the control section 24. The operation of embodiment 23 of the present will be described with reference to the flowchart of FIG. 66.

The control section 24 detects the fact that the ON/OFF switch 33 of the operational section 29 has been placed in the ON position (step ST1101). First the control section 24 reads data relating to the speed, bearing and position coordinates (X, Y) of the displacement body from the position detection section 23 (step ST1102). The map scale on the last prior time the ON/OFF switch 33 was placed in the OFF position is read from the last memory 28 (step ST1103). Next determination of the map mode is performed from the map scale read from the last memory 28 (step ST1104). The map mode is determined depending on corresponding map modes and map scales shown in FIG. 64 based on the read map scale.

Thereafter it is determined whether or not the map mode read from the last memory 28 is north up mode (step ST1105). As a result, if the map mode is north up mode, map data centering on the present position coordinates (X, Y) of the displacement body as read from the position detection section 23 are read and on this based, a map image with north being the top of the screen is displayed on the display section 27 (step ST1106). A present position mark is displayed on the map image so that the end of a triangular mark which shows the direction of travel in the direction of travel (step ST1107). Then the control section 24 again reads data relating to the speed, bearing and position coordinates (X, Y) of the displacement body from the position detection section 23 (step ST1108). It is determined whether or not the map scale has been varied (step ST1109). If the scale has been varied, the routine returns to the step ST1104. If there is no variation, the routine returns to the step ST1106.

In the step ST1105, if it is determined that the map mode is heading up mode, map data centering on the present position coordinates (X, Y) as read from the position detection section 23 are read from the map memory 25 and a map image is displayed on the display section 27 on this basis with the direction of travel in the up direction (step ST1110). A present position mark is displayed on the map image with the end of the triangle facing up (step ST1111). Then the control section 24 again reads data relating to the speed, bearing and position coordinates (X, Y) of the displacement body from the position detection section 23 (step ST1112). Then it is determined whether or not the map scale has been varied (step ST1113). If the scale has been varied, the routine returns to a step ST1104. If there is no variation, the routine returns to step ST1110.

In this way if the map scale has been varied, the processing below the step ST1104 is repeated and if there is no variation the process after the step ST1106 or the step ST1110 is repeated. Thus the display of the map in a map mode corresponding to the map scale is repeated.

In this way, according to embodiment 23, the map mode which displays the map in a map scale is varied. Thus when displaying detailed maps in which large amounts of information can be discerned in proximity to the present position, a map may be displayed in display up mode with the direction of travel being the top of the map. A map display is displayed which has an easily understood relationship with the direction of the driver's viewing, that is to say, with the direction of travel of the displacement body. When a wide area map is displayed which contains information greatly removed from the present position, the map is displayed in north up mode with the direction north being the top of the map and the map may be easily understood due to the direction.

Thus the same effect as the above embodiments is obtained and the map mode may be varied in order to display a map according to the operational state of the displacement body or the display state of the map on the display section apart from the map scale.

Embodiment 24

Figure 67:
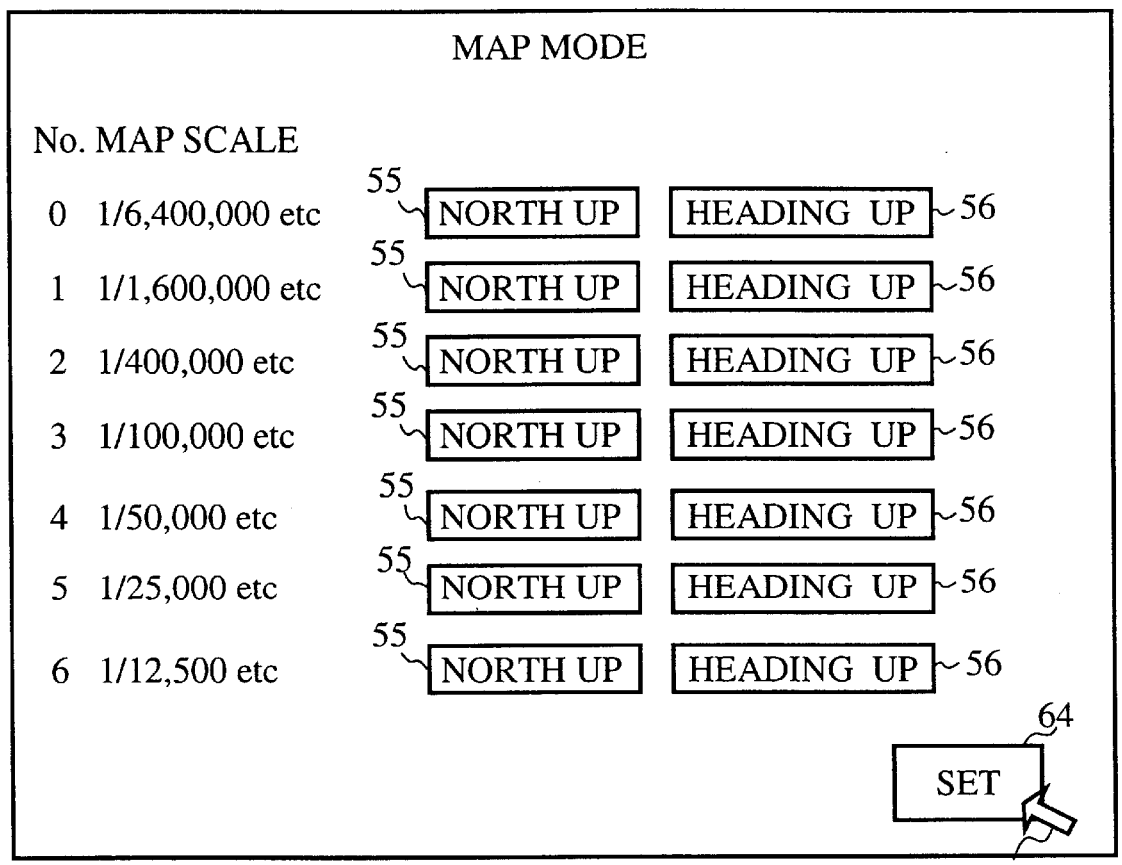
FIG. 67 is an explanatory view of a set screen of a map mode in a map information display device according to a twenty-fourth embodiment of the present invention.

In embodiment 23 above, a map mode of a displayed map was determined by the map scale. However the map mode may be arbitrarily determined by an operation of the driver. FIG. 67 is an explanatory view of the set screen of a map mode in an embodiment 24 of the present invention. In the figure, 51 an arrow shaped cursor displayed on the display screen 27, 54 is an icon depressed when setting a map mode, 55 is an icon which is depressed when designating north up mode, 56 is an icon which is depressed when designating heading up mode.

As shown in FIG. 67, with respect to each map scale, an icon 55 which is depressed when designating north up mode and an icon 56 which is depressed when designating heading up mode are separately provided. The icons 55 and 56 designate map modes for each map scale by being depressed. After the designation of the map mode, when the icon 54 is depressed the map mode designated for each map scale is set.

In this way, according to embodiment 24, a map display can be adjusted depending on a use purpose as it is possible to set a map mode separately for each map scale.

Embodiment 25

In the above embodiments, a single screen was provided on the display section 27 and a single type of map image was displayed on the screen. However a plurality of display screens may be provided and separate types of map images may be displayed on the screens on the display section 27. The map information display device according to embodiment 25 comprises main and sub-screens on the display section 27 and differing map images which are displayed thereon. The structure of the map information display device of an embodiment 25 is the same as that shown in embodiment 1 as shown in the block diagram in FIG. 4 and so will not be described further.

The operation of embodiment 23 will be outlined below.

Figure 68:
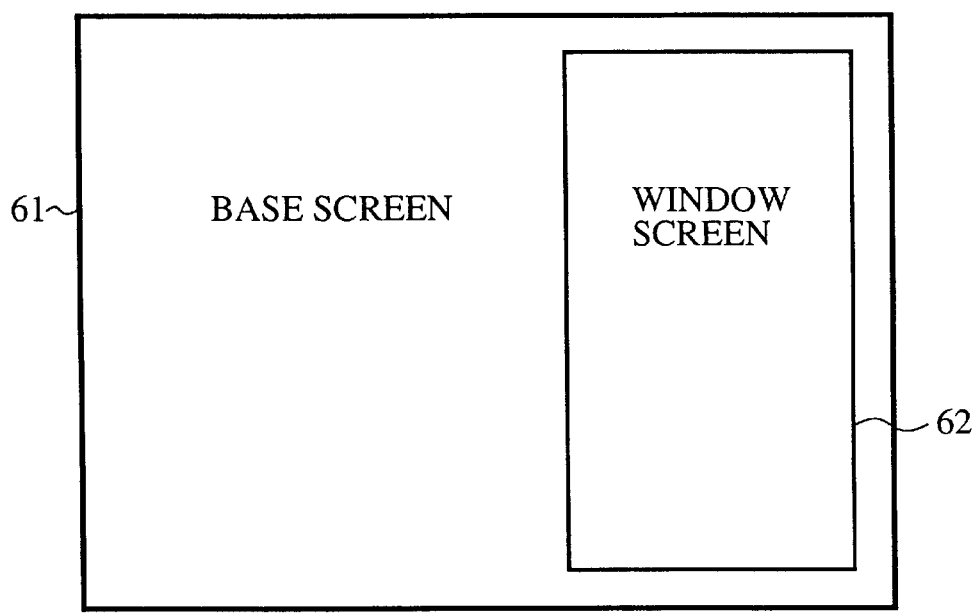
FIG. 68 is an explanatory view of a display screen of the display section of a twenty-fourth embodiment of the present invention.

FIG. 68 is an explanatory view showing a display screen of the display section 27. The display section 27 as shown in FIG. 68 can comprise two screens comprised of a base screen 61 and a window screen 62. In the base and window screens 61, 62, it is possible to display differing types of map images. In embodiment 25 for example, a map image displayed in front extended display according to a first embodiment of the present invention is displayed in the base screen 61 and a map image centering on a present position in the same way as a conventional map information display device can be displayed in the window screen 62. The two screens are displayed at mutually different map scales.

When the map information display device is placed in the ON position by operation of the operational section 29, the control section 24 receives information regarding the speed and bearing of the displacement body and the coordinates (X, Y) of the present position of the displacement body from the position detection section 23. The map scale at the last prior occasion the base screen 61 and the window screen 62 were placed in the OFF position are read from the last memory 28. The map scales read at this time are 1/400000 for the base screen and 1/12500 for the window screen.

Figure 69:
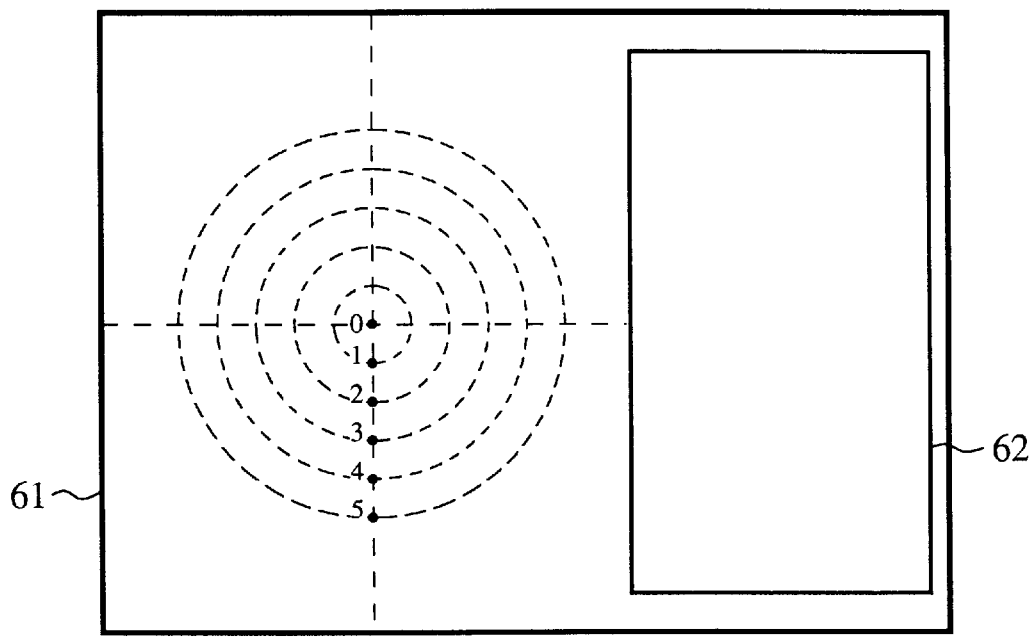
FIG. 69 is an explanatory figure of an offset position of a base screen in a twenty-fifth embodiment.

An offset value is determined from the center of the screen of the present position displayed on the display section 27 from the received information regarding the speed of the displacement body. The offset value based on the information about the speed of the displacement body is shown for example in FIG. 6. Offset values 0–5 are set depending on each speed. The display of the present position in the base screen 71 determined by the offset value as shown in FIG. 69 has an offset value of 0 at the center of the screen. Thereafter the values ranging from 1–5 are removed from the center on concentric circles in ascending order. In embodiment 25 if the displacement body is taken to have a speed of 55 km/h, an offset value has a value of 3.

The control section calculates the offset position coordinates $(X_1, Y_1)$ which are offset from the present position (X, Y) of the displacement body based on the offset value 3 determined by the information regarding the speed of the displacement body. Thereafter the control section 24 reads map data with a scale of 1/400000 centering on the obtained offset position coordinates $(X_1, Y_1)$ from the map memory 25 through the memory drive 26. A map image centering on the offset position coordinates $(X_1, Y_1)$ is displayed on the base screen 61 of the display section 27. A present position mark which comprises a triangular mark which can discriminate the direction of travel is displayed at a present position coordinates (X, Y) on the map image. Furthermore the control section 24 reads map data with a scale of 1/2500 centering on the obtained present position coordinates (X, Y). A map image centering on the present position coordinates (X, Y) is displayed on the window screen 62 of the display section 27. A present position mark which comprises a triangular mark which can discriminate the direction of travel is displayed in the center of the map image.

Figure 70:
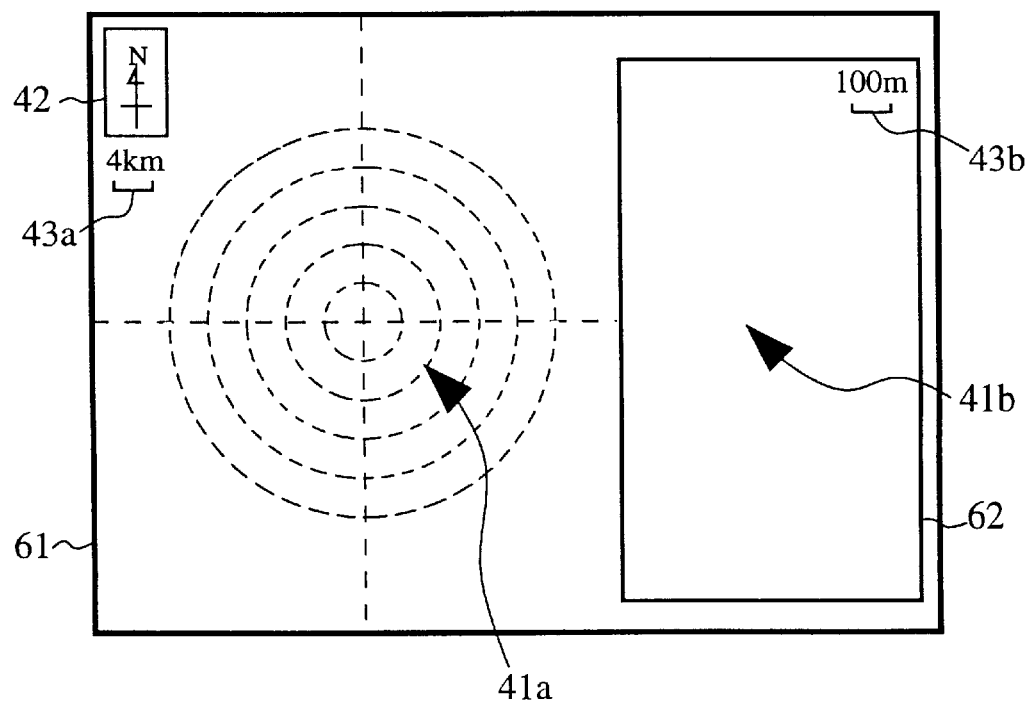
FIG. 70 is an explanatory view of a display screen of the display section of a twenty-fifth embodiment of the present invention.

FIG. 70 is an explanatory view of a display screen of the display section 27 in embodiment 25 of the present invention. In the figure, reference numeral 41a denotes a present position mark in the base screen 61, 41b is a present position mark in the window screen 62, 42 is a bearing mark in the base screen 61, 43a is a scale in the base screen 61, 43b is a scale in the window screen 62. In this case, the scale 43a of the base screen 61 is 4 km and the scale of the window screen 62 is 100 m.

Figure 71:
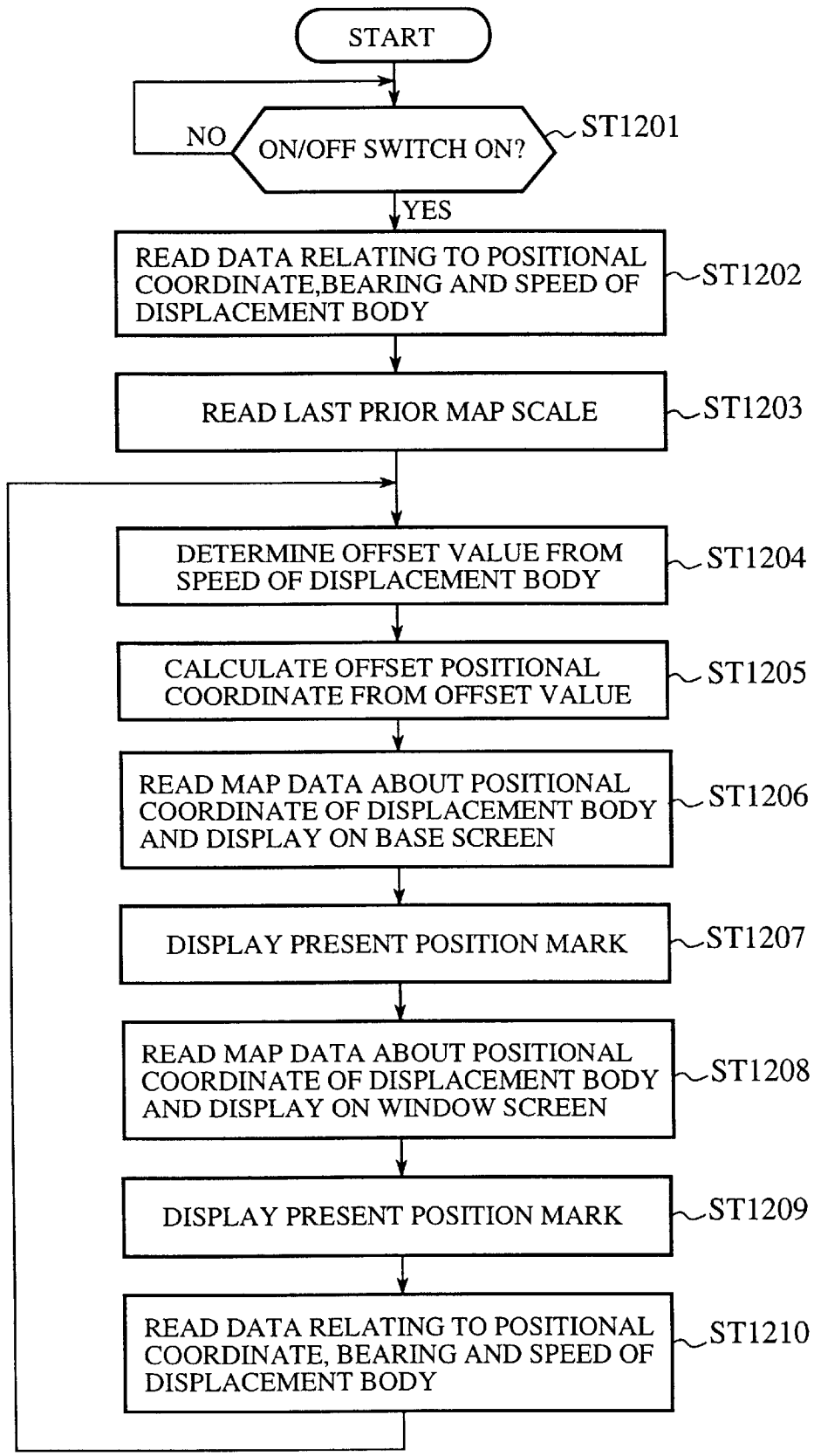
FIG. 71 a flowchart showing the basic operation of a control section according to a twenty-fifth embodiment of the present invention.

FIG. 71 is a flowchart showing the flow of the basic operation of the control section 24. The operation of embodiment 25 of the invention will be described with reference to the above flowchart.

The control section 24 detects the fact that the ON/OFF switch 33 of the operational section 29 has been placed in the ON position (step ST1201). First the control section 24 reads data relating to the speed, bearing and position coordinates (X, Y) of the displacement body from the position detection section 23 (step ST1202). The map scale on the last prior time the ON/OFF switch 33 was placed in the OFF position in the base and window screens 61, 62 is read from the last memory 28 (step ST1203). Next determination of the offset value is performed from the speed of the displacement body received from the position detection section 23 (step ST1204). The offset value is determined depending on corresponding offset values and displacement body speeds shown in FIG. 6 based on the displacement body speeds.

Thereafter the offset position coordinates $(X_1, Y_1)$ are determined based on the offset value (step ST1205). Map data depending on the map scale as read from the last memory 28 centering on the offset position coordinates $(X_1, Y_1)$ are read from the map memory 25 and a map image is displayed on the screen section 27 (step ST1206). A present position mark 41a is displayed on the map image displayed on a base screen 61 (step ST1207). Then the control section 24 again reads map data depending on the map scale as read from the last memory 28 centering on the offset position coordinates $(X_1, Y_1)$ of the displacement body from the map memory 25 and a map image is displayed on the window screen 62 of the display section 27 (step ST1208). A present position mark 41b is displayed on the map image displayed on a window screen 62 (step ST1209).

Then the control section 24 again reads data relating to the speed, bearing and position coordinates (X, Y) of the displacement body from the position detection section 23 (step ST1210). Then the routine returns to a step ST1204 and repeats the process after the determination of the offset value. In this way, different map images one with a scale of 1/400000 displaying the present position of the displacement body in front extended display and another with a scale of 1/2500 displaying the present position of the displacement body in the center of the screen are respectively displayed in the base and window screens 61, 62 of the display section 27.

In this way, according to embodiment 25, it is possible to display different type of map image in respective screens as a plurality of screens can be displayed on the display section 27. It is possible to recognize simultaneously a map displaying a normal display and a map displayed by a front extended display or a destination display in a wide area map display. Thus the advantage is obtained that map display is performed in a more easily understood format.

Embodiment 26

Embodiment 25 above was described as displaying an extended front display screen on a base screen 61 as described in embodiment 1. In the same way, needless to say, a screen as described in embodiment 2 to embodiment 24 may be displayed on the base screen 61.

Embodiment 27

Embodiment 25 and embodiment 26 above were described with respect to a screen such as those described in embodiments 1 to 24 being displayed on a base screen 61. However it is possible to reverse the screens which are displayed on the base and window screens 61, 62. That is to say, for example, a screen which centers on a present position in the same way as the conventional map information display device is displayed on the base screen 61 and a screen such as those described in embodiments 1 to 24 is displayed on a window screen 62. Thus the same effect as embodiment 25 can be obtained.

Embodiment 28

Figure 72:
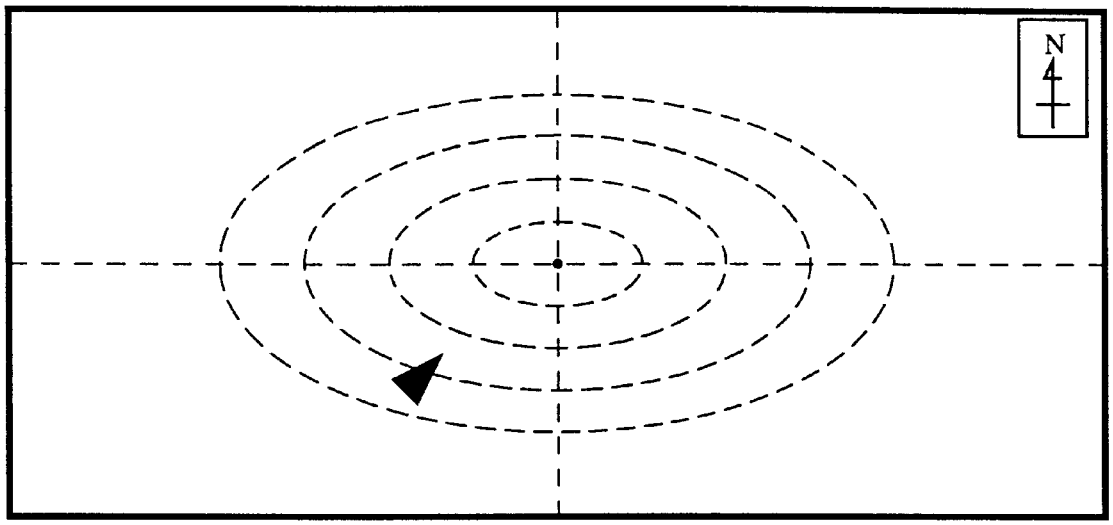
FIG. 72 is an explanatory figure of an offset position in a map information display device in a twenty-eighth embodiment.

In the embodiments above, the offset position from the center of the screen of the present position displayed on the display section 27, that is to say, the present position mark on the screen defines a circular orbit. However the shape of the orbit may be elliptical or of other shapes. FIG. 72 is an explanatory figure of an example of a display screen of a map information display device according to embodiment 28 of the present invention. In the present embodiment, the offset position is shown in a elongated elliptical shape. In such a case, even at the same offset value, the degree of offset will increase in the horizontal direction more than the vertical. Thus in a wide screen display as shown in the figure, it is possible to perform extended front display more effectively.

Embodiment 29

Figure 73:
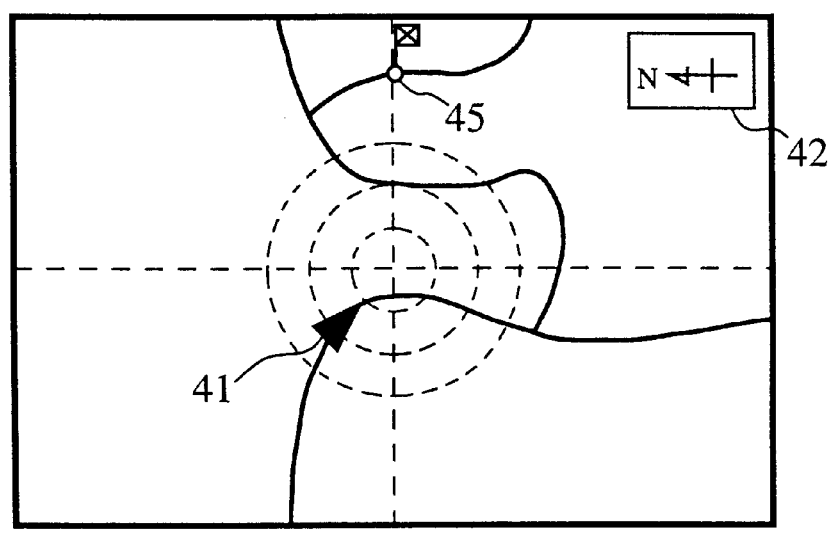
FIG. 73 is an explanatory view of a display example of a display screen in a display section in a map information display device according to a twenty-ninth embodiment of the present invention.

In the embodiments above, the map modes were described as comprising a north up mode in which north is displayed at the top of the screen and a heading up mode in which the current direction of travel is displayed at the top of the screen. However the invention is not limited in this respect. FIG. 73 is an explanatory view of a display screen on the display section 27 in a map information display device according to embodiment 29 of the present invention. The figure shows a display screen showing a destination mode in which a destination direction is displayed at the top of the screen.

Embodiment 30

In embodiments 1 to 29 above, a control program for displaying the map images on the display screen is pre-stored in a control section 24. However, a part or all of the control program may be stored in a program memory of an external recording medium such as a CD-ROM or the like. It is possible to read as required from the program memory using a playing device in order to perform control of the screen display.

Figure 74:
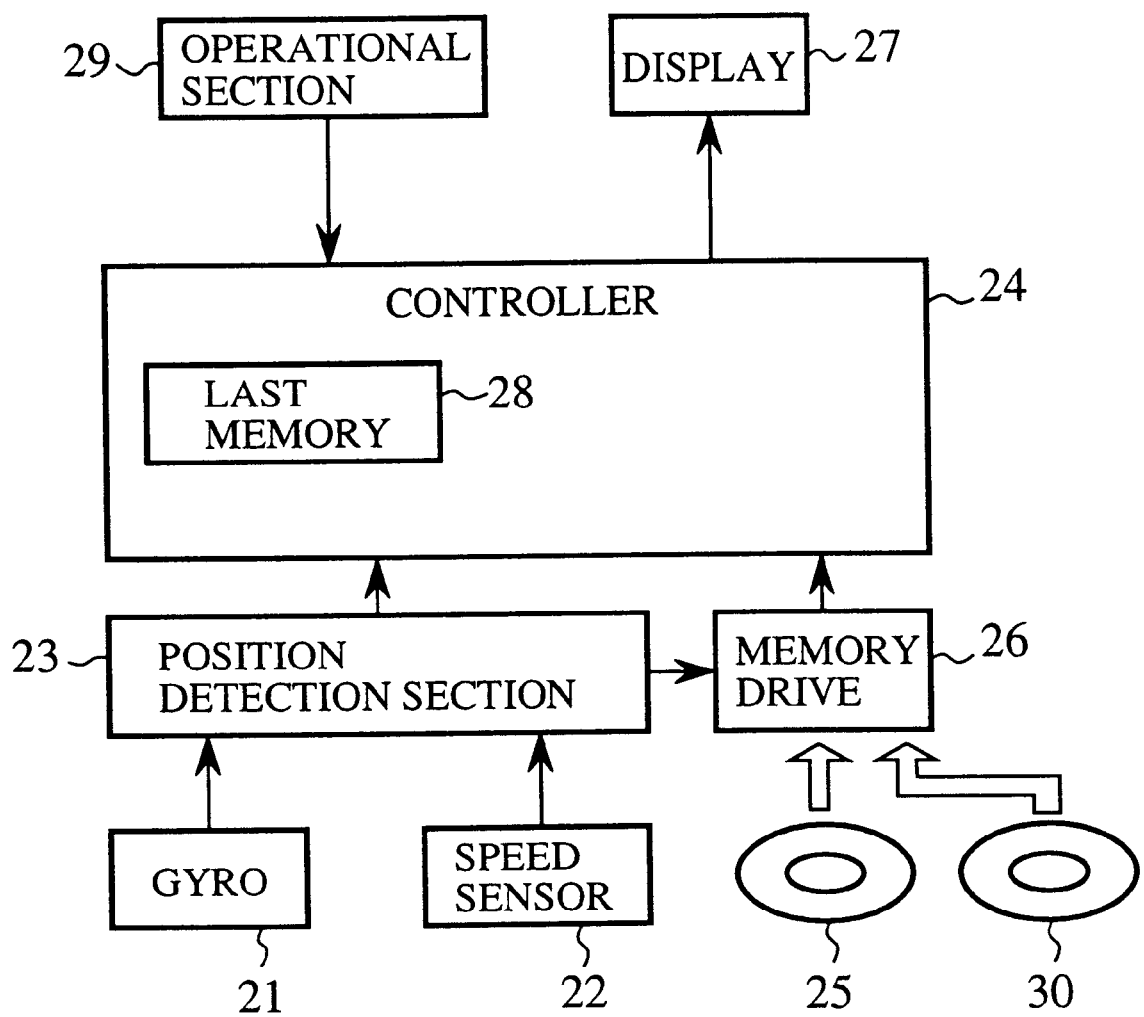
FIG. 74 is a block diagram of the structure of a map information display device in a thirtieth embodiment of the present invention.

FIG. 74 is a block diagram of the structure of a map information display device according to embodiment 30 of the present invention. Those parts corresponding to the parts of FIG. 4 are designated by the same numerals and will not be further described. In the figure, reference numeral 30 denotes a program memory comprising a CD-ROM storing the entirety of a control program for displaying a map image on a display screen of the display section 27 in a map information display device. The control section 24 reads the control program stored in the program memory 30 through a memory drive (playing device) 26 as required. Display processing of the screen is executed using the read control program. Since the display processing of the screen is precisely the same as that explained in the above embodiments, no further description will be given.

Apart from the CD-ROM above, a floppy disk or an optical disk may be used an external recording medium for the program memory 30. Furthermore all or only a part of a control program may be stored in order to control the display of map images. The remainder of the program may be pre-stored in the control section 24.

In this way, according embodiment 30 of the present invention, a control program may be stored in a program memory of an external recording medium in order to display map images on a display screen. The display execution of maps read as required may be executed by the control section 24. Thus exchanging a control program is facilitated which thus simplifies procedures when removing faulty programs or installing a new version thereof.

INDUSTRIAL APPLICATION

As shown above, the map information display device of the invention in the first exemplary embodiment may be used in the navigation system of a displacement body to display map screens as required by a driver. The present position of the displacement body may be displayed in the center of the display or may be displayed in extended front display on the basis of an operational condition of the displacement body such as a region currently traveled, the state of the road currently traveled, or the speed of the displacement body.

The map information display device of the invention in the second exemplary embodiment may be used in the navigation system of a displacement body to display screens in which map information further forward in a wider range is available at high speeds in comparison with low speeds. At low speeds, the present position of the displacement body is roughly in the center of the display and at higher speeds, the present position is in an extended front display.

The map information display device of the invention in the third exemplary embodiment may be used in the navigation system of a displacement body to display map screens depending on road conditions with the present position of the displacement body displayed in the center of the display or in extended front display. Display may depend on road conditions, such as road state, number of lanes, road width, speed limits and road type currently traveled.

The map information display device of the invention in the fourth exemplary embodiment may be used in the navigation system of a displacement body to display map screens in which display depends on the area currently traveled and wherein map information further forward in a wider range is available in non-urban areas rather than in urban areas. In urban areas, the present position of the displacement body is roughly in the center of the display and in non-urban areas, the present position is in an extended front display.

The map information display device of the invention in the fifth exemplary embodiment may be used in the navigation system of a displacement body to display map screens in which display is based on a display state of the map on the display section and map information further forward in a wider range is available in detailed maps rather than in wide area maps. In wide area maps, the present position of the displacement body is roughly in the center of the display and in detailed maps, the present position is in an extended front display.

The map information display device of the invention in the sixth exemplary embodiment may be used in the navigation system of a displacement body to display map screens in which display of map information further forward in a wider range is available in the direction of a destination by varying the display position of the present position displayed on the display section depending on the position relationship with the destination.

The map information display device of the invention in the seventh exemplary embodiment may be used in the navigation system of a displacement body to display map screens as required by a driver by switching the map mode when displaying a map image on a display screen depending on a display state of the map on a display section or an operational state of the displacement body.

The map information display device of the invention in the eighth exemplary embodiment may be used in the navigation system of a displacement body to display map images in which bearing can not be mistaken by using a heading up mode when displaying detailed maps and by a north up mode when displaying wide area maps. This is achieved by switching the map mode based on the degree of detail or the scale of the map displayed on the display section.

The map information display device of the invention in the ninth exemplary embodiment may be used in the navigation system of a displacement body in display screens in which maps displayed in extended front display or in wide area display with respect to a destination may be simultaneously recognized with maps displayed in a normal display format. This is achieved by providing a plurality of display screens on the display section and displaying separate types of map images on the screens.

The map information display device of the invention in the tenth exemplary embodiment may be used in the navigation system of a displacement body to facilitate the exchange of programs when removing a faulty program or installing a new version. This is achieved by storing all or part of a control program in a program memory comprising an external recording medium and displaying a present position of the displacement body or a map image by reading as required the control program for screen display.

What is claimed is:

1. A map information display device comprising:
a position detection section which detects a present position of a displacement body,
a display section which displays a present position of a displacement body detected by said position detection section and a map image containing a road currently traveled by said displacement body, and
a control section which displays a map image on said display section and which displays a present position of said displacement body on a map image displayed on said display section,
wherein said control section varies a display position of a present position which is displayed on said display section along concentric tracks away from a center of said display section, depending on an operational state of said displacement body.

2. A map information display device according to claim 1 wherein
said control section varies a display position of a present position which is displayed on said display section depending on speed of said displacement body.

3. A map information display device according to claim 1 wherein
a map data storage section is provided which stores map data for displaying a map image on said display section, and a region in which each road is situated is stored in relation to respective road data in said map data stored in said map data storage section, and
said control section varies a display position of a present position which is displayed on said display section depending on a region of a currently traveled road.

4. A map information display device according to claim 1 wherein said control section switches a map mode when displaying a map image on said display section depending on an operational state of said displacement body or a display state of a map on said display section.

5. A map information display device according to claim 4 wherein
said control section switches a map mode when displaying a map image on said display section depending a map scale of a map displayed on said display section.

6. A map information display device according to claim 1 wherein
said display section has a plurality of display screens, and displays differing kinds of map images in each display screen.

7. A map information display device according to claim 1 wherein a program from an external recording medium is provided, said program storing at least a part of a control program for performing display of a present position of said displacement body and display of a map image on said display section and said control section reads said control program stored in a program memory as required and displays a present position of said displacement body and a map image on said display section.

8. A map information display device comprising:
a position detection section which detects a present position of a displacement body,
a display section which displays a present position of a displacement body detected by said position detection section and a map image containing a road currently traveled by said displacement body, and
a control section which displays a map image on said display section and which displays a present position of said displacement body on a map image displayed on said display section,
wherein said control section varies a display position of a present position which is displayed on said display section depending on an operational state of said displacement body,
wherein a map data storage section is provided which stores map data for displaying a map image on said display section, and a road attribute of each road is stored in relation to respective road data in said map data stored in said map data storage section, and
said control section varies a display position of a present position which is displayed on said display section depending on a road attribute of a currently traveled road.

9. A map information display device comprising:
a position detection section which detects a present position of a displacement body,
a display section which displays a present position of a displacement body detected by said position detection section and a map image containing a road currently traveled on by said displacement body, and
a control section which displays a map image on said display section and which displays a present position of said displacement body on a map image displayed on said display section,
wherein said control section varies a display position of a present position which is displayed on said display section along concentric tracks away from a center of said display section, depending on a display state of a map on said display section.

10. A map information display device according to claim 9 wherein
said display section has a plurality of display screens, and displays differing kinds of map images in each display screen.

11. A map information display device according to claim 9 wherein a program from an external recording medium is provided, said program storing at least a part of a control program for performing display of a present position of said displacement body and display of a map image on said display section and said control section reads said control program stored in a program memory as required and displays a present position of said displacement body and a map image on said display section.

12. A map information display device according to claim 9 wherein
said control section switches a map mode when displaying a map image on said display section depending on an operational state of said displacement body or a display state of a map on said display section.

13. A map information display device according to claim 12 wherein
said control section switches a map mode when displaying a map image on said display section depending a map scale of a map displayed on said display section.

14. A map information display device comprising:
a position detection section which detects a present position of a displacement body,
a display section which displays a present position of a displacement body detected by said position detection section and a map image containing a road currently traveled on by said displacement body, and
a control section which displays a map image on said display section and which displays a present position of said displacement body on a map image displayed on said display section,
wherein said control section varies a display position of a present position which is displayed on said display section along concentric tracks away from a center of said display section, depending on position relationship between a set destination and a present position of said displacement body.

15. A map information display device according to claim 14 wherein
said display section has a plurality of display screens, and displays differing kinds of map images in each display screen.

16. A map information display device according to claim 14 wherein a program from an external recording medium is provided, said program storing at least a part of a control program for performing display of a present position of said displacement body and display of a map image on said display section and said control section reads said control program stored in a program memory as required and displays a present position of said displacement body and a map image on said display section.

* * * * *